(12) United States Patent
Park et al.

(10) Patent No.: US 12,035,057 B1
(45) Date of Patent: *Jul. 9, 2024

(54) SNAPSHOT POLARIZATION IMAGING WITH A MICRO-CAMERA ARRAY MICROSCOPE

(71) Applicant: Ramona Optics Inc., Durham, NC (US)

(72) Inventors: Jaehee Park, Durham, NC (US); Colin Cooke, Durham, NC (US); Mark Harfouche, Durham, NC (US); Gregor Horstmeyer, Durham, ND (US)

(73) Assignee: Ramona Optics Inc., Durham, NC (US)

( * ) Notice: Subject to any disclaimer, the term of this patent is extended or adjusted under 35 U.S.C. 154(b) by 131 days.

This patent is subject to a terminal disclaimer.

(21) Appl. No.: 17/887,734

(22) Filed: Aug. 15, 2022

Related U.S. Application Data

(63) Continuation-in-part of application No. 17/092,187, filed on Nov. 6, 2020, now Pat. No. 11,415,791.

(60) Provisional application No. 62/931,729, filed on Nov. 6, 2019.

(51) Int. Cl.
| | |
|---|---|
| *H04N 23/90* | (2023.01) |
| *G01N 21/21* | (2006.01) |
| *G02B 21/06* | (2006.01) |
| *G02B 21/36* | (2006.01) |
| *H04N 5/265* | (2006.01) |
| *H04N 23/56* | (2023.01) |
| *H04N 23/695* | (2023.01) |

(52) U.S. Cl.
CPC ............ *H04N 23/90* (2023.01); *G01N 21/21* (2013.01); *G02B 21/06* (2013.01); *G02B 21/365* (2013.01); *H04N 5/265* (2013.01); *H04N 23/56* (2023.01); *H04N 23/695* (2023.01); *G01N 2021/216* (2013.01)

(58) Field of Classification Search
CPC ........ H04N 23/90; H04N 5/265; H04N 23/56; H04N 23/695; G01N 21/21; G01N 2021/216; G02B 21/06; G02B 21/365
USPC .............................................. 348/79; 396/439
See application file for complete search history.

(56) References Cited

U.S. PATENT DOCUMENTS

| | | | |
|---|---|---|---|
| 11,415,791 B1* | 8/2022 | Park ........................ | H04N 23/80 |
| 2020/0285037 A1* | 9/2020 | Horstmeyer ........... | H04N 23/56 |
| 2021/0271061 A1* | 9/2021 | Fukazawa .............. | A61B 1/045 |
| 2023/0247276 A1* | 8/2023 | Yang ....................... | H04N 23/45 |
| | | | 396/439 |

* cited by examiner

*Primary Examiner* — Thai Q Tran
*Assistant Examiner* — Stephen R Smith
(74) *Attorney, Agent, or Firm* — patent2ip LLC; Tue Nguyen

(57) ABSTRACT

A system and method for high-resolution polarimetric imaging can include an array of micro-cameras to simultaneously capture polarized optical information from a wide area. Polarized illumination sources can be placed below and/or above the sample to direct polarized light to the sample during image capture. Post processing can be performed on the captured images to obtain polarimetric properties of the sample.

20 Claims, 27 Drawing Sheets

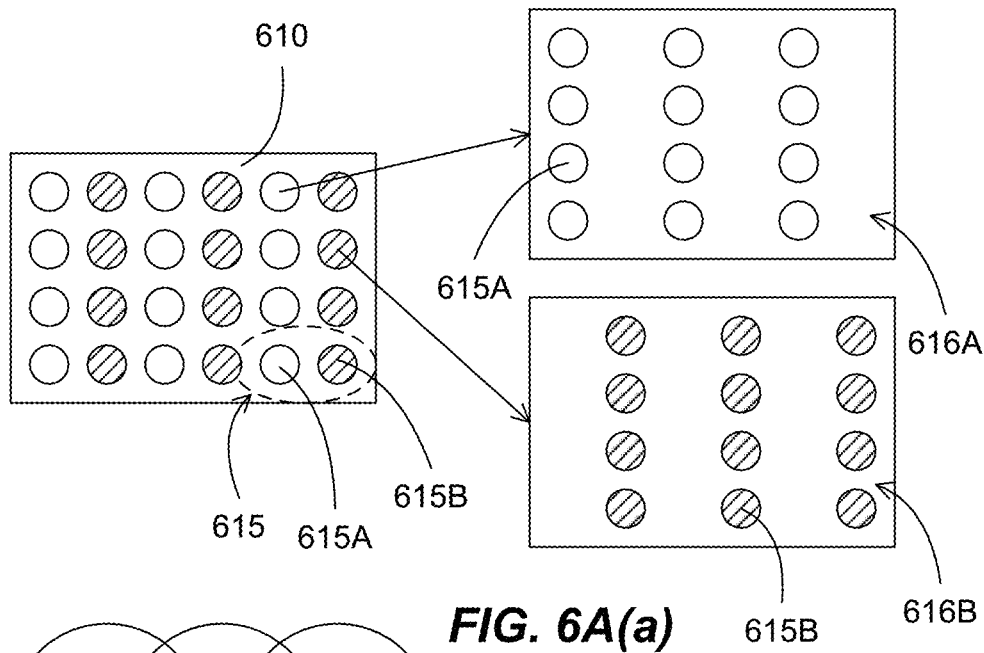
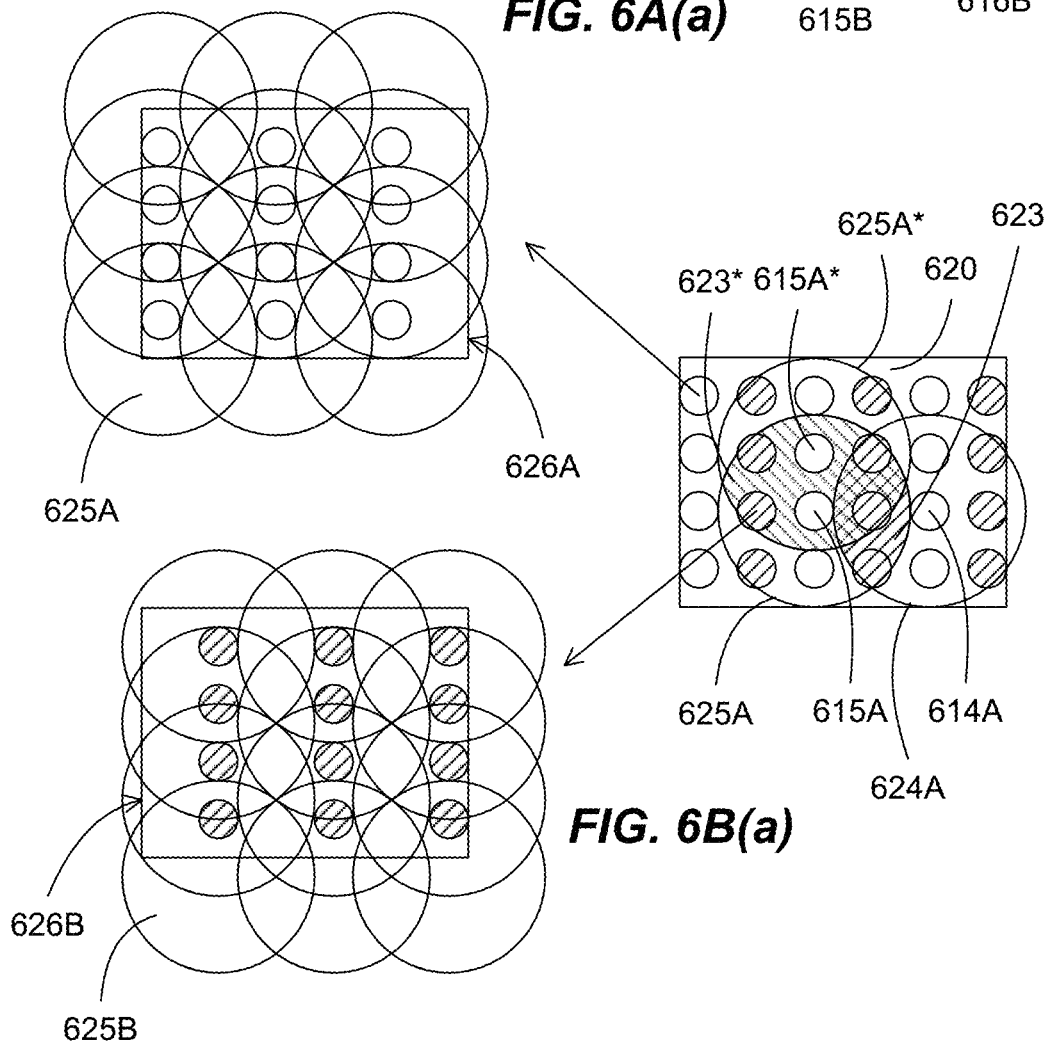
FIG. 6A(a)
FIG. 6B(a)

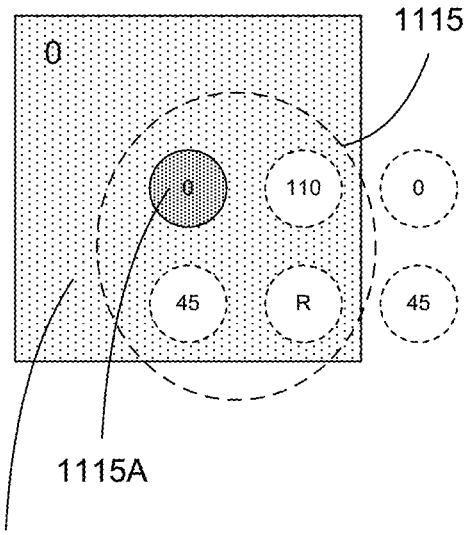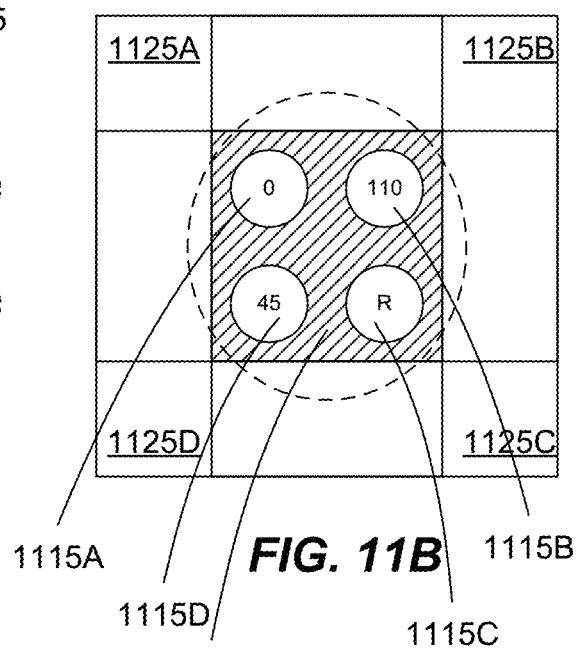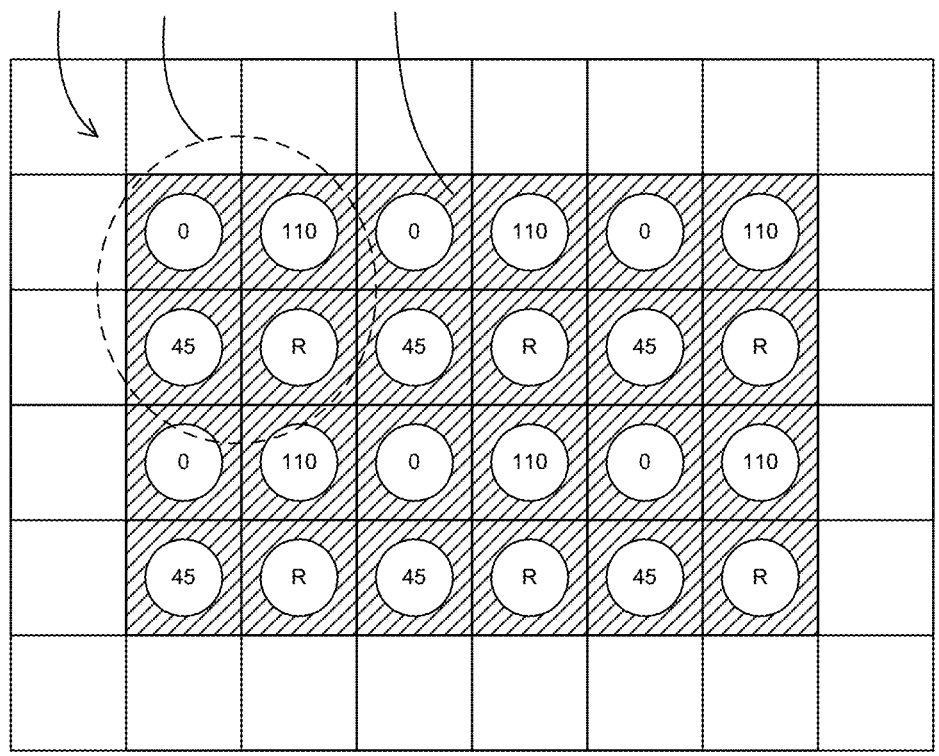
FIG. 11A
FIG. 11B
FIG. 11C

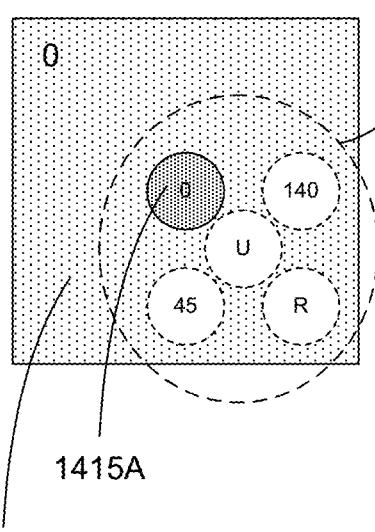
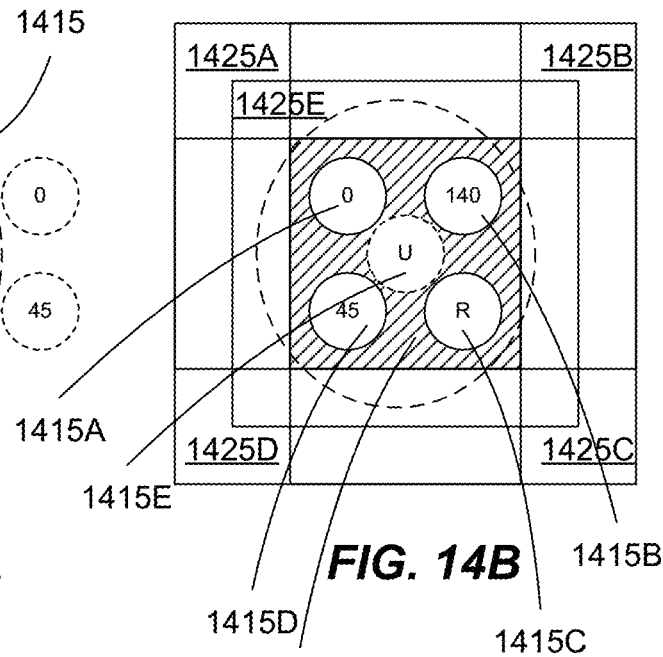
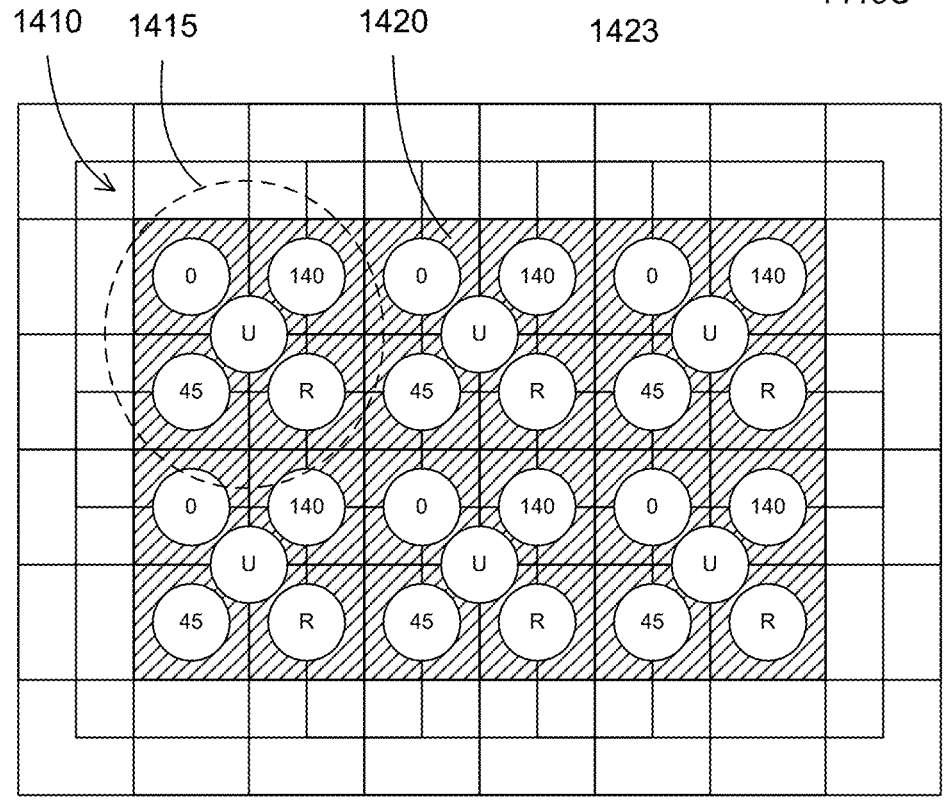
FIG. 14A
FIG. 14B
FIG. 14C

Operating the microscope in unpolarized mode using unpolarized illumination patterns and unpolarized cameras
1500

FIG. 15A

Operating the microscope in polarized mode using polarized illumination patterns and polarized cameras
1520

FIG. 15B

Operating the microscope in polarized mode using a combination of polarized or unpolarized illumination patterns with a combination of polarized or unpolarized cameras
1540

FIG. 15C

Operating the microscope in a combination of polarized and unpolarized mode using a combination of polarized or unpolarized illumination patterns with a combination of polarized or unpolarized cameras
1560

FIG. 15D

SNAPSHOT POLARIZATION IMAGING WITH A MICRO-CAMERA ARRAY MICROSCOPE

The present patent application is a continuation-in-part (CIP) of U.S. patent application Ser. No. 17/092,187, filed on Nov. 6, 2020, entitled "Snapshot polarization imaging with a micro-camera array microscope", which claims priority from U.S. Provisional Patent Application Ser. No. 62/931,729, filed on Nov. 6, 2019, entitled "Snapshot polarization imaging with a micro-camera array microscope", of the same inventors, hereby incorporated by reference in their entirety.

The present patent application relates to patent application Ser. No. 16/066,065, filed on Jun. 26, 2018; and in patent application Ser. No. 17/092,177, filed on Nov. 6, 2020, entitled "Methods to detect image features from variably-illuminated images"; hereby incorporated by reference in their entirety.

BACKGROUND OF THE INVENTION

A wide variety of imaging polarimeter configurations exist, but almost all of them can be categorized as either a division of time, division of amplitude, division of aperture, or division of focal-plane polarimeter.

FIG. 1 illustrates a prior art imaging polarimeter. The imaging polarimeter 100 can include a light source 130 for illuminating a sample 120. A detector 110 can be used to capture image of the sample. The imaging polarimeter 100 can include a Polarization State Generator (PSG) 125, which includes different polarizers, positioned on the light path of the light source, to generate polarized light for the sample. The imaging polarimeter 100 can include a Polarizer State Analyzer (PSA) 115, which includes different polarizers, positioned on the light path of the detector, to capture polarized light from the sample.

Different polarizers for the PSG and PSA can be used to capture different polarized images. For example, zero degree polarizers can be used on both PSG and PSA, to capture a zero degree polarized image of the sample, with the incident and the measured light being both zero degree polarized. The polarizers can be changed for imaging different polarization states. Polarized properties can be measured, such as through the calculations involving determining a Stokes vector, Mueller matrix or Jones matrix. For example, a minimum of 16 independent combinations of input and output measurements can be required to calculate the 16 elements of the Mueller matrix of a general sample.

Most current microscope platforms rely on a single microscope objective lens for image formation. However, due to the presence of lens aberrations, as well as challenges associated with creating large-format digital detectors with more than a few hundred megapixels, it is difficult to design a single microscope objective lens that simultaneously offers high resolution over a wide field-of-view (FOV).

However, as of yet, there is no possible way to obtain microscopic-type high-resolution polarimetric imaging over such a large area. Polarization information is helpful in microscopy for identifying properties of various biological samples, for understanding the anisotropic properties of materials, and to reduce the effects of multiple scattering from thick samples or isolate surface-reflected light. Standard microscopes can be outfitted for polarimetric imaging in a variety of different ways, most typically by placing the specimen of interest between two crossed polarizers—one which polarizes the incident light, and one "analyzer" which selects the polarization vector of interest. To observe the full Muller matrix (i.e., to obtain the Stokes vector) at each location across the surface of the sample, it is necessary to obtain 4 unique measurements with 4 different analyzers, with a single analyzer positioned at one of 4 different orientations. While it is possible to speed up this measurement process either with analyzer multiplexing strategies, or by placing the analyzers at the image plane (directly over the sensor pixels) and multiplexing accordingly, the standard microscope can only observe a field-of-view that is several square centimeters at 5-10 µm resolution, once again due to the physical limitations surrounding standard microscope objective lens design.

Thus, to observe a large area at high resolution, nearly all microscopes utilize mechanical scanning to bring different regions within the microscope field-of-view. Mechanical scanning takes time and is subject to various sources of instability (most commonly, focus and positioning errors).

SUMMARY OF THE EMBODIMENTS

In some embodiments, the present invention discloses methods of polarization imaging from variably-illuminated images in an array of multiple small microscopes (i.e., micro-cameras), tiled together in an array. Using a tightly packed array of micro-cameras, high resolution (1-10 µm) over a large area (hundreds of square centimeters) can be achieved.

In some embodiments, the present invention discloses a polarimetric micro-camera array microscope (PCAM) system to obtain rapid polarimetric measurements at microscopic resolution over a large area with a minimum number of image-capturing processes.

In some embodiments, the PCAM system includes a camera array and an illumination source. The camera array can include camera units with different polarizers placed anywhere before the camera image sensor to control the polarization of the image that the camera can capture. The illumination source can include light source units with different polarizers to control the polarization of the light shining on the sample. The illumination source and the camera array can allow illumination-controlled polarization imaging, which includes controlling the polarization states of the incoming light, together with the ability to capture multiple polarized images simultaneously. The captured images ca be post processed to obtain polarimetric properties of the sample, for example, by the calculation of Stokes vectors, Mueller matrix, and Jones matrix.

BRIEF DESCRIPTION OF THE DRAWINGS

FIG. 11A 11C illustrate a camera array for a PCAM system according to some embodiments.

FIG. 14A-14C illustrate a camera array for a PCAM system according to some embodiments.

FIGS. 15A-15D illustrate operations of a PCAM according to some embodiments.

DETAILED DESCRIPTION OF THE EMBODIMENTS

Figure 1:
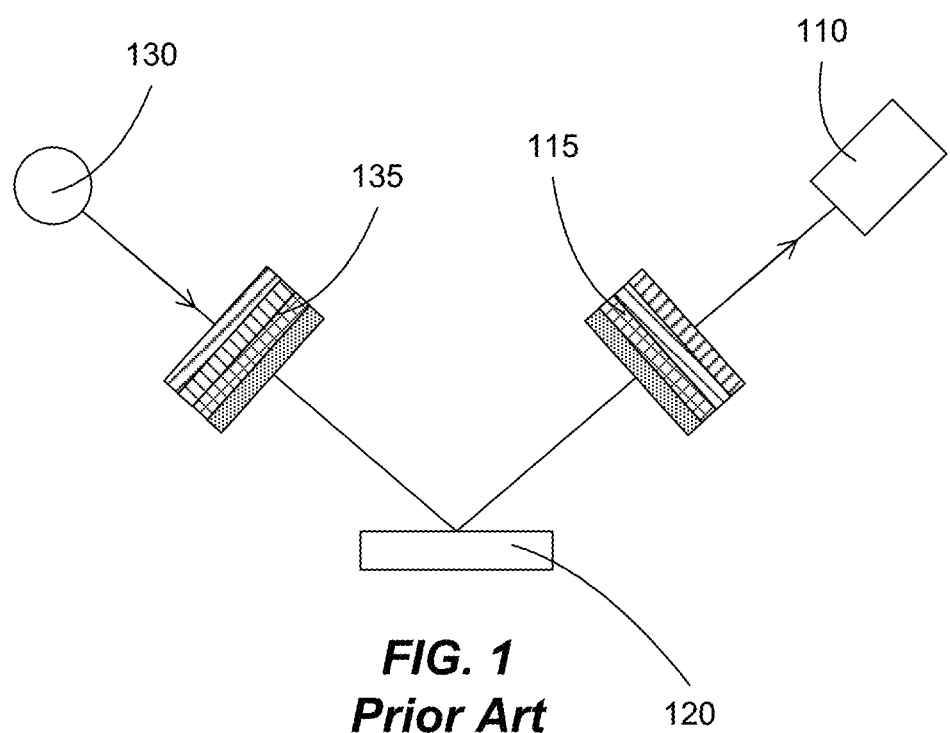
FIG. 1 illustrates a prior art imaging polarimeter.

In some embodiments, the present invention discloses methods of polarization imaging from variably-illuminated images in an array of multiple microscopes, tiled together in an array. For example, if the general format of a microscope is miniaturized into a small "micro-camera" package, it is possible to create a tightly packed array of micro-cameras to enable high resolution (5-10 µm) over a large area (hundreds of square centimeters).

In some embodiments, the present invention discloses a polarimetric micro-camera array microscope (PCAM) system to obtain rapid polarimetric measurements at microscopic resolution (1-10 µm) over a large area (hundreds of square centimeters) with a minimum number, such as 1-20, of image capturing processes. The PCAM technology opens up the possibility to observe the polarimetric/anisotropic properties of large biological specimens extending across tens of centimeters at video rates, as they freely move, for example.

In a PCAM system, a camera array can capture a sequence of polarized images of a sample under different illumination patterns, e.g., with the illumination pattern varied between each image capture. Different cameras in the camera array can capture images with different polarization states. Different illumination patterns can provide illumination to the sample with light of different polarization states. The sets of corresponding polarized images from the sequence of images, e.g., a same image polarization and illumination polarization captured in the image sequence, can be processed, such as by stitching or fusing, to produce high dimensional image reconstructions of the sample area having different polarization states. Polarization effects of the sample can also be characterized or calculated from the polarization imaging process, such as by calculating the Stokes vectors, the Mueller matrix or Jones matrix of the sample.

In the specification, polarized light is light having a polarization state. An electromagnetic wave such as light consists of coupled oscillating electric field and magnetic field which are always perpendicular to each other. By convention, the polarization of electromagnetic waves such as light refers to the direction of the electric field. Thus, strictly speaking, all light are polarized light, e.g., electromagnetic wave with the electric filed having a direction at a point in time and space.

In linear polarization, the electric field oscillates in a plane which does not change with time. For example, a zero degree polarized light, which can mean light having 0 degree polarization or light having a 0 degree polarization state, is light in which the electric field oscillates mostly in a plane forming a zero angle with a reference plane. The zero degree polarized light has the electric field oscillates in the zero degree plane without changing to other planes. Similarly, a 45 degree linear polarized light is light in which the electric field oscillates mostly in a plane forming a 45 angle with the reference plane. The polarization state of a 45 degree linear polarized light is the 45 degree polarization. The 45 degree polarized light has the electric field oscillates in the 45 degree plane without changing to other planes.

By the superposition principle, the 45 degree linear polarized light can also be viewed as the addition of a zero degree polarized light and a 90 degree polarized light having a same magnitude. Thus, a 45 degree polarization state can be considered as a superposition of a zero degree polarization state and a 90 degree polarization state.

The direction of the electric field can change with time. For example, an electric field can have a phase shift (such as ±90 degree phase shift) between a horizontal component (such as zero degree polarization) and a vertical component (such as a 90 degree polarization). For a 90 degree phase shift, the polarized light becomes circular polarized light (either left or right circular polarized light depending on the positive or negative phase shift), or polarized light having left or right circular polarization, or polarized light having a left or right circular polarization state.

When the direction of the electric field changes randomly with time, a randomly polarized light is generated. The randomly polarized light can also called unpolarized light, e.g., light having the polarization state randomly changing as a function of time. Thus, unpolarized light can be considered as polarized light, such as polarized light having a random polarization state.

In the specification, polarized light, light having a polarization, or light having a polarization state can include unpolarized light. The term "polarized light", used in the specification, can mean polarized light with or without unpolarized light, depending on the context. In some embodiments, unpolarized light is polarized light with the polarization randomly changing with time. So unpolarized light is polarized light with a specific polarization state of randomly changing with time. In some embodiments, polarized light is considered distinct from unpolarized light, and does not include unpolarized light.

In the specification, a light source having a polarization or a polarized light source can mean a light source configured to generate or emit light having a polarization state. For example, a zero degree polarized light source is a light source configured to generate or emit zero polarized light or light having a zero degree polarization state.

In some embodiments, a polarized light source can mean a light source configured to generate polarized light or unpolarized light, meaning generating light having a polarization state such as zero degree polarization, left circular polarization, or randomly polarization (e.g., the polarization state randomly changing with time). Two light sources having a same polarization can mean the polarization states of the light generated by the two light sources are the same. An example of two light sources having a same polarization state is two zero polarized light sources. Two light sources having different polarization can mean the polarization states of the light generated by the two light sources are not the same. An example of two light sources having different polarization states is one zero polarized light source and one 45 degree polarized light source.

In some embodiments, an image with a polarization can mean an image formed by polarized light (or polarized and unpolarized light, depending on how one defines polarized light and unpolarized light). For example, an image with zero degree polarization means an image formed by zero degree polarized light. An image with a polarization can mean an image formed by unpolarized light.

In some embodiments, a camera or a camera unit configured to capture images with a polarization can mean a camera equipped with a polarizer or a camera not having any polarizer, in order to capture images formed by polarized light (or polarized and unpolarized light). For example, a camera or a camera unit configured to capture images with zero degree polarization can mean a camera equipped with a zero degree polarizer, in order to capture zero degree polarized images, e.g., images formed by zero degree polarized light. A camera or a camera unit configured to capture images with a polarization can mean a camera having no polarizer, in order to capture unpolarized images, e.g., images formed by unpolarized light.

Two cameras having a same polarization can mean the polarization states of the light captured by the camera to form the images are the same. An example of two cameras having a same polarization state is two zero polarized cameras, e.g., two cameras each having a zero degree polarizer. Two cameras having different polarization can mean the polarization states of the light captured by the camera to form the images are not the same. An example of two cameras having different polarization state is one zero polarized camera (e.g., a camera equipped with a zero degree polarizer) and one unpolarized camera (e.g., a camera not having any polarizer).

Further, one or more camera units configured to capture images with different polarization can mean a configuration in which there are two camera units, with one camera unit configured to capture images with a polarization different from the polarization of the images captured by the other camera unit. In other words, the two camera units can include a first camera unit with a first polarizer, and a second camera unit with a second polarizer.

It can also mean a configuration in which there is camera unit, with one camera unit configured to capture images with a polarization. Since there is only one camera unit, the limit of different polarization is not important.

Further, a camera unit configured to capture images with a polarization can mean a configuration in which the camera unit is equipped with a polarizer to capture images with the polarization state determined by the polarizer. It also means a configuration in which the camera unit is not equipped with any polarizer to capture unpolarized images, e.g., the polarization state of the light captured by the camera to form the images is the randomly polarization state.

In some embodiments, the polarization imaging process uses the micro-camera array microscope and illumination configurations to capture polarized light. For example, camera units equipped with different polarizers can allow different polarized images to be captured at a same time. In addition, an illumination source with different polarized light sources can provide different polarization patterns, without scanning or moving polarizers or sample. The polarization imaging process performed on a PCAM system can quickly capture multiple sets of polarized images under controlled polarized illumination patterns.

In some embodiments, the method of polarization imaging is used, for example, for characterizing properties of a sample through captured polarized images, in a computational microscope system that reconstructs images using multiple cameras, multiple illumination patterns, multiple polarization states, and computational post-processing. The computational microscope system typically employs an array of micro cameras, and is also known as a polarimetric micro-camera array microscope (PCAM) system. The PCAM system can be based on the technology of a micro-camera array microscope (MCAM) system. Details about the MCAM system can be found in patent application Ser. No. 16/066,065, filed on Jun. 26, 2018; and in patent application Ser. No. 17/092,177, filed on Nov. 6, 2020, entitled "Methods to detect image features from variably-illuminated images"; hereby incorporated by reference in their entirety.

The MCAM system can be viewed as a group of multiple individual microscopes tiled together in an array to image a large sample. The individual microscopes can be configured into a micro camera package, e.g., forming a tightly packed array of micro-cameras with high resolution (1-10 µm) over a large area (hundreds of square centimeters). The images taken from the individual micro cameras, which include overlapped image patches of the sample, can be stitched together to form the image of the sample.

The MCAM system can include a programmable illumination system, such as a large array of light sources, with individual light sources or groups of light sources capable of being controlled separately, for example, by a controller. The light sources can be visible light sources, infrared light sources or ultraviolet light sources such as light emitting diodes (LEDs) or lasers with appropriate wavelengths. The illumination system can be placed below or above the sample, to provide transmissive or reflective light to the micro cameras.

It is an innovative feature of the MCAM system that uses multiple micro-cameras to capture light from multiple sample areas, with each micro camera capturing light from a sample area sequentially from multiple patterned illumination configurations provided on the same sample area.

The illumination system can provide the sample with different illumination configurations, which can allow the micro cameras to capture images of the sample with light incident upon the sample at different angles and wavelengths. The illumination angle and wavelength are an important degree of freedom that impacts specimen feature appearance. For example, by slightly changing the incident illumination angle, a standard image can be converted from a bright field image into a phase-contrast-type image or a dark field image, where the intensity relationship between the specimen and background is completely reversed.

Further, by providing the sample with different light angles and wavelengths, both intensity and phase information of the received illumination can be recorded, which can allow the reconstruction of an image, for example, with more information or higher resolution. The MCAM system can offer size, weight, complexity, and cost advantages with respect to standard microscopes. The MCAM system may not require any moving parts, and its micro-cameras fit within a compact space without requiring a rigid support structure and can thus operate within a small, confined space.

In some embodiments, a PCAM system can constructed based on an MCAM system, for example, by adding polarization capability to the cameras and the light sources. For example, the camera array of a PCAM system can include multiple camera units, with each camera unit having a camera equipped with a polarizer assembly, such as a linear polarizer or a circular polarizer. The camera units can allow the PCAM to capture polarized images, with the polarization of the polarized images determined by the polarizer assembly coupled to the camera units. Further, the illumination source of a PCAM system can include multiple light source units, with each light source unit having a light source equipped with a polarizer assembly, such as a linear polarizer or a circular polarizer. The light source units can generate polarized light to illuminate onto the sample, with the final intensity of the polarized images (i.e., the final image measurements) determined in part by the polarizer assembly coupled to the light source units. The polarized lights, generated by the polarized light source units, can be incident on the sample surface, and then reflected or transmitted through the sample to reach the polarized camera units. This can allow the camera units, by capturing the polarized images of the sample, to determine the polarization properties of the sample, for example, by knowing the polarization changes from the polarized light sources to the polarized images.

The interaction of polarized light with materials, such as biological tissue, can provide pathology information about the tissues, such as structure and composition down to cellular or even subcellular level, and functionality such as metabolic information, myelination, and microvascular blood flow. The present PCAM can enable polarized light measurements and imaging to develop accurate and information-rich tissue diagnostic methods, for example, through improved measurement, analysis, and interpretation methods, including Stokes vector, Mueller matrix, and Jones matrix formulation. Other applications include examining rocks and minerals, or other naturally occurring or synthetic material, to understand their anisotropic properties.

In some embodiments, the polarization imaging process using a set of images of a substrate area captured by a camera under multiple illumination patterns is used in a computational microscope such as a PCAM system. The polarization imaging process can be specifically well-suited for applications in the PCAM system, since the PCAM system also generates sets of images of overlapped substrate areas captured by cameras of a camera array under multiple illumination patterns.

Figure 2A:
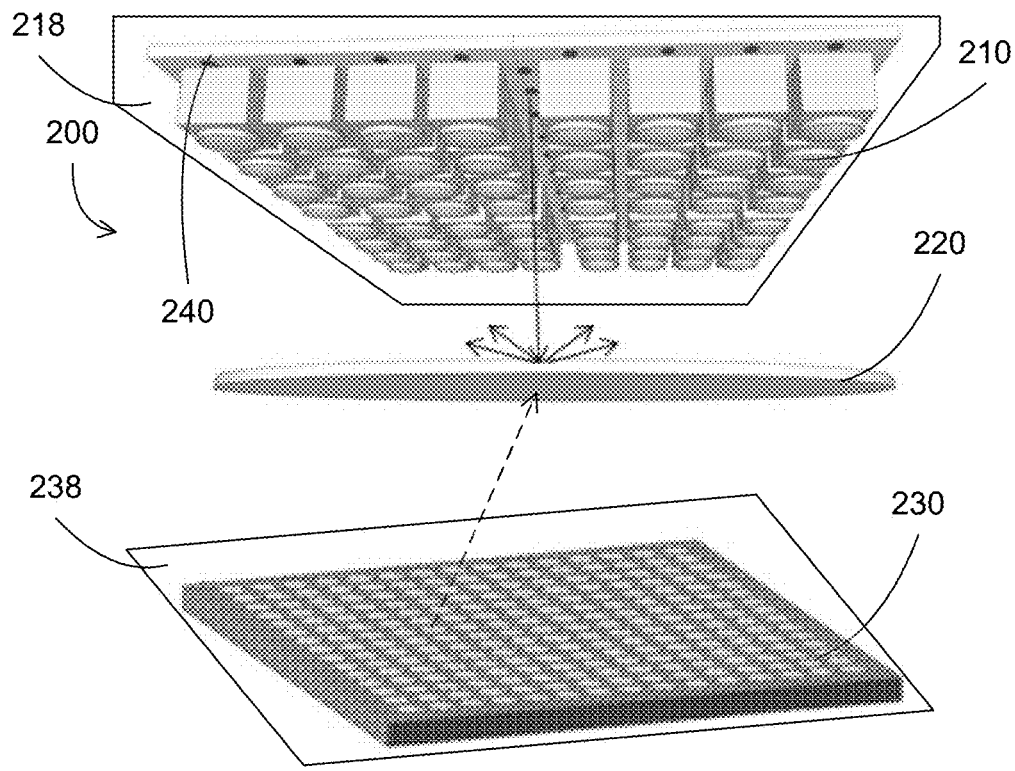
FIGS. 2A-2B illustrate a schematic MCAM system according to some embodiments.
Figure 2B:
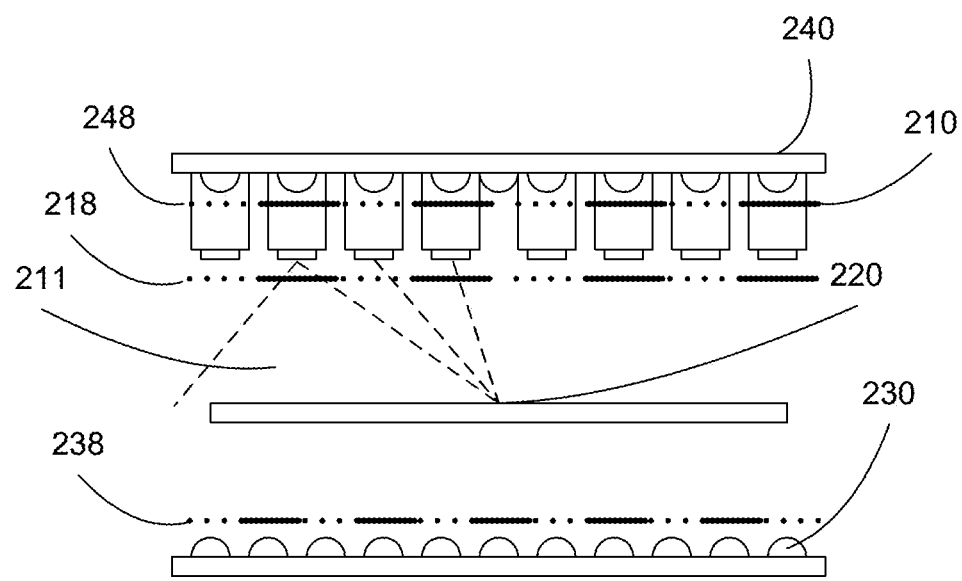

FIGS. 2A-2B illustrate a schematic MCAM system according to some embodiments. FIG. 2A shows a perspective view and FIG. 2B shows a cross section view of major components of an MCAM system 200.

The MCAM system 200 can include an array of cameras 210 and a patterned illumination source 230 and 240 for microscopic imaging. The cameras 210 are configured to image partially overlapping field of views (FOV) 211 of image areas of a sample 220. In some embodiments, the cameras can be configured to image non-overlapping FOVs. The patterned illumination source 230 and 240 can be configured to shine light on the sample 220 from a plurality of angles and spatial patterns, so that the spatial-angular distribution of light reaching the sample changes over time. At each illumination pattern in the spatial-angular distribution of light generated from the illumination source 230 and 240, each camera can acquire an image. The set of images acquired from the cameras for the image areas for the illumination patterns can be processed to form an image reconstruction of the sample. The image reconstruction can also offer at least a measure of sample depth, spectral (i.e., color) properties, the optical phase at the sample plane, or polarization properties.

The illumination source can include a bottom set of light sources 230, a top set of light sources 240, or both bottom and top sets of light sources 230 and 240. The illumination source can provide illumination patterns to the sample 220 of the MCAM system 200, in which there is either a transmission illumination through the bottom set of light sources 230, or a reflection illumination through the top set of light sources 240, disposed near the micro cameras. The illumination source can also provide a dual illumination geometry, in which there are a transmission illumination through the bottom set of light sources 230, and a reflection illumination through the top set of light sources 240.

An MCAM system can be configured to form a PCAM system by adding polarizer sheets 218, 228, and 248 for the camera array 210 and the illumination source 230, 240, respectively. For example, polarizer sheet 218 can be disposed to cover the lenses of the cameras in the camera array 210. The polarizer sheet 218 can be configured to have individual polarizers on the faces of the cameras, so that first cameras can capture lights of a first polarization, second cameras can capture lights of a second polarization, etc. For example, the polarizer sheet 218 can have a periodic polarizer array, which can turn the camera array into groups of polarized cameras.

Polarizer sheets 238 and 248 can be disposed to cover the light sources in the illumination source 230 and 240, respectively. The polarizer sheets 238 and 248 can be configured to have individual polarizers on the light sources, so that first light sources can generate lights of a first polarization, second light sources can generate lights of a second polarization, etc. For example, the polarizer sheets 238 and 248 can have a periodic polarizer array, which can turn the illumination source into groups of polarized light sources.

Figure 3:
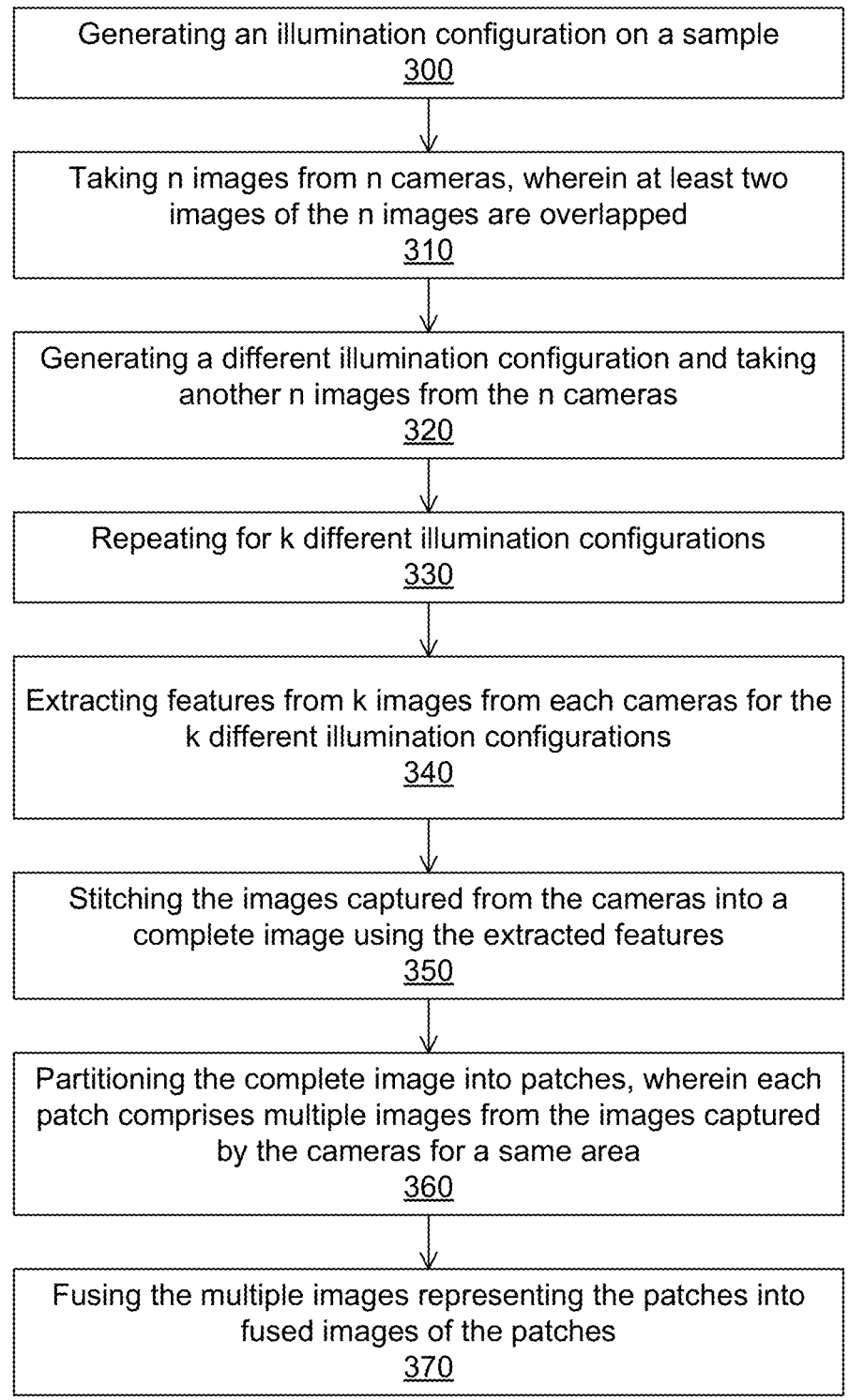
FIG. 3 illustrates a flow chart for operating an MCAM system according to some embodiments.

FIG. 3 illustrates a flow chart for operating an MCAM system according to some embodiments. The MCAM system can include a camera array and an illumination source, which are controlled by one or more controllers, such as a camera controller, an illumination controller, and a system controller. There are no polarizer sheets in MCAM system.

Operation 300 generates an illumination configuration or pattern on a sample. The illumination pattern can include one or more light sources from the illumination source. The illumination pattern can reach and interact with the sample, such as being partially or totally absorbed by the sample, being transmissive or reflective by the sample, depending on the location of the light sources, being scattered by the sample, or a combination of two or more interaction, such as partially absorbed and partially transmissive.

Operation 310 captures images from the cameras, for example, n images can be taken for a camera array having n cameras. The images can be overlapped, meaning adjacent cameras can capture some image data from a same image area. The images can also be non-overlapped and observe different areas of the sample. Movement of the sample by a sample stage can be used to bring the sample into view at different micro-cameras while multiple images are acquired by each micro-camera, such that the entire sample area may be observed within the captured image data for subsequent processing. The cameras can be positioned so that the camera array covers the whole sample, e.g., all areas of the sample are captured by one or more cameras.

Operation 320 generates a different illumination pattern and taking more images from the n cameras. Operation 330 repeats generating illumination patterns and taking images for k different illumination patterns. Each illumination pattern can be different and the set of illumination patterns can be configured to provide complete information of the sample to be captured by the cameras. After k illumination patterns, there can be n sets of images, with each set of images captured by a same camera and having k images representing k illumination patterns.

The MCAM system can capture multiple sets of images of the sample by the camera array under the multiple illumination patterns. Each set of images includes images of a different area of the sample captured by a different camera of the camera array, where an area of the images captured by a camera partially overlapped with one or more areas of the images captured by other cameras. Further, each image in the set of images is captured under a different illumination pattern.

Operation 340 extracts and describes features to form feature descriptors from the sets of images captured by each cameras under the different illumination patterns. A feature can be described by a descriptor.

Operation 350 stitches the images captured from the cameras into a set of sample images using the descriptors of the extracted features. A sample image is an image representing an area of interest on the sample. In some embodiments, the sample image can be considered as the image of the whole sample, since the whole sample is typically imaged. In some embodiments, only an area of interest on the sample is imaged.

The sample image is typically large, e.g., larger than an image captured by a camera of the camera array. Further, the sample image is configured, e.g., positioned in the microscope, in such as way so that the images captured by the camera array cover the area of interest on the sample, e.g., stitching the images captured by the camera array can allow the formation of sample image.

Further, each illumination pattern can produce a sample image, for example, by stitching the images captured by the cameras of the camera array. Thus, by stitching n×k images captured by n cameras in the camera array under k illumination patterns, a set of k sample images can be generated, with each sample image formed by stitching images captured by n cameras under one illumination pattern.

The feature descriptors in each image can be matched against feature descriptors in other images, and the images can be transformed to allow the overlapping of the matched descriptors to form the complete image. After the stitching process, the complete image can be a set of complete image members, e.g., having one complete image member for each illumination pattern.

A first step in the stitching process can include matching the identified descriptors in each set of images of the multiple sets of images. The descriptors have been extracted and described for the features on the sets of images. The matching of descriptors can allow the alignment of the sets of images to form a set of sample images. After matching the descriptors, the sets of images can be aligned to form a set of sample images.

The identification and matching of descriptors can be performed on sets of images, or alternatively, on individual images. For sets of images, two images can be stitched together, even though there are no matched features on the two images. The two images can be stitched together based on the matching of the descriptors, which can perform the alignment for all images in the sets of images.

Operation 360 partitions the set of complete images into patches. The partition process can partition a sample image into multiple patches. Thus, the partition process can partition the set of sample images into multiple sets of patches, with each patch in a set of patches being the same partitioned area in each sample image of the set of sample images. The patch partition can be selected to simplify the reconstruction of fused images from the sets of patches.

Each set of patches can include multiple patches, with a patch being the area portion on a sample image of the set of sample images. A patch can be a portion of a sample image, which can be smaller than the image captured by a camera. Thus, an image captured by a camera can include one or more patches. A patch can be at an overlapped area between multiple cameras, and thus there can be multiple patches representing an area on the sample image that is captured by multiple cameras. For example, if the patch is at the overlapped area of 2 cameras, there are two patches in a sample images stitched together from all cameras for a particular illumination pattern. For k illumination patterns, a set of patches can include 2 k patches, for areas of the sample overlapped by two cameras.

Operation 370 fuses the multiple patches in each set of patches into fused patches. For example, the patches in a set of patches can be fused together to form a fused image of the patch. The fusing process thus can produce a high resolution image for the patches.

Each set of k images from each camera can be fused, e.g., processed to combine into one image. Since each image of the set contains different information about the image area, such as the transmissive or reflective light data and the scattered light data from different light angles, images in the set can be processed to combine this information to a fused image carrying both intensity and phase information.

In the fusing process, a complex function S, e.g., having intensity and phase information, representing the sample area, can be determined from the set of k images. When an image of the sample area is captured by a camera, only the intensity is captured, e.g., the phase information is lost to the camera, and a 2D image is formed to represent the 3D sample with finite thickness. By taking a set of images with different illumination patterns representing lights having different phases reaching the camera, the phase information can be reconstructed to generate a representation of the 3D sample with finite thickness.

For example, the sample area represented by the set of k images can be described as a complex function S. The MCAM system can capture k images of the sample area, meaning the complex function S is transformed into a set of k images M through a system matrix T that describes the MCAM image formation process, which can be determined from the geometry of the MCAM setup, including the light paths from the light sources to the camera.

$$M = \|T \cdot S\|^2 + n$$

The set of k images M is the result of the transformation of the system matrix M with the sample function S. Here, the absolute square term is due to the ability to detect only intensity by the camera, and n is an additive Gaussian noise.

The sample function S can be calculated from the above function by solving the inverse problem. A possible approach for the inverse problem is to minimize the mean-squared error between the measured magnitudes and an estimate of the sample function. Another possible approach is to minimize a related negative log-likelihood function, which is based on a Poisson noise prior. Another possible approach is to treat the problem as a cost function, using appropriate minimization algorithms, such as Douglas-Rachford algorithm.

In some embodiments, an approach for the inverse problem is to solve the minimization problem by constructing an Augmented Lagrangian and then minimizing the Augmented Lagrangian with gradient descent. In some embodiments, the inverse problem can be solved using an iterative optimization strategy that first determines the gradients, or the gradients and the Hessians, and then applying a Gauss-Newton method. In some embodiments, the sample may be fluorescent and function S can be a real, positive-valued function, and a minimization method similar to those used in structured illumination fluorescent microscopes to determine a high-resolution sample can be used. The image reconstructions process can also include an estimate of the sample height, the sample phase, and its spectral color content.

The fused patches can then be assembled to produce a final, large, high-resolution image reconstruction of the sample. The final image can include a measurement of depth at different spatial locations across the image. The final image can include a measurement of the optical phase at different spatial locations across the image. The final image can include a measurement of multi-spectral content at different spatial locations across the image.

In some embodiments, the present invention discloses a polarization imaging process suitable for a microscope with a camera array and an illumination source. The camera array can include camera units with different polarizers to control the polarization of the image that the camera can capture. The illumination source can include light source units with different polarizers to control the polarization of the light shining on the sample.

The polarization imaging process can have a benefit of a new ability to rapidly record high-resolution polarimetric imagery over a very large field of view. This capability can open up new directions for scientific discovery—allowing for polarimetric video of large and/or freely moving organisms over more than just several square centimeters. It also provides a more efficient manner to obtain polarimetric information from large, flat objects (e.g., semiconductor wafers, sheets of glass, plastic components) for defect inspection purposes.

In some embodiments, the present invention discloses a method of illumination-controlled polarization imaging, which includes controlling the polarization states of the incoming light, together with the ability to capture multiple polarized images simultaneously.

For example, the captured images can include multiple polarized sets of images, such as 0 degree, 90 degree, 45 or 135 degree, left or right circular polarized images, or unpolarized images, taken from a configuration involving a same sample area and multiple polarized cameras, with each sets of image further having a different pattern of polarized light, such as 0 degree, 90 degree, 45 or 135 degree, left or right circular polarized light, or unpolarized light.

In some embodiments, the illumination-controlled polarization imaging can be used in polarized computational microscopes such as polarized micro-camera array microscopes (PCAM), which can share many common components with the micro-camera array microscopes (MCAM).

Figure 4A:
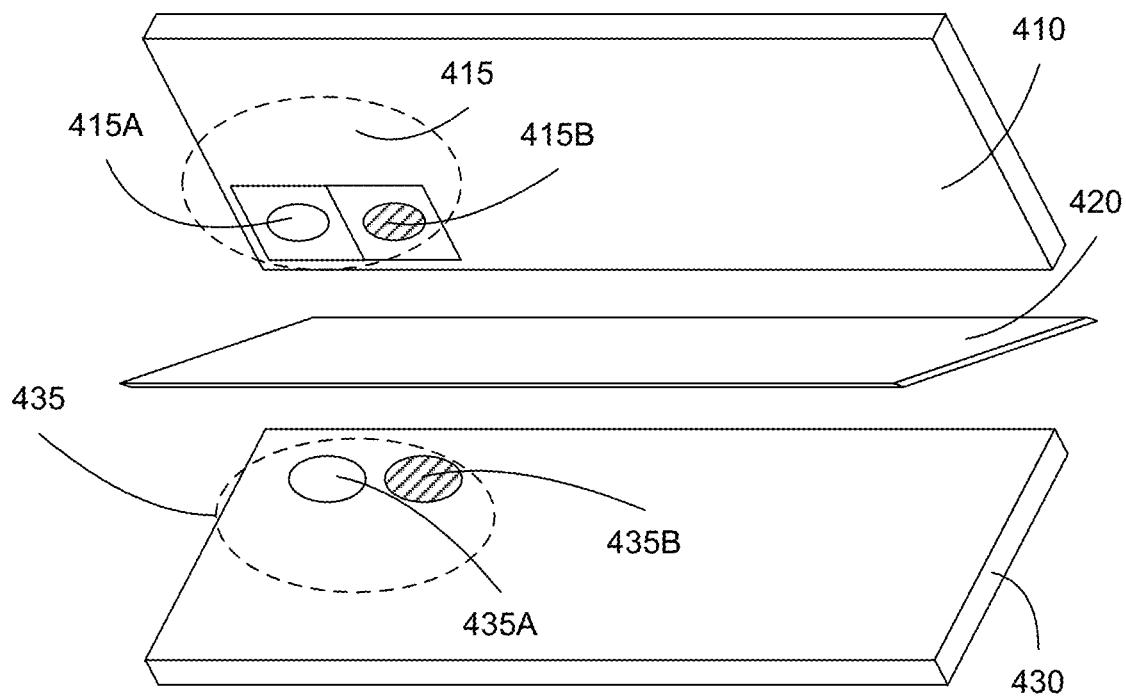
FIGS. 4A-4G illustrate a configuration for a PCAM system according to some embodiments.
Figure 4B:
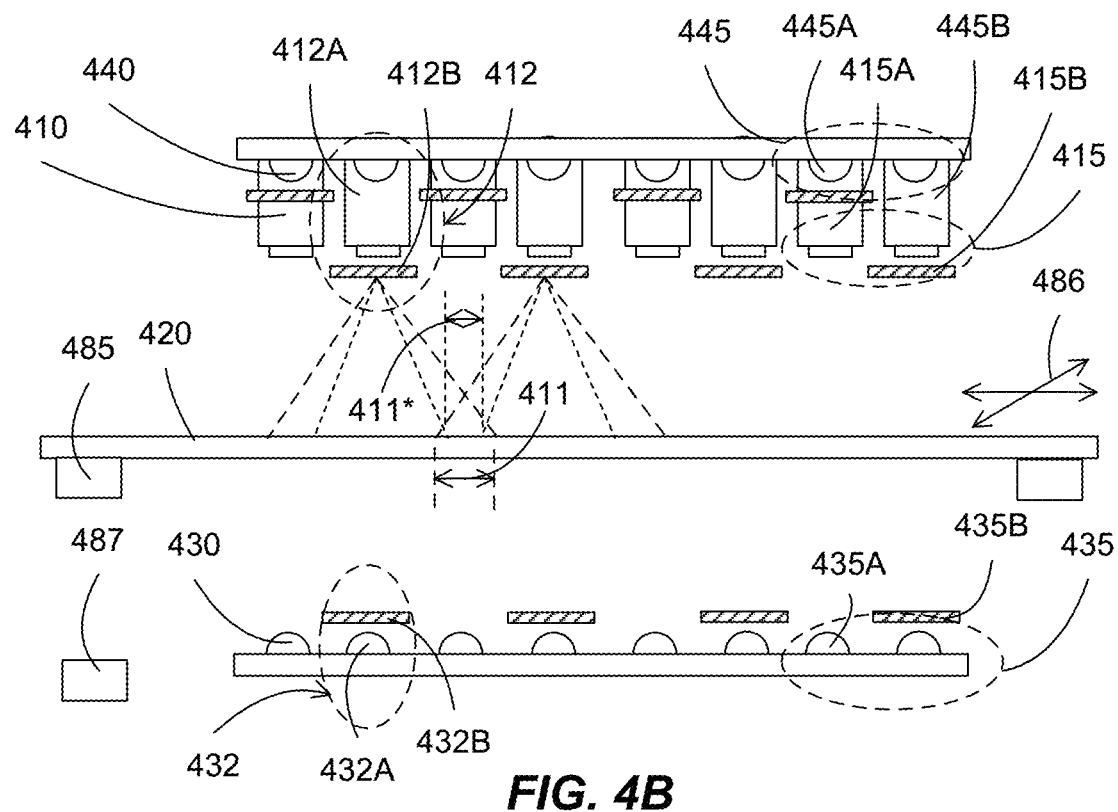

FIGS. 4A-4G illustrate a configuration for a PCAM system according to some embodiments. FIG. 4A shows a perspective view and FIG. 4B shows a cross section view of a PCAM system.

A PCAM system can include an array of different polarized camera units 410 focused on a large sample 420 under the illumination of an array of light source units 430 and 440 such as LEDs. A controller can be used to control the illumination system to provide different polarization illumination patterns to the sample.

Each polarized camera unit in the camera array can focus on a sample area, with non-overlapping areas 411* (e.g., the gap between the fields of view of two adjacent camera units) or overlapping areas 411 (e.g., the area of the sample overlapped by the fields of view of two adjacent camera units) with nearby same-polarized camera unit to allow for stitching. Each polarized camera can acquire multiple images under different polarization illumination conditions. The captured images can be stitched together to form a high dimension polarized image reconstruction of the sample.

In some embodiments, the camera units are configured to have overlapped fields of view, e.g., an area of the sample is overlapped between the fields of view of two adjacent camera units so that the same area of the overlapped sample is captured by multiple camera units, e.g., by the adjacent camera units. Since the images of the overlapped area are from a same sample area, the individual images captured by the multiple camera units can be processed to form a composite image representing the area of the sample captured by the multiple camera units. They can also be directly compared to assess polarimetric properties of the same sample area. They can also be used to compute polarimetric quantities for each spatial location of the same sample area. For example, features in the overlapped area can be identified, and then the individual images are transformed, such as translated, rotated, enlarged or reduced, to that the features of the overlapped area in the multiple individual images are matched. After the transformation to match the features in the overlapped area, the individual images can be combined, such as placed next to each other so that the features are on top of each other. As such, the overlapping configuration of the camera units can allow the multiple individual camera units to generate a complete image of the sample, with each camera unit capturing an overlapped image of a portion of the sample. A controller 487 can be included for performing the stitching process.

In some embodiments, the camera units are configured to have non-overlapped fields of view, e.g., there are gaps between the fields of view of adjacent camera units so that there are portions of the sample not imaged by the camera units. The non-overlapping configuration can be used for discrete samples, such as for well cell culture plates in which different samples are placed in different wells in a well cell culture plate. Since only the wells are of interest, the images captured by the camera units can be non-overlapped.

In some embodiments, a scanning process can be utilized to image a continuous sample area using camera units that are configured to have non-overlapped fields of view. For the scanning process, the sample can be supported by a sample stage 485 that is configured to be movable relative to the camera units, e.g., either a moving mechanism is coupled to the sample stage to move the sample, or another moving mechanism is coupled to the camera units to move the camera units. The moving mechanism can form a scanning microscope, with successive image captures by the camera units when the sample moves, such as in one or two lateral directions 486 parallel to the sample surface. The movements of the sample can be designed so that the successive captured images are overlapped, and the overlapped images can be stitched together to form a composite image of the sample. A controller 487 can be included for controlling the sample movements, together with forming the stitching process.

In some embodiments, the camera units are configured to have non-overlapped fields of view and a scanning process can be utilized to ensure that multiple specific sample areas are imaged by more than one camera unit. For example, the camera units can be arranged into 2×2 groups of 4 camera units, where 1 camera within the group has a polarization filter arranged to capture polarization state 1, a second camera within the group has a polarization filter arranged to capture polarization state 2, a third camera within the group has a polarization filter arranged to capture polarization state 3, and a fourth camera within the group has a polarization filter arranged to capture polarization state 4. The camera array can be comprised of one or more such camera groups. In some embodiments, the camera array includes 6 such groups (24 cameras in total). The camera array can be configured to image discrete wells of a 24 well plate or one quarter of a 96 well plate. A scanning process can be used to move either the sample or the array to 4 unique positions over time, where at each position a snapshot is acquired by all cameras within the array. Using such a process, it is possible to capture images of the same sample area with all 4 polarization states from all 24 wells of the 24 well plate. One or more unique illumination patterns and/or illumination polarization states can be captured at each scan position.

In some embodiments, the camera array includes 12 such groups (48 cameras in total). The camera array can be configured to image discrete wells of a 48 well plate or half of a 96 well plate or an eighth of a 384 well plate. A scanning process can be used to move either the sample or the array to 4 unique positions over time, where at each position a snapshot is acquired by all cameras within the array. Using such a process, it is possible to capture images of the same sample area with all 4 polarization states from all 48 wells, all 96 wells, or all 384 wells via mechanically scanning across different well plate regions and repeating the step-by-step scanning process. One or more unique illumination patterns and/or illumination polarization states can be captured at each scan position.

In some embodiments, the camera array includes 24 such groups (96 cameras in total). The camera array can be configured to image discrete wells of a 96 well plate or 384 well plate. A scanning process can be used to move either the sample or the array to 4 unique positions over time, where at each position a snapshot is acquired by all cameras within the array. Using such a process, it is possible to capture images of the same sample area with all 4 polarization states from all 48 wells, all 96 wells, or all 384 wells via mechanically scanning across different well plate regions and repeating the step-by-step scanning process. One or more unique illumination patterns and/or illumination polarization states can be captured at each scan position.

In some embodiments, the cameras and sample can remain stationary, and the set of polarization filters used to filter for each polarization state can be mechanically scanned. Within the preferred embodiment of having groups of 2×2 cameras capturing 4 polarization states, the set of polarization filters can be scanned in a 2×2 grid (4 scanned positions total). At each position, the scanned filter array will allow each camera within the 2×2 group to detect a unique polarization state. After scanning the filter array to 4 unique positions and capturing an image with all cameras within the array, a total of 4 polarization states will be captured by all cameras within the array, thus allowing for acquisition of information on 4 polarization states from all sample areas that are simultaneously within the field-of-view of the camera array. Scanning of the sample or the camera array may then be implemented, and the above process can be repeated to capture multiple polarization states about a new set of specimen areas in parallel. One or more unique illumination patterns and/or illumination polarization states can be captured at each scan position with this filter scanning procedure as well.

In some embodiments, the camera units are configured to have non-overlapped fields of view and a scanning process is utilized to capture a continuous macroscopic area to ensure that multiple polarization states are captured for all sample areas. For example, camera units can be arranged into 2×2 groups of 4 camera units, where 1 camera within the group has a polarization filter arranged to capture polarization state 1, a second camera within the group has a polarization filter arranged to capture polarization state 2, a third camera within the group has a polarization filter arranged to capture polarization state 3, and a fourth camera within the group has a polarization filter arranged to capture polarization state 4. In a non-overlapping fields of view configuration, we can consider two specific areas on the sample—Area A, which is imaged by 1 camera within the group, and Area B, which is not imaged by any of the cameras within the group (it is in a space between the fields-of-view of the multiple cameras). At one snapshot, Area A can be captured by camera 1 under one or more patterns of illumination. Scanning can then be used to bring Area B into the field-of-view of camera 1 and Area B can be captured by camera 1 under one or more patterns of illumination. If the cameras are configured appropriately, the same scanning action can bring Area A into the field-of-view of camera 2, for example, and Area B can be simultaneously captured by camera 2 (i.e., polarization state 2) under one or more patterns of illumination. Scanning and capture can be repeated until all areas that fall under the 2×2 camera group are captured by all 4 camera units (i.e., all 4 polarization states are captured for all areas). With more than one 2×2 camera groups comprising the entire camera array, multiple polarization states can be rapidly captured for a macroscopically large sample area.

The polarization imaging process from variably illuminated light patterns starts by capturing k sets of variably-illuminated images. The variably illuminated light patterns include multiple illumination patterns with light sources having a same polarization state. For example, the illumination patterns can include different configurations of unpolarized (e.g., randomly polarized, or with the polarization state randomly changing as a function of time) light source units. Alternatively, the illumination patterns can include different configurations of left or right circular polarized light source units.

In general, the illumination source can include k groups of light source units, with each group 435 having one or more light source units 435A and 435B configured to generate lights having different polarization states. As an example, a group of light source units can have 2 light source units, with one configured to generate unpolarized light, and the other configured to generate left circular polarized light. In this diagram, just one group is shown, although in practice there are multiple groups of illumination sources. Other configurations can be used, such as 3, 4, or 5 light sources units configured to generate lights with different polarization states such as zero degree polarized light, 90 degree polarized light, 45 or 135 degree polarized light, left or right circular polarized light, and unpolarized light.

A light source unit 432 can include a light source 432A with a polarizer 432B. For unpolarized light source unit, there is no polarizer. For 0 degree polarized light source unit, the polarizer can be a 0 degree polarizer. For 90 or 45 degree polarized light source unit, the polarizer can be a 90 or 45 degree polarizer, respectively. For circular polarized light source unit, the polarizer can be a linear polarizer with a quarter wave plate.

If the light source unit having a predetermined polarization state in each group of light sources is activated one at a time, there can be k illumination patterns of the predetermined polarization state for an illumination source having k groups of light source units. For example, an illumination source can have 50 groups of light source units, with each light source unit having an unpolarized light source unit and a left circular polarized light source unit. When the unpolarized light source units are activated one at a time, there are 50 illumination patterns for unpolarized light. When the left circular polarized light source units are activated one at a time, there are 50 illumination patterns for left circular polarized light.

In some embodiments, different illumination patterns can be provided by a programmable array of light source units, with different sets of one or more light source units activated to emit optical radiation to illuminate the sample for each captured image set. The programmable light source array can include light source units that are at different positions above or below the sample, as well as light source units that emit different frequencies (i.e., colors) of radiation and polarization states. The light source units can include light emitting diodes (LEDs), individual lasers, laser diodes, spatial light modulators or other electronically controllable light emission elements, with polarizers to generate polarized lights.

The variably-illuminated images can be captured by a camera array, with each camera unit in the camera array capturing an image. The captured images can be sorted based on the polarization state of the camera units. There can be multiple sets of images, with each set of images includes images captured by camera units having the same polarization state.

In general, the camera array can include n groups of camera units, with each group 415 having one or more camera units 415A and 415B configured to capture images having different polarization states. As an example, a group of camera units can have 2 camera units, with one configured to capture 0 degree polarized images, and the other configured to capture 90 degree polarized images. Other configurations can be used, such as 3, 4, or 5 camera units configured to capture images with different polarization states such as zero degree polarized images, 90 degree polarized images, 45 or 135 degree polarized image, left or right circular polarized images, and unpolarized images. In this diagram, just one camera group is shown, although in practice there are multiple groups.

A camera unit 412 can include a camera 412A with a polarizer 412B. For unpolarized camera unit, there is no polarizer. For 0 degree polarized camera unit, the polarizer can be a 0 degree polarizer. For 40 or 45 degree polarized camera unit, the polarizer can be a 40 or 45 degree polarizer, respectively. For circular polarized camera unit, the polarizer can be a linear polarizer with a quarter wave plate.

The camera units in the camera array are all activated at a same time for each illumination pattern to capture an image. If there are n groups of camera units with m camera units in each group, there can be m sets of n images. The n images are captured by each camera unit with same polarization state in the nth group. Each set of images in the m sets of images has n images detected under the same polarization conditions.

For example, a camera array can have 50 groups of camera units, with each camera unit having a 0 degree polarized camera and a 90 degree polarized camera. Under one illumination pattern, there are 2 sets of 50 images. The first set of images includes 50 images captured by the 0 degree polarized cameras. The second set of images includes 50 images captured by the 90 degree polarized cameras.

Figure 4C:
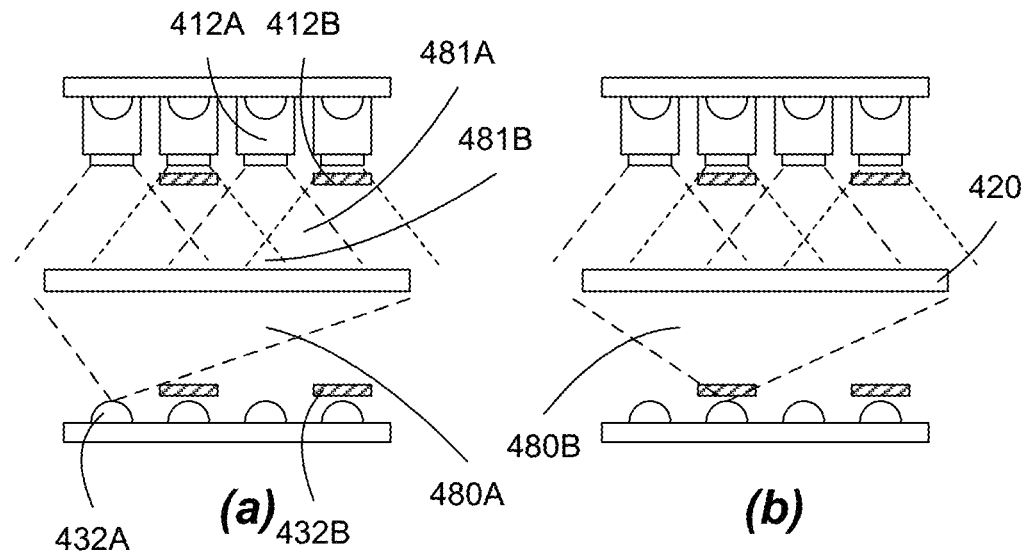

FIGS. 4C(a)-4C(b) show a process for operating a PCAM on a sample 420. The PCAM can include a camera array having multiple groups of camera units, with each group of camera units including two or more camera units 412A configured to capture images with different polarization, such as camera unit 412A captures images without any filter, and camera unit (which can be unfiltered camera unit 412A) capturing images through a polarized filter 412B. The PCAM can also include an illumination source, having multiple groups of light source units 432A, with wherein each group of light source units including two or more light source units configured to generate lights having different polarization to the sample. The multiple groups of light source units can be disposed above, below, or both above and below the sample.

The PCAM can also include a controller, which is configured to control the light source units to generate multiple illumination patterns, with the multiple illumination patterns including two or more single polarization illumination patterns 480A and 480B with each single polarization illumination pattern 480A or 480B generated by one or more light source units generating a same polarized light, such as light source unit 432A generates unfiltered light and light source unit (which can be unfiltered light source unit 432A) generates light through a polarized filter 432B. The controller is also configured to control the camera array to capture images of areas of the sample under each illumination pattern of the multiple illumination patterns, such as capturing images from camera unit 412A and from camera unit (which can be unfiltered camera unit 412A) capturing images through a polarized filter 412B.

The controller is also configured to form multiple sets of images of the sample with each set of images including the images captured by camera units of the camera array having a same polarization and under an illumination pattern of light source units generating a same polarized light. For example, a first set of images includes images captured by camera unit 412A under a first illumination pattern 480A. A second set of images includes images captured by camera unit having filter 412B also under the first illumination pattern 480A. A third set of images includes images captured by camera unit 412A under a second illumination pattern 480B. A fourth set of images includes images captured by camera unit having filter 412B under the second illumination pattern 480B.

In some embodiments, the multiple sets of images can be formed through a sequence of capturing images of the sample under the each of the multiple single polarization illumination patterns, e.g., an illumination pattern of light source units generating a same polarized light, such as illumination pattern 480A or illumination pattern 480B.

For example, the sequence can include generating a first illumination pattern of light source units generating a same polarized light 480A. Images of the sample 420 are then captured by the camera array, e.g., by all camera units in the camera array, such as unfiltered camera unit 412A and camera unit having filter 412B. A second illumination pattern of light source units generating a same polarized light 480B is then provided to the sample. Images of the sample 420 are then captured by the camera array, e.g., by all camera units in the camera array, such as unfiltered camera unit 412A and camera unit having filter 412B.

The camera units can have overlapped fields of view. The overlapping filed of view 481B between two camera units can be between two camera units having the same polarization, such as between two camera units 412. The overlapping field of view between two camera units 481A can be between two camera units having different polarization, such as between camera units 412 and camera unit having filter 412B.

The overlap 481B between same polarization camera units can allow stitching of the images captured by the same polarization camera units. For example, at least two adjacent images captured by two different camera units 412A are stitched together using an overlapped image portion 481A between the at least two adjacent images.

The overlap 481A can allow a formation of a composite image, which is an image of the sample, by stitching the images captured by the camera units having a same polarization, such as camera units 412A or camera units having filter 412B.

Figure 4D:
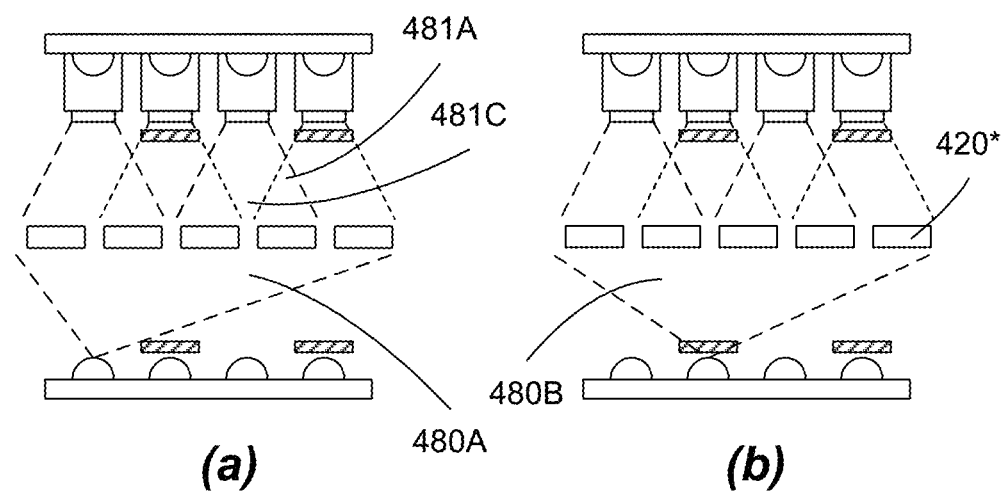

FIGS. 4D(a)-4D(b) show a process for operating a PCAM having a controller on a sample 420* which includes a well plate having multiple wells. The controller is configured to form multiple sets of images of the sample with each set of images including the images captured by camera units of the camera array having a same polarization and under an illumination pattern of light source units generating a same polarized light. The multiple sets of images can be formed through a sequence of capturing images of the sample under the each of the multiple single polarization illumination patterns, e.g., an illumination pattern of light source units generating a same polarized light, such as illumination pattern 480A or illumination pattern 480B.

The camera units can have an overlapped field of view 481A between two camera units having different polarization, such as between camera units 412 and camera unit having filter 412B. There is a non-overlapping gap 481C between two camera units having the same polarization, such as between two camera units 412.

The non-overlap gap 481C between same polarization camera units does not allow stitching of the images, e.g., the captured images remain individual images. However, for well plate, the stitching is not necessary, and thus, non-overlap gap is acceptable.

Figure 4E:
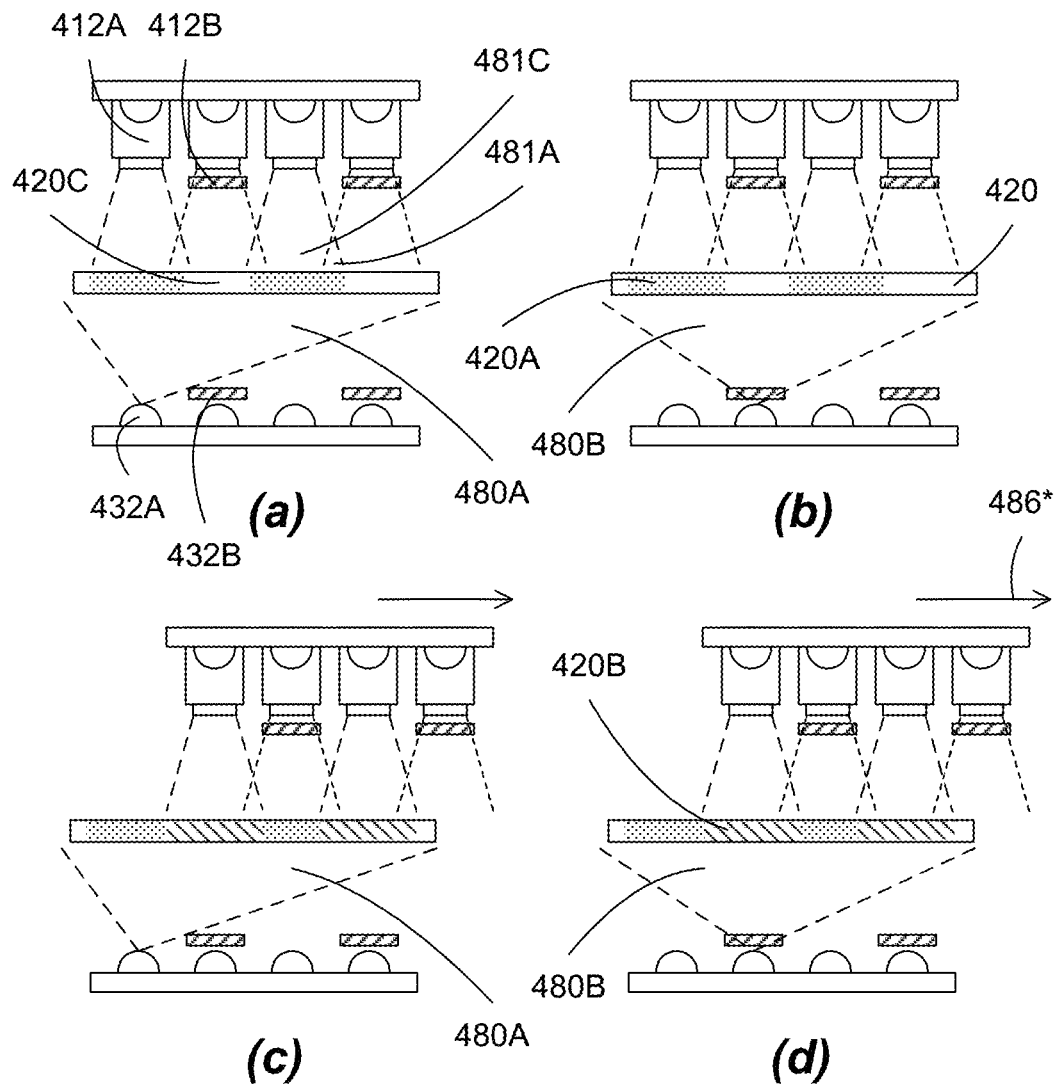

FIGS. 4E(a)-4E(d) show a process for operating a PCAM on a sample 420. The PCAM can have a moving mechanism coupled to either the camera array or to the sample stage for moving the camera array relative to the sample. For example, the moving mechanism can be coupled to the camera array for moving the camera array while the sample is stationary. Alternatively, the moving mechanism can be coupled to the sample stage for moving the sample while the camera is stationary. Alternatively, a first moving mechanism can be coupled to the camera array and a second moving mechanism can be coupled to the sample stage for moving the camera array and the sample independently. The PCAM can have a controller configured to control the moving mechanism, such as to move the camera array or the sample stage between multiple scanned positions.

In some embodiments, the scanned positions are discrete, e.g., the camera array stays at a first scanned position, then moves to a second scanned positions which is a distance from the first scanned position. Afterward, the camera array can return to the first scanned position, or can move to a third scanned position.

In some embodiments, the scanned positions are configured to provide overlap fields of view between two camera units, such as between two camera units having a same polarization. In some embodiments, the scanned positions can be configured to provide overlap fields of view between two camera units having different polarization. The multiple scanned positions can allow the camera array to scan through the sample with the captured images having overlap portions, for example, to allow image stitching.

In some embodiments, the PCAM includes a controller configured to form multiple sets of images of the sample with each set of images including the images captured by camera units of the camera array having a same polarization and under an illumination pattern of light source units generating a same polarized light.

In some embodiments, the multiple sets of images can be formed by moving the camera array or the sample between one or more scanned positions, and by capturing images of the sample under the multiple illumination patterns at each of the one or more scanned positions. For example, at a first scanned position, a first illumination pattern with light source units having a first polarized light is provided to the sample. The camera units then capture images of the sample. A second illumination pattern with light source units having a second polarized light is provided to the sample. The camera units then capture images of the sample.

Then, at a second scanned position, a first illumination pattern with light source units having a first polarized light is provided to the sample. The camera units then capture images of the sample. A second illumination pattern with light source units having a second polarized light is provided to the sample. The camera units then capture images of the sample.

In some embodiments, the multiple sets of images can be formed through a sequence of generating each of the multiple single polarization illumination patterns, followed by capturing images of the sample under the each of the two or more single polarization illumination patterns. The sequence further includes moving the camera array or the sample, and followed by repeating the process of generating each of the multiple single polarization illumination patterns and capturing images of the sample at each single polarization illumination pattern.

For example, the sequence can include generating a first illumination pattern of light source units generating a same polarized light 480A. Images of the sample 420 are then captured by the camera array, e.g., by all camera units in the camera array, such as unfiltered camera unit 412A and camera unit having filter 412B (FIG. 4E(a)). A second illumination pattern of light source units generating a same polarized light 480B is then provided to the sample. Images of the sample 420 are then captured by the camera array, e.g., by all camera units in the camera array, such as unfiltered camera unit 412A and camera unit having filter 412B (FIG. 4E(b)).

The camera units can have non-overlapped fields of view, e.g., a non-overlap gap 481C between two camera units having the same polarization, such as between two camera units 412. Thus, the images captured by the camera units 412A do not cover the whole surface of the sample, e.g., the images 420A are captured by the camera units 412A with gap 420C due to the non-overlap gap.

The camera array can be configured to have an overlapping field of view 481A between two camera units having different polarization, such as between camera units 412 and camera unit having filter 412B. Since these camera units have different polarization, the overlap area does not allow the stitching process.

Next, the sequence can include moving the camera array or the sample to a new scanned position. For example, as shown, the camera array is moved 486* to a new scanned position, which is a position that allow the camera units 412 to capture images of the sample areas that are not captured in the previous scanned position. For example, camera units 412A are now positioned for capturing images of areas 420B, which correspond to the gap 420C at the non-overlapped field of view of camera units 412A.

At the new scanned position, the first illumination pattern of light source units generating a same polarized light 480A is provided to the sample. Images of the sample 420 are then captured by the camera array, e.g., by all camera units in the camera array, such as unfiltered camera unit 412A and camera unit having filter 412B (FIG. 4E(c)). The second illumination pattern of light source units generating a same polarized light 480B is then provided to the sample. Images of the sample 420 are then captured by the camera array, e.g., by all camera units in the camera array, such as unfiltered camera unit 412A and camera unit having filter 412B (FIG. 4E(d)).

Figure 4F:
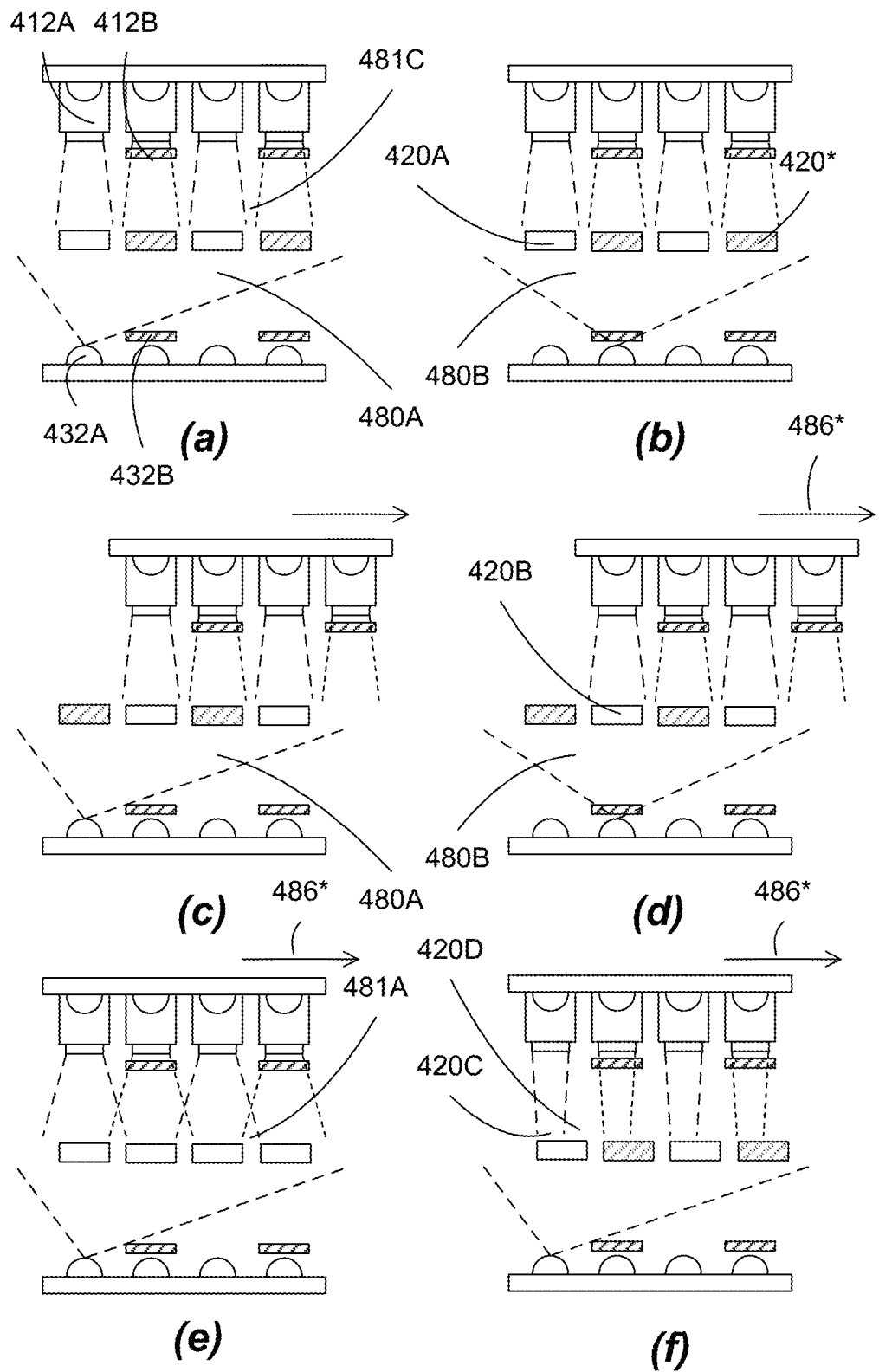

FIGS. 4F(a)-4F(f) show a process for operating a PCAM on a sample 420* which includes a well plate having multiple wells. The PCAM can have a moving mechanism coupled to either the camera array or to the sample stage for moving the camera array relative to the sample. In some embodiments, the scanned positions are discrete, e.g., the camera array stays at a first scanned position, then moves to a second scanned positions which is a distance from the first scanned position. The scanned positions can correspond to well locations, such as a camera unit 412 images a well 420A. Alternatively, the camera unit 412 can image only a portion of the well, and additional scanning positions are needed for imaging the whole well area.

An image capture sequence can include generating a first illumination pattern of light source units generating a same polarized light 480A. Images of the wells 420 are then captured by the camera array, e.g., by all camera units in the camera array, such as unfiltered camera unit 412A and camera unit having filter 412B (FIG. 4F(a)). A second illumination pattern of light source units generating a same polarized light 480B is then provided to the sample. Images of the wells 420 are then captured by the camera array, e.g., by all camera units in the camera array, such as unfiltered camera unit 412A and camera unit having filter 412B (FIG. 4F(b)).

The camera units can have non-overlapped fields of view, e.g., a non-overlap gap 481C between two camera units having the same polarization, such as between two camera units 412. The non-overlap gap is configured to be between wells, so the images captured by the camera units 412A cover surface of the wells 420A under the camera units, with some wells 420B not covered by the camera units.

Next, the sequence can include moving the camera array or the sample to a new scanned position. For example, as shown, the camera array is moved 486* to a new scanned position, which is a position that allow the camera units 412 to capture images of the well areas that are not captured in the previous scanned position. For example, camera units 412A are now positioned for capturing images of wells 420B.

At the new scanned position, the first illumination pattern of light source units generating a same polarized light 480A is provided to the sample. Images of the sample 420 are then captured by the camera array, e.g., by all camera units in the camera array, such as unfiltered camera unit 412A and camera unit having filter 412B (FIG. 4F(c)). The second illumination pattern of light source units generating a same polarized light 480B is then provided to the sample. Images of the sample 420 are then captured by the camera array, e.g., by all camera units in the camera array, such as unfiltered camera unit 412A and camera unit having filter 412B (FIG. 4F(d)).

FIG. 4F(e) shows another configuration of the PCAM system, in which the camera array can be configured to have an overlapping field of view 481A between two camera units having different polarization, such as between camera units 412 and camera unit having filter 412B. Operation of the PCAM configuration is similar, since the overlapped 481A does not affect the PCAM operation.

FIG. 4F(f) shows another configuration of the PCAM system, in which the camera units can be configured to image a portion 420C of the wells. Operation of the PCAM configuration is similar, with the scanned positions include the remaining portion 420D of the wells, together with the other wells not captured by the camera units 412A. For example, the moving mechanism can move the camera array to cover the remaining portion 420D, then move the camera array to cover the portion 420C of the next well, then move the camera array to cover the remaining portion 420D of the next well.

Figure 4G:
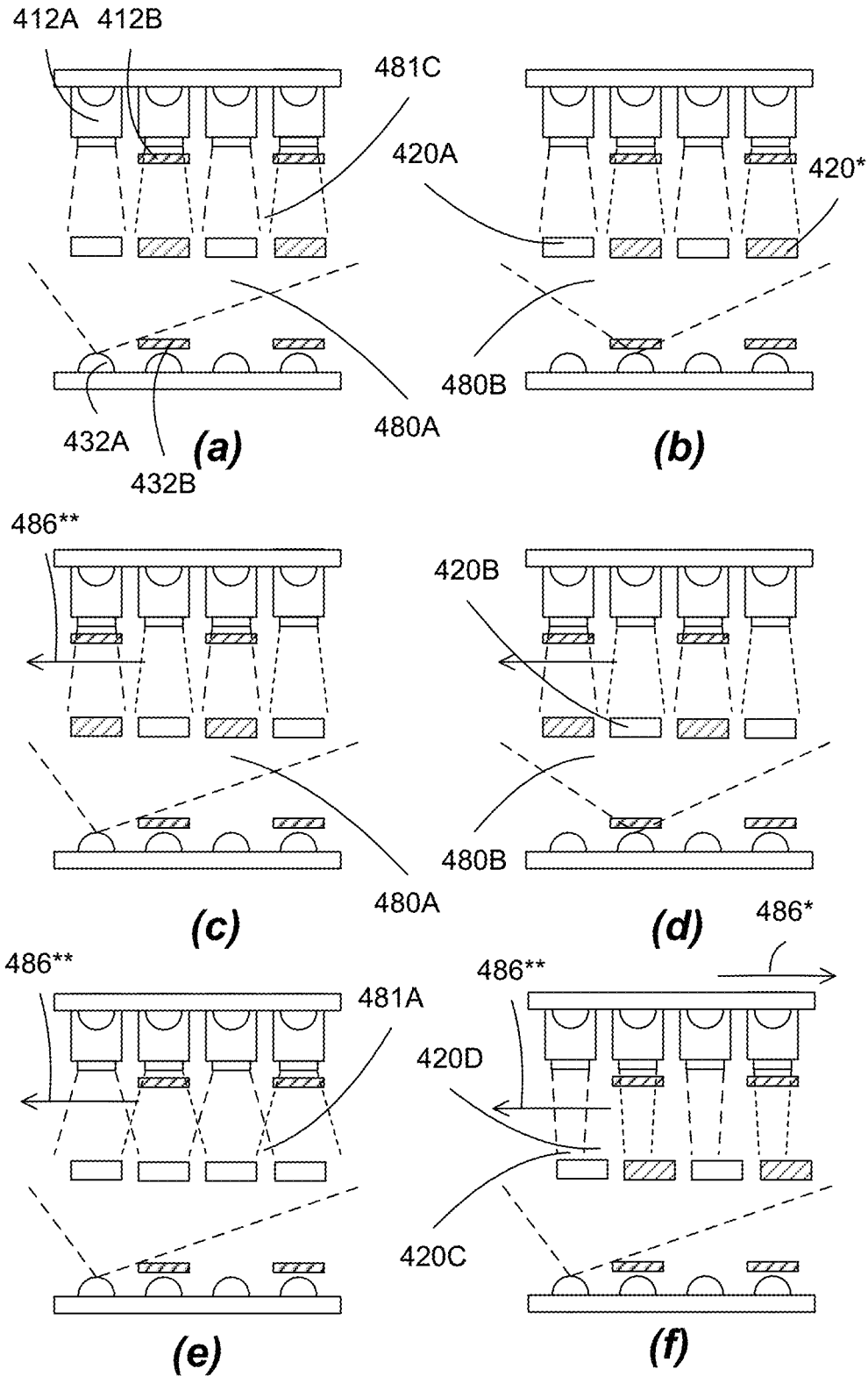

FIGS. 4G(a)-4G(f) show a process for operating a PCAM on a sample 420* which includes a well plate having multiple wells. The PCAM can have a moving mechanism coupled to a set of filters coupled to the camera units. For example, the set of filters can include filters 412B which are configured to disposed before the lenses of the camera units to change the polarization of the light reaching the camera units. All filters 412B can be coupled together to form the set of filters, which can allow the moving mechanism to change the polarization state of the camera units in the camera array. Multiple sets of filters can be used, with each set corresponding to a type of polarization. For example, a first set of filters can include 90 degree polarization filters. A second set of filters can include left circular polarization filters.

An image capture sequence can include generating a first illumination pattern of light source units generating a same polarized light 480A. Images of the wells 420 are then captured by the camera array, e.g., by all camera units in the camera array, such as unfiltered camera unit 412A and camera unit having filter 412B (FIG. 4G(a)). A second illumination pattern of light source units generating a same polarized light 480B is then provided to the sample. Images of the wells 420 are then captured by the camera array, e.g., by all camera units in the camera array, such as unfiltered camera unit 412A and camera unit having filter 412B (FIG. 4G(b)).

The camera units can have non-overlapped fields of view, e.g., a non-overlap gap 481C between two camera units having the same polarization, such as between two camera units 412. The non-overlap gap is configured to be between wells, so the images captured by the camera units 412A cover surface of the wells 420A under the camera units, with some wells 420B not covered by the camera units.

Next, the sequence can include moving the set of filters to a new scanned position. For example, as shown, the set of filters is moved 486** to a new scanned position, which is a position that allow the camera units 412 to capture images of the well areas that are not captured in the previous scanned position. For example, camera units 412A are now configured for capturing images of wells 420B.

At the new scanned position, the first illumination pattern of light source units generating a same polarized light 480A is provided to the sample. Images of the sample 420 are then captured by the camera array, e.g., by all camera units in the camera array, such as unfiltered camera unit 412A and camera unit having filter 412B (FIG. 4G(c)). The second illumination pattern of light source units generating a same polarized light 480B is then provided to the sample. Images of the sample 420 are then captured by the camera array, e.g., by all camera units in the camera array, such as unfiltered camera unit 412A and camera unit having filter 412B (FIG. 4G(d)).

FIG. 4G(e) shows another configuration of the PCAM system, in which the camera array can be configured to have an overlapping field of view 481A between two camera units having different polarization, such as between camera units 412 and camera unit having filter 412B. Operation of the PCAM configuration is similar, since the overlapped 481A does not affect the PCAM operation.

FIG. 4G(f) shows another configuration of the PCAM system, in which the camera units can be configured to image a portion 420C of the wells. Operation of the PCAM configuration is similar, with the scanned positions include scanning the remaining portion 420D of the wells performed by moving the set of filters, together with scanning the other wells not captured by the camera units 412A by moving the camera array or the sample. For example, a first moving mechanism can move 486\* the camera array to cover the remaining portion 420D. The first moving mechanism can move 486\* the camera array back to cover the portion 420C while a second moving mechanism move **486\*\* the set of filters to cover the portion 420C not covered before. The first moving mechanism can move 486\* the camera array to cover the remaining portion 420D**. at the new position of the set of filters.

Figure 5A:
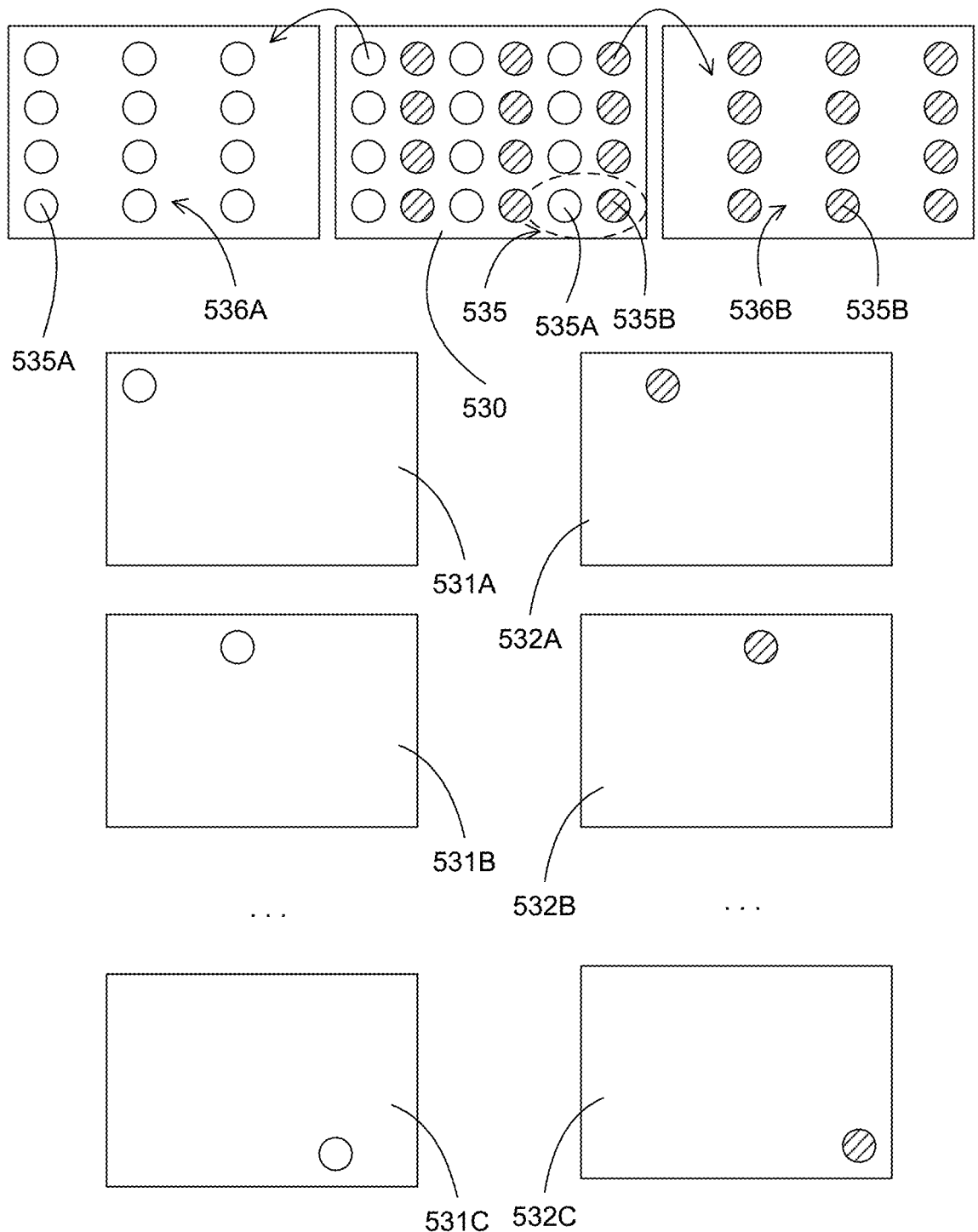
FIGS. 5A-5B illustrate illumination sources for a PCAM system according to some embodiments.
Figure 5B:
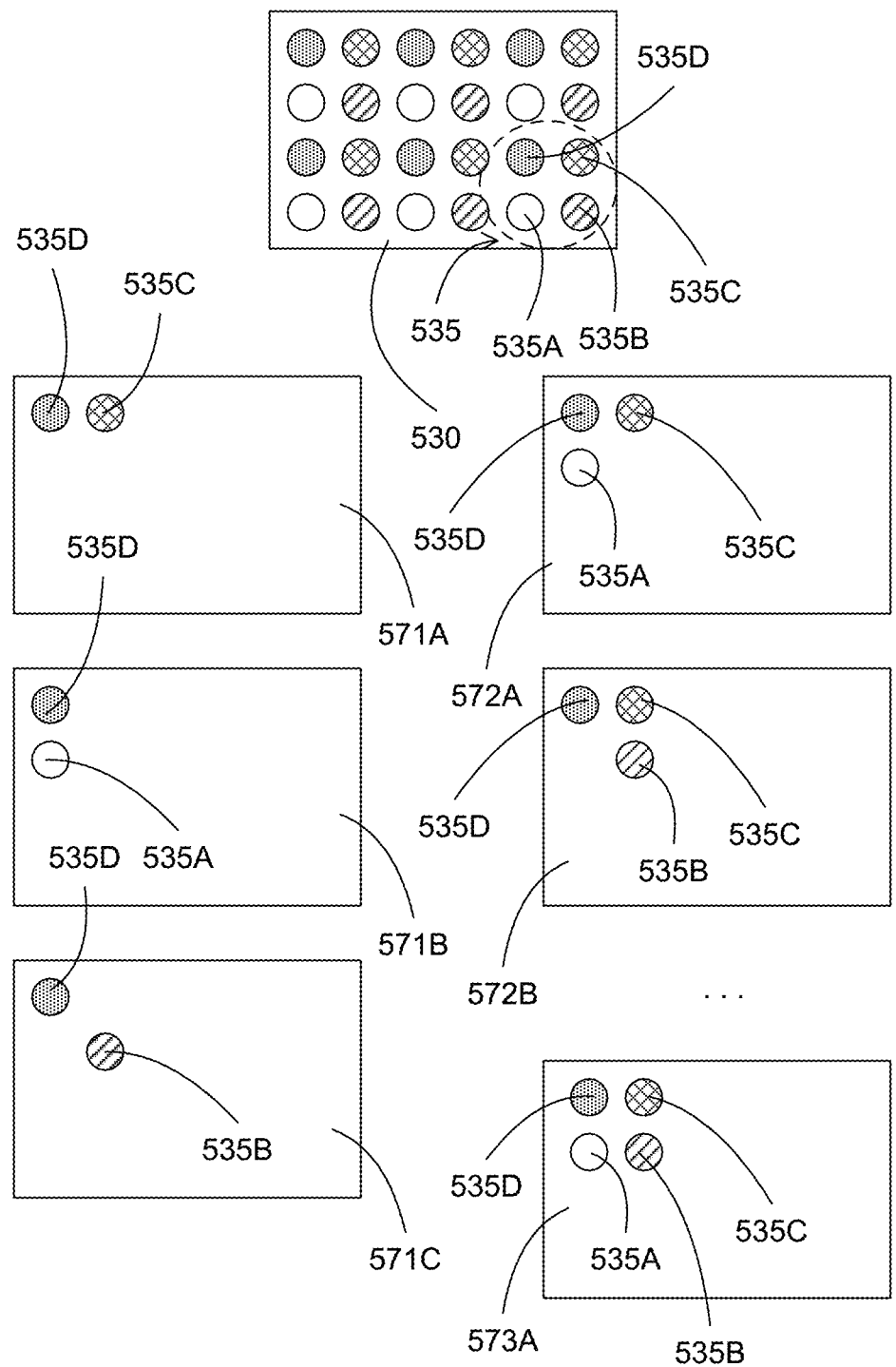

FIGS. 5A-5B illustrate illumination sources for a PCAM system according to some embodiments. In FIG. 5A, an illumination source 530 can include multiple groups of light source units. The illumination source 530 can be disposed under the sample of the PCAM, which can provide transmissive light to the sample. The illumination source 530 can be disposed on top of the sample, with form factor modification to accommodate the camera array.

As shown, a group 535 includes 2 light source units 535A and 535B. For example, the light source unit 535A can be an unpolarized light source unit, and the light source unit 535B can be a left or right circular polarized light source unit. There can be other configurations for the group of light source units, such as groups of light source units having 3, 4, 5 different polarized light source units, for example, of unpolarized, 0 degree, 90 degree, 45 degree, and right circular polarized light source units.

With the group 535 of light source units having 2 different polarized light source units, there can be 3 different types of polarized light supplied to the sample. For example, as shown, there can be light having a first polarization state, which can provide an illumination pattern 536A, in which all light source units 535A having a same first polarization state are activated. Other illumination patterns can be used for the light source unit 535A. For example, if there are k light source units 535A, there can be k illumination patterns 531A, 531B, . . . , 531C, in which one different light source unit 535A is activated in each illumination pattern.

The set of illumination patterns involving one type of light source units 535A in the groups of light source units 535 can provide a same first polarized light input to the sample.

If the group 535 of light source units having 2 different polarized light source units, there can be light having a second polarization state, which can provide an illumination pattern 536B, in which all light source units 535B having a same second polarization state are activated. Other illumination patterns can be used for the light source unit 535B. For example, if there are k light source units 535B, there can be k illumination patterns 532A, 532B, . . . , 532C, in which one different light source unit 535B is activated in each illumination pattern.

The set of illumination patterns involving one type of light source units 535B in the groups of light source units 535 can provide a same second polarized light input to the sample.

If the group 535 of light source units having 2 different polarized light source units, there can be light having a third polarization state, which is a combination of the first and second polarization states as discussed above. In this configuration, all light source units 535A and 535B are activated.

Thus, in general, an illumination source can have k groups of light source units, with each group having p light source units having different polarization states. The illumination source thus can provide p polarized light inputs to the sample.

For example, if the illumination source has k groups of light source units, with each group having 4 light source units having different polarization states of 0 degree, 90 degree, 45 degree, and right circular polarized light source units, 4 different polarized inputs can be provided to the sample. The chosen 4 polarized inputs can satisfy the Mueller matrix formation, and the illumination source can be a part of a full Mueller matrix polarimeter.

If the illumination source has k groups of light source units, with each group having 5 light source units having different polarization states of unpolarized, 0 degree, 90 degree, 45 degree, and right circular polarized light source units, 5 different polarized inputs can be provided to the sample. The chosen 4 polarized inputs can satisfy the Mueller matrix formation, and the illumination source can form a full Mueller matrix polarimeter. The unpolarized input can turn the PCAM system into an MCAM system, which can provide image reconstructions of samples without polarization characteristics. Thus the illumination source having 5 different polarized inputs can allow one to toggle between an MCAM system and a full Mueller matrix PCAM system.

If the illumination source has k groups of light source units, with each group having 2 light source units having different polarization states of unpolarized and left (or right) circular polarized light source units, 2 different polarized inputs can be provided to the sample. The chosen 2 polarized inputs can only satisfy a portion of the Mueller matrix formation, and the illumination source can form a partial Mueller matrix polarimeter. However, the two polarization states of unpolarized and left or right circular polarized can be the most useful in terms of polarization characterization of materials and can provide a more cost effective solution as compared to a full Mueller PCAM system.

In FIG. 5B, an illumination source 530 can include multiple groups of light source units. As shown, a group 535 includes 4 light source units 535A, 535B, 535C, and 535D. For example, the light source unit 535A can be an unpolarized light source unit, the light source unit 535B can be a left or right circular polarized light source unit, the light source unit 535C can be a 90 degree polarized light source unit, and the light source unit 535D can be a 0 degree polarized light source unit. Other configurations can be used.

With the group 535 of light source units having 4 different polarized light source units, there can be 4 different types of single polarized light supplied to the sample, 4×3 different types of double polarized light supplied to the sample, 4×3×2 different types of triple polarized light supplied to the sample, and 4×3×2×1 different types of quadruple polarized light supplied to the sample. In the single polarized light configurations, light sources having a same polarization are activated. For example, different light sources 535A can be activated to form different illumination patterns involving one polarization state determined by the light sources.

In the double polarized light configurations, light sources having 2 different polarization are activated. For example, different number of light sources 535C and different number of light sources 535D can be activated to form different illumination patterns involving one polarization state determined by the light sources 535C and 535D. The polarization state can be the superposition of the polarization states of the light sources. An illumination pattern 571A can include one light source 535D and one light source 535C.

Similarly, an illumination pattern 571B can include one light source 535D and one light source 535A. An illumination pattern 571C can include one light source 535D and one light source 535B. Other illumination patterns can be generated for a superposition of two polarization states.

In the triple polarized light configurations, light sources having 3 different polarization are activated. For example, different number of light sources 535C, different number of light sources 535D and different number of light sources 535A can be activated to form different illumination patterns involving one polarization state determined by the light sources. The polarization state can be the superposition of the polarization states of the light sources 535C, 535D, and 535A. An illumination pattern 572A can include one light source 535D, one light source 535C, and one light source 535A.

Similarly, an illumination pattern 572B can include one light source 535D, one light source 535C, and one light source 535B. Other illumination patterns can be generated for a superposition of three polarization states.

In the quadruple polarized light configurations, light sources having different polarization are activated. For example, different number of light sources 535A, different number of light sources 535B, different number of light sources 535C, and different number of light sources 535D can be activated to form different illumination patterns involving one polarization state determined by the light sources. The polarization state can be the superposition of the polarization states of the light sources 535A, 535B, 535C, and 535D. An illumination pattern 573A can include one light source 535A, one light source 535B, one light source 535C, and one light source 535D.

Figure 6A:
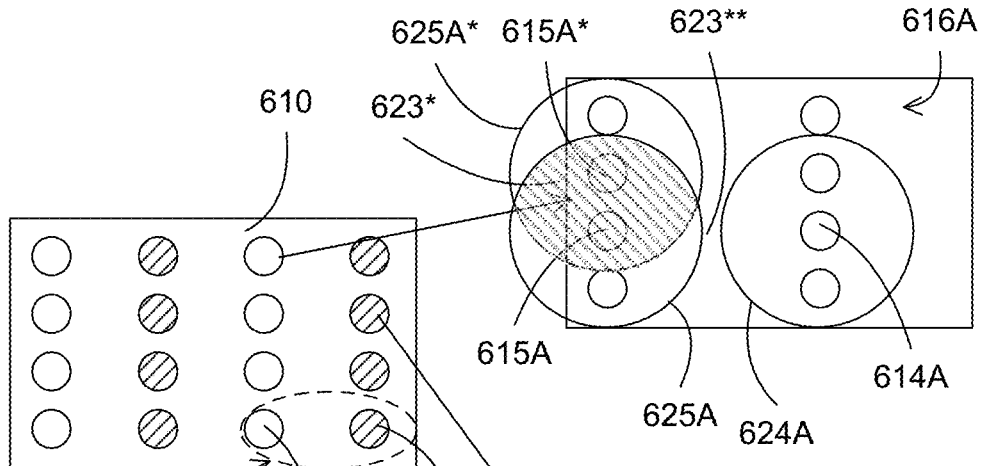
FIGS. 6A-6F illustrate camera arrays for a PCAM system according to some embodiments.

FIGS. 6A-6F illustrates a camera array for a PCAM system according to some embodiments. FIGS. 6A(a) and 6B(a) show a configuration for overlapping fields of view for the cameras. In FIG. 6A(a), a camera array 610 can include multiple groups of camera units. The camera array 610 can be configured to face the sample placed for inspection by the PCAM. The camera array 610 can be configured to accept an illumination source, which can be disposed in a vicinity of the camera array.

As shown, a group 615 includes 2 camera units 615A and 615B. For example, the camera unit 615A can be a zero degree polarized camera unit, and the camera unit 615B can be a 90 degree polarized camera unit. There can be other configurations for the group of camera units, such as groups of camera units having 3, 4, 5 different polarized camera units, for example, of unpolarized, 0 degree, 90 degree, 45 degree, and right circular polarized camera units.

With the group 615 of camera units having 2 different polarized camera units, there can be 2 different types of polarized images captured by the polarized cameras. For example, as shown, there can be images having a first polarization state, which can be captured by camera subarray 616A, in which all camera units 615A have a same first polarization state.

Figure 6B:
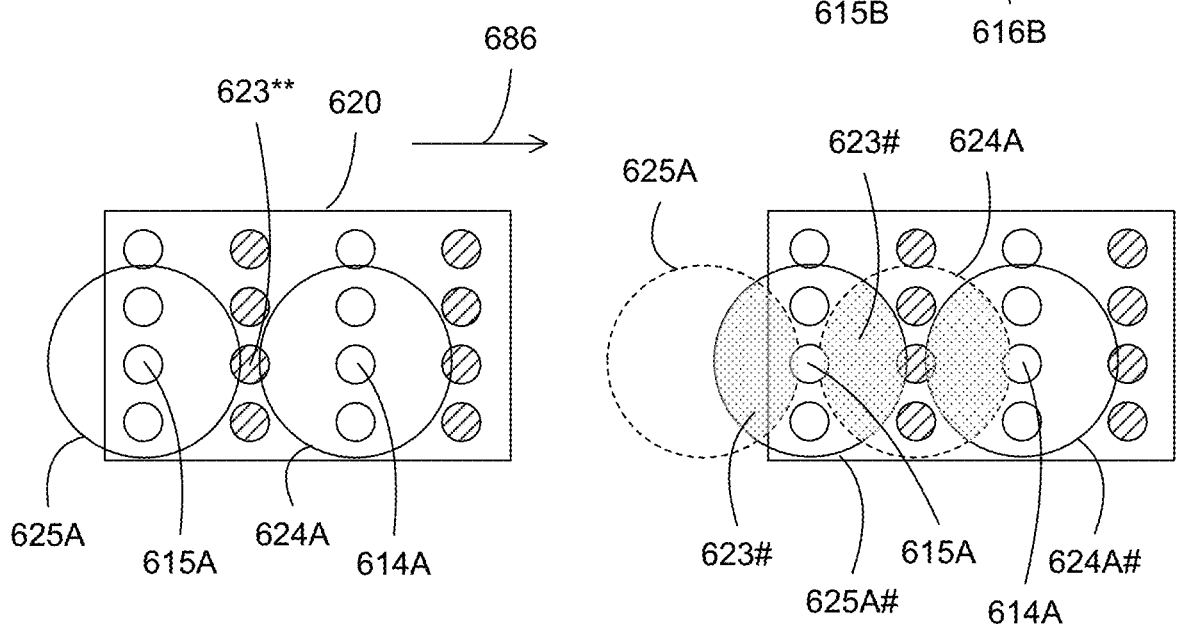
Figure 6A:
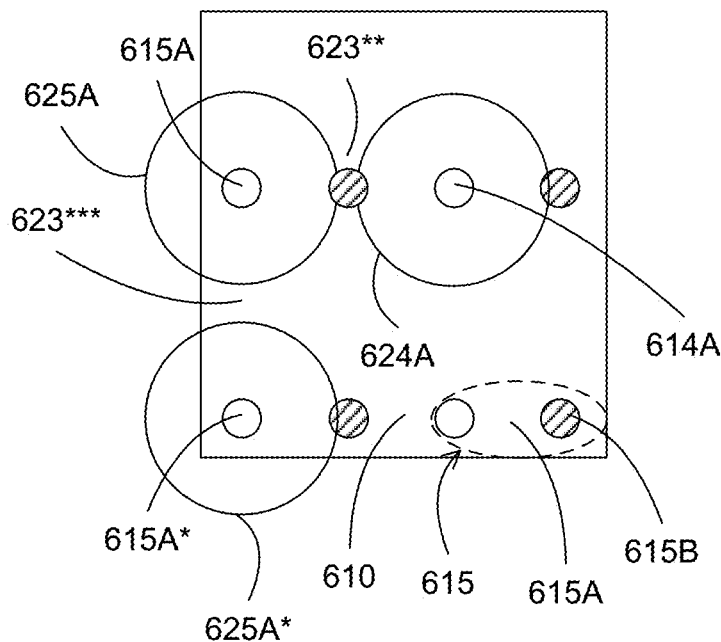
Figure 6B:
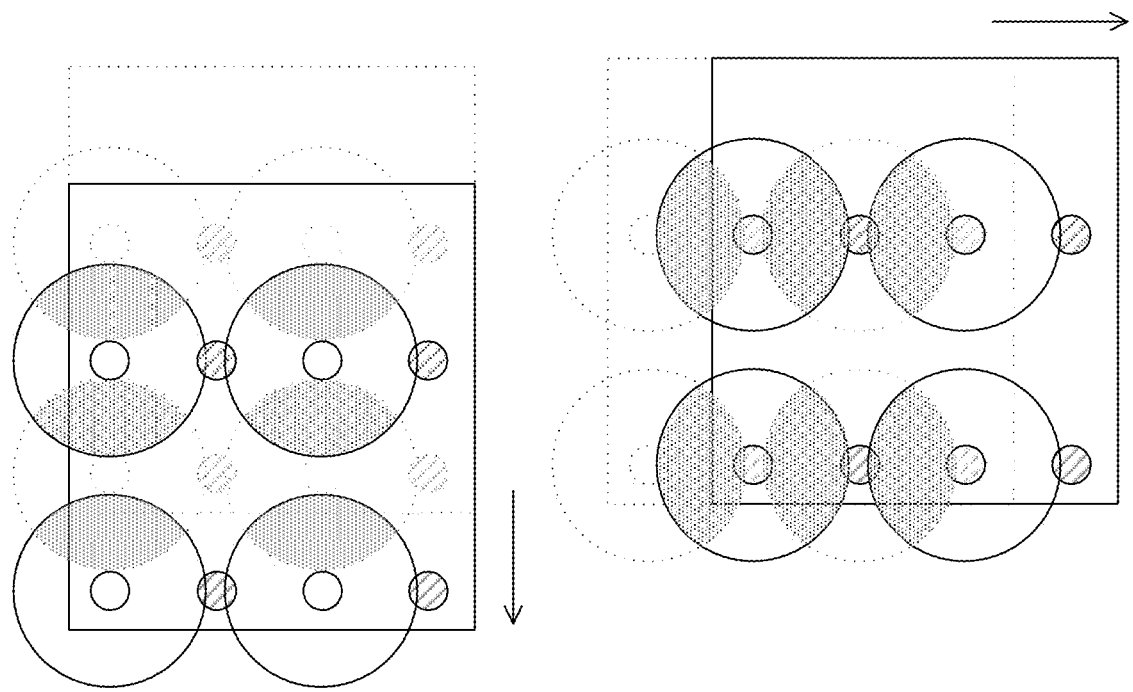

In FIG. 6B(a), the set of cameras forming the camera subarray involving one type of camera units 615A in the groups of camera units 615 can capture images having a same first polarization state of the sample. The camera units 615A can be positioned so that the image portions 625A and 624A of a sample 620, captured by 2 camera units 615A and 614A, are overlapped 623 in a lateral direction, such as a left-to-right direction. The camera units 615A can be positioned so that the image portions 625A and 625A* of a sample 620, captured by 2 camera units 615A and 615A*, are overlapped 623* in another lateral direction, such as a top-to-bottom direction. The overlapped portions 623 and 623* can allow the stitching of image portions 625A, 624A and 525A*, for example, by matching features extracted from the image portions.

The overlapped images 625A captured by cameras 615A (and 615A*) can be stitched together to form a complete image 626A of the sample, e.g., the area of interest on the sample.

If the group 615 of camera units having 2 different polarized camera units, there can be images having a second polarization state, which can be captured by camera subarray 616B, in which all camera units 615B have a same second polarization state.

The set of cameras forming a camera subarray involving one type of camera units 615B in the groups of camera units 615 can capture images having a same second polarization state of the sample. Similar to the positioning of camera units 615A, the camera units 615B can be positioned so that the image portions captured by 2 camera units are overlapped. The overlapped portion can allow the stitching of image portions, for example, by matching features extracted from the two image portions.

The overlapped images 625B captured by cameras 615B can be stitched together to form a complete image 626B of the sample, e.g., the area of interest on the sample.

FIGS. 6A(b) and 6B(b) show a configuration for non-overlapping field of views for the cameras in one direction, such as the left-to-right direction. In FIG. 6A(b), a camera array 610 can include multiple groups of camera units. The camera array can have multiple camera groups, with each group 615 having 2 camera units 615A and 615B. The camera units 615A and 615B are configured to form camera arrays 616A and 616B, respectively. As shown, the camera array 616A formed by the camera units 615A has a same configuration as the camera array 616B formed by the camera units 615B. In some embodiments, the camera arrays formed by camera units in a same group can be different from each other.

The camera units are configured to have overlapped fields of view in one direction, such as the top-to-bottom direction as shown. For example, camera units 615A and 615A* have fields of view 625A and 625A*, respectively, that are overlapped 623*. The camera units are configured to have non-overlapped fields of view in another direction, such as the left-to-right direction as shown. For example, camera units 615A and 614A have fields of view 625A and 624A, respectively, that are non-overlapped 623, e.g., there is the gap 623 indicating an area that images are not captured by the camera units.

In FIG. 6B(b), the sample 620 can be scanned, e.g., the sample stage moves relative to the camera array so that a same camera unit can capture a different area of the sample. The sample can be scanned in the direction of non-overlapping fields of view, such as in the left-to-right direction as shown. With the scanning ability, the non-overlapping camera configuration can be processed to provide the overlapping camera configuration.

For example, at one position of the sample, the camera units can be configured to capture images of the sample. As shown, camera units 615A and 614A can capture images corresponded to the fields of view 625A and 624A, respectively. There is a gap 613** between the captured images. The sample 620 can move to another position, for example, in the direction 686 configured to provide overlapping fields of views for the camera units. For example, the direction 686 can be from left to right as shown, corresponded to the non-overlapping camera unit direction. Alternatively, the scanning direction can be right to left, or can be any direction including a left-to-right or a right-to-left component.

At the new position, the camera units 615A and 614A can capture images corresponded to the fields of view 625A # and 624A #, respectively. A controller can then process the previously captured images 625A and 624A, together with the currently captured images 625A # and 614A #, which can provide overlapping areas 623 #. The overlapping areas can allow a stitching of images, e.g., transforming the captured images based on the overlapping areas to merge the captured images into a composite image. Thus, the images captured by a scanning step can be used to form a composite image.

FIGS. 6A(c) and 6B(c) show a configuration for non-overlapping field of views for the cameras in two directions, such as the left-to-right direction and the top-to-bottom direction. In FIG. 6A(c), a camera array 610 can include multiple groups of camera units. The camera array can have multiple camera groups, with each group 615 having 2 camera units 615A and 615B, with each type of camera units from the multiple camera groups configured to form a camera array. As shown, the camera array formed by the camera units 615A has a same configuration as the camera array formed by the camera units 615B. In some embodiments, the camera arrays formed by camera units in a same group can be different from each other.

The camera units are configured to have non-overlapped fields of view in two directions. For example, camera units 615A and 614A have fields of view 625A and 624A, respectively, that are non-overlapped 623, e.g., there is the gap 623 indicating an area that images are not captured by the camera units. Similarly, camera units 615A and 615A* have fields of view 625A and 625A*, respectively, that are non-overlapped 623*, e.g., there is the gap 623* indicating an area that images are not captured by the camera units.

In FIG. 6B(c), the sample 620 can be scanned, e.g., the sample stage moves relative to the camera array so that a same camera unit can capture a different area of the sample. The sample can be scanned in the directions of non-overlapping fields of view, such as in the top-to-bottom direction and in the left-to-right direction as shown. With the scanning ability, the non-overlapping camera configuration can be processed to provide the overlapping camera configuration.

Thus, in general, a camera array can have n groups of camera units, with each group having m camera units having different polarization states. The camera array thus can capture m different polarized images of areas of the sample.

For example, if the camera array has n groups of camera units, with each group having 4 camera units having different polarization states of 0 degree, 90 degree, 45 degree, and right circular polarized camera units, 4 different polarized images of the sample areas can be captured per illumination pattern. The chosen 4 polarized images of the sample areas can satisfy the Mueller matrix formation, and the camera array can be part of a full Mueller matrix polarimeter.

If the camera array has n groups of camera units, with each group having 5 camera units having different polarization states of unpolarized, 0 degree, 90 degree, 45 degree, and right circular polarized camera units, 5 different polarized images of the sample areas can be captured per illumination pattern. The chosen 4 polarized images of the sample areas can satisfy the Mueller matrix formation, and the camera array can form a full Mueller matrix polarimeter. The unpolarized images of the sample areas can turn the PCAM system into an MCAM system, which can provide image reconstructions of samples without polarization characteristics. Thus the camera array having 5 different polarized images of the sample areas can allow a toggle between an MCAM system and a full Mueller matrix PCAM system.

If the camera array has n groups of camera units, with each group having 2 camera units having different polarization states of zero degree and 90 degree polarized camera units, 2 different polarized images of the sample areas can be captured per illumination pattern. The chosen 2 polarized images of the sample areas can only satisfy a portion of the Mueller matrix formation, and the camera array can form a partial Mueller matrix polarimeter. However, the two polarization states of zero degree and 90 degree polarized can be the most useful in terms of polarization characterization of materials, and can provide a more cost effective solution as compared to a full Mueller PCAM system.

If the camera array has n groups of camera units, with each group having 3 camera units having different polarization states of unpolarized, zero degree and 90 degree polarized camera units, 3 different polarized images of the sample areas can be captured per illumination pattern. The chosen 3 polarized images of the sample areas can only satisfy a portion of the Mueller matrix formation, and the camera array can form a partial Mueller matrix polarimeter. However, the 3 polarization states of unpolarized, zero degree and 90 degree polarized can be the most useful in terms of polarization characterization of materials, for example, can allow a toggle between an MCAM system and a full Mueller matrix PCAM system.

In some embodiments, the number of camera units in a group of camera units can be minimized to improve the resolution of the microscope. For example, a higher number of first polarized camera units in a camera array having just the first polarized camera units, as compared to a camera array having the first polarized camera units and a second polarized camera units in groups of polarized camera units.

Figure 6C:
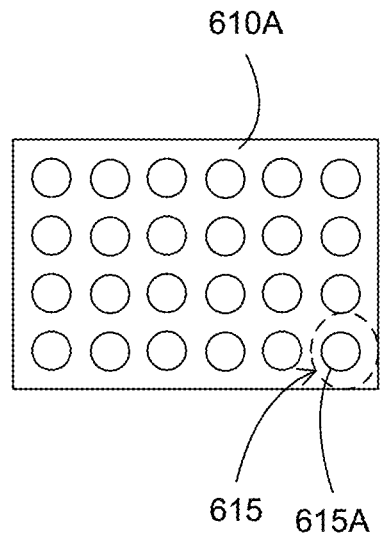

FIG. 6C shows a camera array 610A having a single type of polarized camera units. Thus, the camera array can include multiple groups of camera units 615, with each group of camera units having one type of polarized camera unit 615A.

Figure 6D:
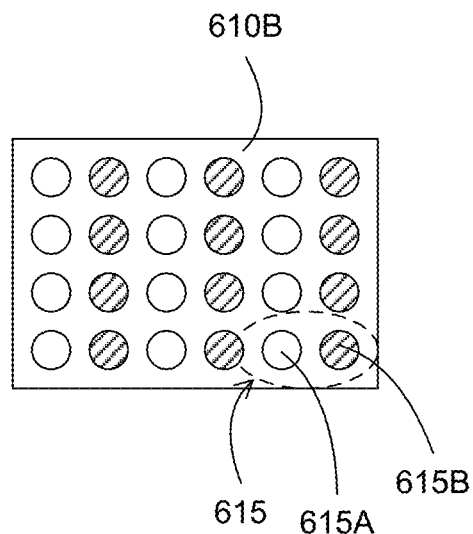

FIG. 6D shows a camera array 610B having two types of polarized camera units. Thus, the camera array can include multiple groups of camera units 615, with each group of camera units having one type of polarized camera unit 615A and one type of polarized camera unit 615B. The number of polarized camera units 615A in camera array 610A is 2× higher than the number of polarized camera units 615A in camera array 610B, which can allow images having higher resolution from camera array 610A. The trade off is the number of polarization states. Camera array 610A can capture images having one polarization state, while camera array 610B can capture images having two polarization states, but with lower resolution.

Figure 6E:
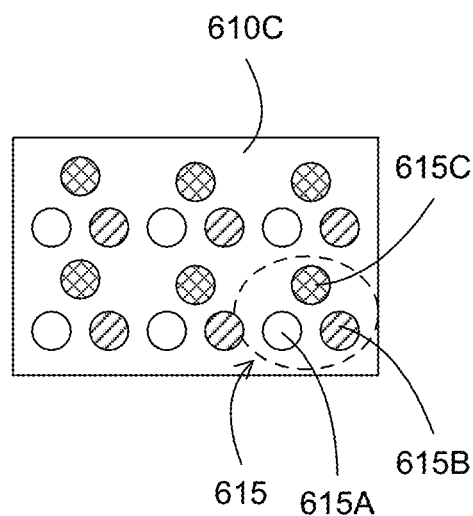

FIG. 6E shows a camera array 610C having three types of polarized camera units. Thus, the camera array can include multiple groups of camera units 615, with each group of camera units having one type of polarized camera unit 615A, one type of polarized camera unit 615B, and one type of polarized camera unit 615C.

Figure 6F:
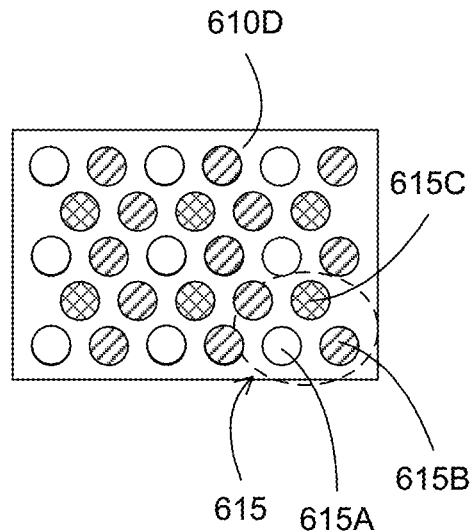

FIG. 6F shows a camera array 610D having three types of polarized camera units in a different configuration.

Figure 7:
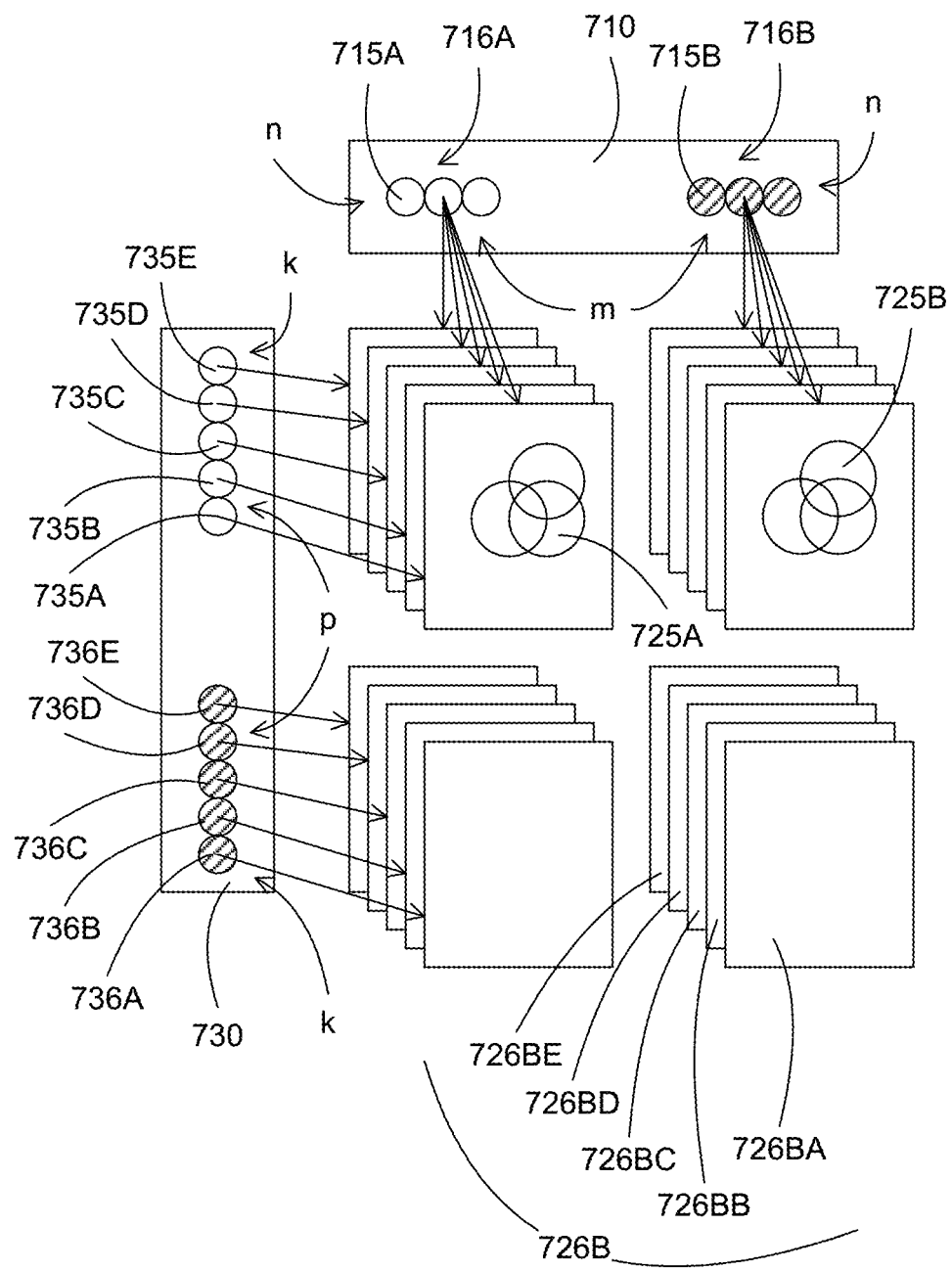
FIG. 7 illustrates an operation of a PCAM system according to some embodiments.

FIG. 7 illustrates an operation of a PCAM system according to some embodiments. A PCAM system can have an illumination source 730 and a camera array 710 for capturing images of portions of a sample. The illumination source 730 can include k=5 groups of light source units, with each group having p=2 light source units having different polarization states. As shown, there are k=5 light source units 735A, 735B, 735C, 735D, and 735E having a first polarization state, and there are k=5 light source units 736A, 736B, 736C, 736D, and 736E having a second polarization state. The light source units can form p=2 sets of light source units, with each set having k=5 light source units having a same polarization state.

The camera array 710 can include n=3 groups of camera units, with each group having m=2 camera units having different polarization states. As shown, there are n=3 camera units 715A having a first polarization state, and there are n=3 camera units 715B having a second polarization state. The camera units can form m=2 sets of camera units, with each set having n=3 camera units having a same polarization state, e.g., set 716A having n=3 camera units 715A, and set 716B having n=3 camera units 715B.

In operation, a first illumination pattern can include light source unit 735A. All camera units capture image of portions of the sample. For example, camera unit 715A of camera set 716A can capture image 725A of a portion of the sample. The image 725A has the polarization state of light source unit 735A and the image polarization state of camera 715A.

As shown, all camera units 715A in camera set 716A can capture images 725A of overlapped portions of the sample. Alternatively, the captured images 725A can be non-overlapped. Thus, a set of images 725A captured by n=3 camera units 716A can be stitched together to form a complete image of the sample. Similarly, all camera units 715B in camera set 716B can capture images 725B of overlapped portions of the sample. Thus, a set of images 725B captured by n=3 camera units 716B can be stitched together to form a complete image of the sample. Thus, under one illumination pattern generated by light source unit 735A, m=2 complete images of the sample are captured. For each complete image, there are n=3 images of portions of the sample captured by the camera units in the set of camera units.

The process can be repeated for the k=5 light source units 735A-735E, with all light source units having a same first polarization state. As a result, the camera array has captured m=2 sets of complete images of the sample, with each set of complete images having k=5 complete images. For each complete image, there are n=3 images of portions of the sample captured by the camera units in the set of camera units. All images have the first polarization state of the light source units. The first set of complete images has the first polarization state of the camera units. The second set of complete images has the second polarization state of the camera units.

The process can be repeated for the k=5 light source units 736A-736E, with all light source units having a same second polarization state. As a result, the camera array has captured m=2 sets of complete images of the sample, with each set of complete images having k=5 complete images. For each complete image, there are n=3 images of portions of the sample captured by the camera units in the set of camera units. All images have the second polarization state of the light source units. The first set of complete images has the first polarization state of the camera units. The second set of complete images has the second polarization state of the camera units. For example, a set 726B of complete images can have complete images 726BA-726BE.

Thus, after all illumination patterns of p polarization states, there are m×p sets of complete images of the sample, with each set having k complete images. A complete image has n=3 images of portions of the sample captured by the camera units in the set of camera units.

Figure 8:
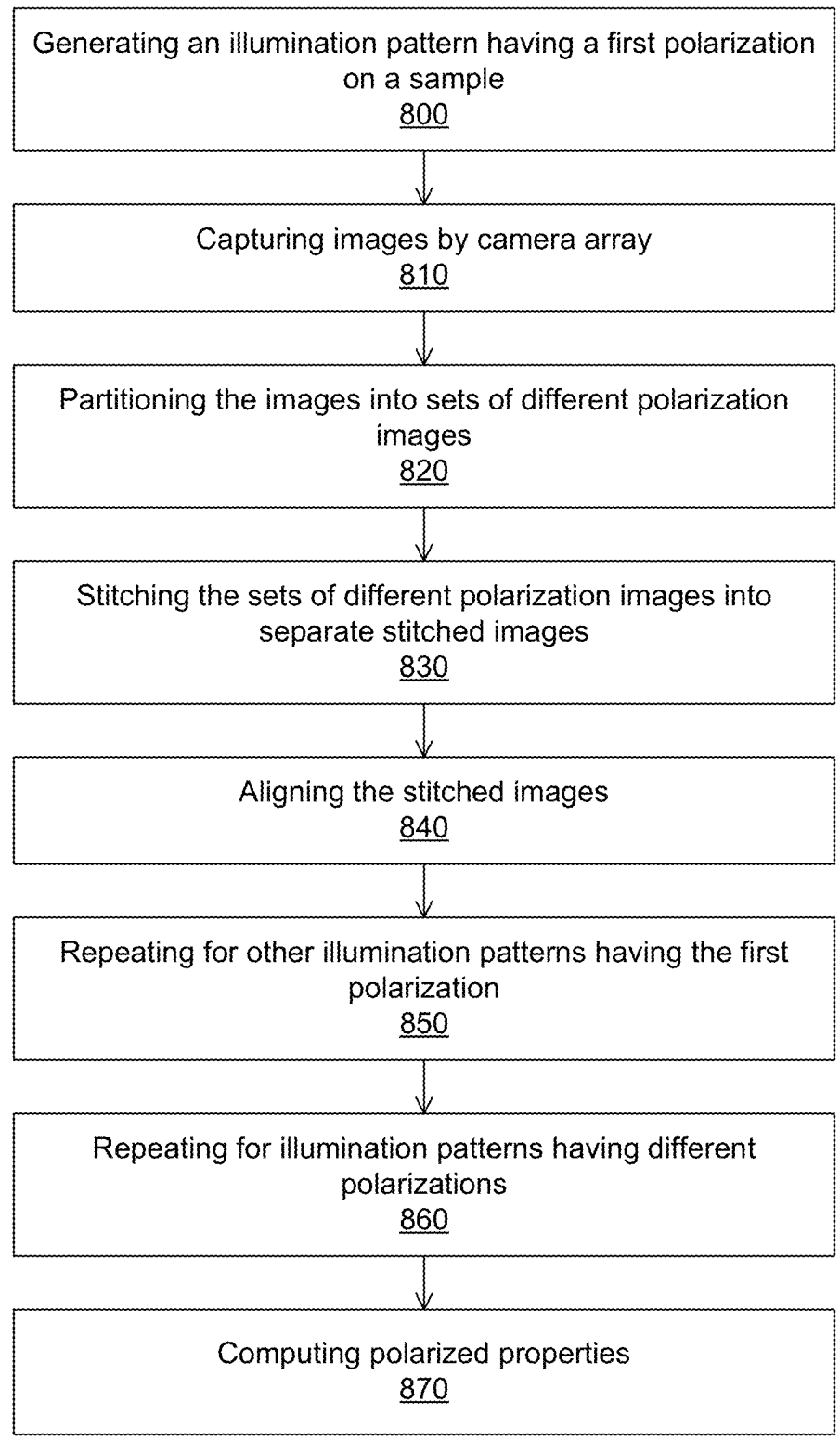
FIG. 8 illustrates a flow chart for operating a PCAM system according to some embodiments.

FIG. 8 illustrates a flow chart for operating a PCAM system according to some embodiments. The PCAM system can include a camera array and an illumination source, which are controlled by one or more controllers, such as a camera controller, an illumination controller, and a system controller. The camera array can include cameras with different polarizers. The illumination source can include light sources with different polarizers.

In operation, an illumination pattern of one or more light sources having a same polarization in the illumination source can be activated to provide polarized incident lights to the sample. The cameras in the camera array can all capture images of portions of the sample. The images are sorted based on the polarization states of the cameras. The images having a same polarization state, e.g., captured by cameras having a polarizer with the same polarization state and orientation, are stitched together to form an image of the sample. The stitching process can merge the individual images into an image of the whole sample, based on the overlapping portions between the images. The stitching process can include separate individual images, e.g., images of discrete and separate areas of the sample, if the cameras are configured for non-overlapping image captures. There can be m images of the sample, if there are m types of polarizers for the cameras.

The process can be repeated for other illumination patterns with the light sources having the same polarization state. If there are a total of k illumination patterns for a first polarization state, there are m sets of k images of the sample, with each set of images received the same light source polarization state, and different polarized imaging states from the cameras.

The process can be repeated for other illumination patterns with the light sources having a subsequent polarization state. If there are a total of k illumination patterns for a subsequent polarization state, there are m sets of k images of the sample, with each set of images received the same subsequent polarization state from the illumination, and different polarized imaging states from the cameras.

The images of the sample can be processed, such as fused together to form high dimensional image reconstructions of the sample, with different input polarization states and different captured polarization states. Polarization properties of the sample can be calculated from the image reconstructions, Operation 800 generates an illumination configuration or pattern on a sample. The illumination pattern can include one or more light sources having a first polarization state from the illumination source. The illumination pattern can reach and interact with the sample, such as being partially or totally absorbed by the sample, being transmissive or reflective by the sample, depending on the location of the light sources, being scattered by the sample, or a combination of two or more interaction, such as partially absorbed and partially transmissive.

Operation 810 captures images from the cameras, for example, n×m images can be taken for a camera array having n groups of cameras with each group having m cameras with different polarizers. The images can be non-overlapped or overlapped, meaning adjacent cameras can capture a same image area. The cameras can be positioned so that the cameras with same polarizers cover the whole sample, e.g., all areas of the sample are captured by one or more cameras. Alternatively, the cameras can be positioned to capture discrete areas of the sample.

Operation 820 partitions the n×m images, e.g., the n×m images can be sorted according to the camera polarizers, to provide m groups of n images with each group of images having the same input polarization state and captured polarization state.

Operation 830 stitches the sets of different polarization images into separate stitched images. For example, the n images in a group (of the m groups) with each group of images having the same input polarization state and captured polarization state are stitched together to form a complete image of the sample. There are m complete images of the sample, with each complete image having the same input polarization state, and each complete image having different captured polarization state.

Operation 840 aligns the stitched images. After the alignment, there are m complete images aligned together to show different captured polarization states for a same input polarization state. If there are proper captured polarization states, such as 0 degree, 90 degree, 45 degree linear and right circular polarized states, a full Stokes vector can be calculated. Calibration of the PCAM can be performed, for example, to separate the polarization effect of the system from that of the sample.

Operation 850 repeats to generate k different illumination patterns for the same polarization state, and capturing more sets of n×m images from the camera array. The partitioning, the stitching, and the aligning steps can be performed of the sets of n×m images to generate k sets of m complete images aligned together.

The k sets of m complete images can be fused to form m high dimensional image reconstructions of the sample with different polarization. If there are proper captured polarization states, such as 0 degree, 90 degree, 45 degree linear and right circular polarized states, a full Stokes vector can be calculated.

Operation 860 repeats for illumination patterns having different polarizations. Full Stokes vectors can be calculated for each input polarization states. If there are proper input polarization states, such as 0 degree, 90 degree, 45 degree linear and right circular polarized states, a full Mueller matrix can be calculated.

Operation 870 computes polarized properties of the sample, for example, based on the Stokes vectors, the Mueller matrix, or the Jones matrix.

Imaging polarimetry has been shown to be a very useful approach in problems that involve light-matter interaction, such as in medicine and biology because of its non-destructive nature and its potential to identify local properties in propagating media. For example, polarimetry and microscopy on biomedical samples can provide differences in physical magnitudes, like retardance or depolarization. Regarding the diattenuation, this parameter can reveal different brain tissue properties.

When interacting with matter, the polarimetric properties of light are affected in a way that is related to the optical properties of the material. These changes can be analyzed with the Mueller matrix, which fully characterizes the optical changes induced by a given sample.

For example, calculations from Mueller matrix can show the introduction of any significant amount of diattenuation, retardance, optical rotation, or depolarization in the sample. Further, calculation from Mueller matrix can also show diattenuation, anisotropy, total dichroism, and total birefringence of the sample, for example, as a result of polarized image deviations.

The polarization state of a light beam can be described by the Stokes vector S:

$$s = \begin{bmatrix} S_0 \\ S_1 \\ S_2 \\ S_3 \end{bmatrix} = \begin{bmatrix} I \\ Q \\ U \\ V \end{bmatrix} = \begin{bmatrix} I_0 + I_{90} \\ I_0 - I_{90} \\ I_{45} - I_{135} \\ I_R - I_L \end{bmatrix}$$

where $I_0$, $I_{90}$, $I_{45}$, and $I_{135}$ are the intensity measurements with linear polarizers oriented in the corresponding directions and $I_L$ and $I_R$ are the intensities measured with left and right circular polarizers.

A Stokes vector consists of four elements S0, S1, S2, and S3, which can be defined using the set of intensity measurements. Here S1 and S2 represent the affinity towards linear polarization. S3 denotes the fraction of the intensity that is circularly polarized.

Important metrics that can be calculated from a Stokes vector are the angle of linear polarization, degree of polarization (DOP), degree of linear polarization (DOLP), and degree of circular polarization (DOCP).

Figure 9A:
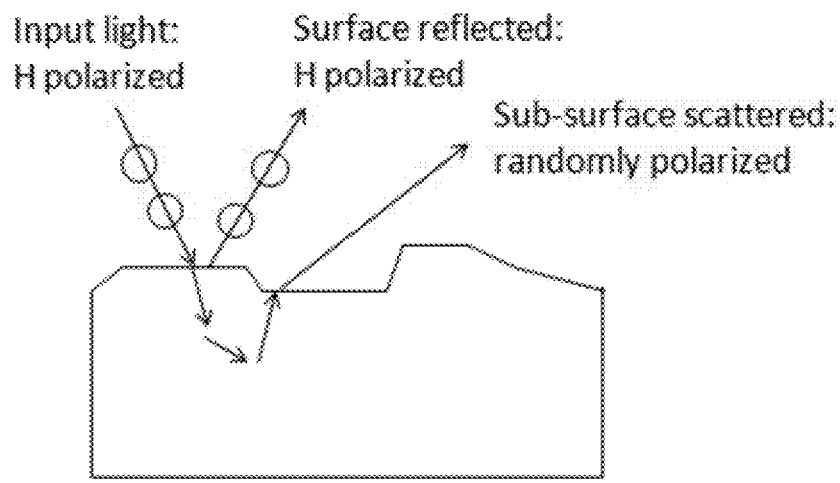
FIGS. 9A-9B illustrate a top surface calculation for a PCAM system according to some embodiments.
Figure 9B:
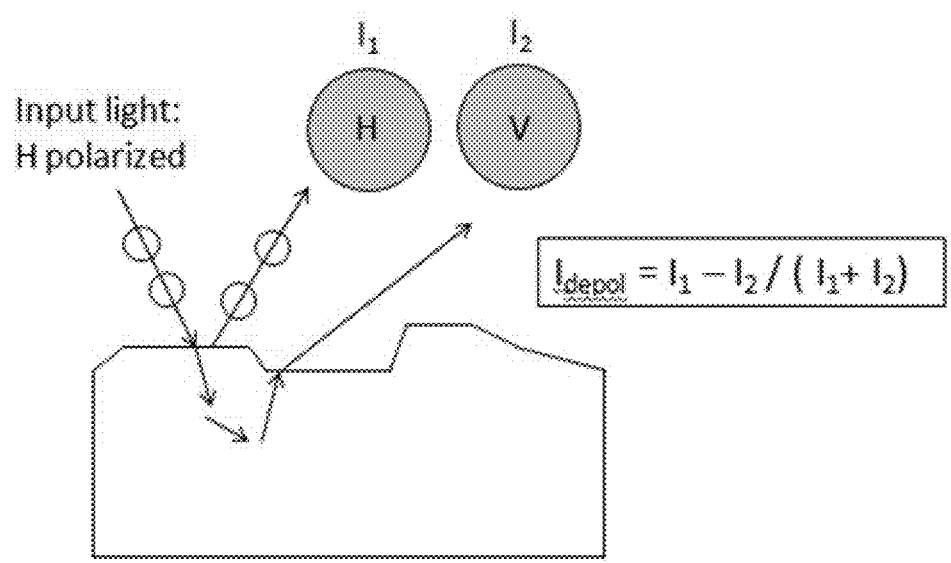

FIGS. 9A-9B illustrate a top surface calculation for a PCAM system according to some embodiments. In reflective mode, e.g., when the illumination source is placed at the same side of the sample as the camera array so that light from the illumination source is reflected off the sample before captured by the camera array, light can penetrate the sample. The penetrated light can also be captured by the camera when the light emerged from the subsurface area. The subsurface signal can cause blur in the image.

In some embodiments, polarized light can assist in the removal of subsurface signal—that is, light that has penetrated the surface and then scattered back out. When polarized light is reflected from the top surface, the light retains its polarization state. So a 0 degree polarized light would reflect as 0 degree polarized light. However, when the light penetrates the subsurface area and then backscatters toward the camera, it emerges with a random polarized state (FIG. 9A).

Thus, for a 0 degree polarized light $I_1$ captured by a 0 degree polarized camera, the light can have a top surface component $I_{1top}$, and a subsurface backscattered component $I_{1scatter}$. The top surface $I_{1top}$ has 0 degree polarization state, and is captured by the camera. The scattered light is randomly polarized, and thus only the $I_{1scatter}$ component with 0 degree polarization is captured by the camera.

$$I_1 = I_{1stop} + I_{1scatter}$$

For a 90 degree polarized light $I_2$ captured by a zero degree polarized camera, the light can have a top surface component $I_{2top}$, and a subsurface backscattered component $I_{2scatter}$. The top surface $I_{2stop}$ has 90 degree polarization state, and not captured by the camera. The scattered light is randomly polarized, and thus only the $I_{2scatter}$ component with zero degree polarization is captured by the camera.

$$I_2 = I_{2scatter}$$

If $I_1$ and $I_2$ have a same intensity, the scatter components are randomly distributed in term of polarization states, therefore $$I_{1scatter} = I_{2scatter}$$

Thus, the top surface can be characterized by subtracting the scattered light from the captured light $$I_{1top} = I_1 - I_{2scatter} = I_1 - I_2$$

Normalizing the captured light, the top surface signal is $$\frac{I_1 - I_2}{I_1 + I_2}$$

Thus, the images captured by the cameras can be subtracted and added to reject the scattering light to enable high-quality inspection of the surface of samples having high backscattered light, such as thick tissue sections.

This configuration requires 2 different input polarized light and 1 polarized camera unit. The input light includes a zero degree polarized light and a 90 degree polarized light. The camera unit includes a zero degree polarized camera unit.

Alternatively, as shown in FIG. 9B, another configuration can be used, in which there are one input polarized light and 2 different polarized camera units. The input light can include a zero degree polarized light. The camera units include a zero degree polarized camera unit and a 90 degree polarized camera unit.

For example, a zero degree polarized light can illuminate the sample, e.g., the input light is zero degree (or horizontally) polarized. The same input light of zero degree polarization can reflect on the sample, and images can be captured from multiple polarized camera units. For example, a first polarized camera unit can be configured to capture zero degree polarized light to form images. In this case, the image from the first zero degree polarized camera can capture $I_1$, which includes the top surface component $I_{1top}$, and a subsurface backscattered component $I_{1scatter}$ having zero degree polarization.

A second polarized camera unit can be configured to capture 90 degree polarized light to form images. In this case, the image from the second 90 degree polarized camera can capture $I_2$, which includes only the subsurface backscattered component $I_{2scatter}$ having 90 degree polarization, since the top surface component $I_{2top}$ would have the polarization of zero degree and thus is not captured by the second camera unit.

As discussed above, the subsurface backscattered light is randomly polarized, so the subsurface backscattered components are approximately equal in all polarization states. Thus $I_{1scatter}$ is approximately equal to $I_{2scatter}$.

Thus, the top surface can be characterized by subtracting the scattered light from the captured light $$I_{1top} = I_1 - I_{2scatter} = I_1 - I_2$$

Normalizing the captured light, the top surface signal is $$\frac{I_1 - I_2}{I_1 + I_2}$$

In some embodiments, the present invention discloses a PCAM system with full Mueller configuration. The PCAM system can include a camera array having 4 polarization states to allow the construction of full Stokes vector. The 4 polarization states can include 0 degree linearly polarized, 90 degree linearly polarized, 45 or 135 degree linearly polarized, and left or right circular polarized states. Other polarization states can be used to construct the Stokes vector.

The PCAM system can include an illumination source having 4 polarization states to allow the construction of full Stokes vector. The 4 polarization states can include 0 degree linearly polarized, 90 degree linearly polarized, 45 or 135 degree linearly polarized, and left or right circular polarized states. Other polarization states can be used to construct the Stokes vector.

Figure 10A:
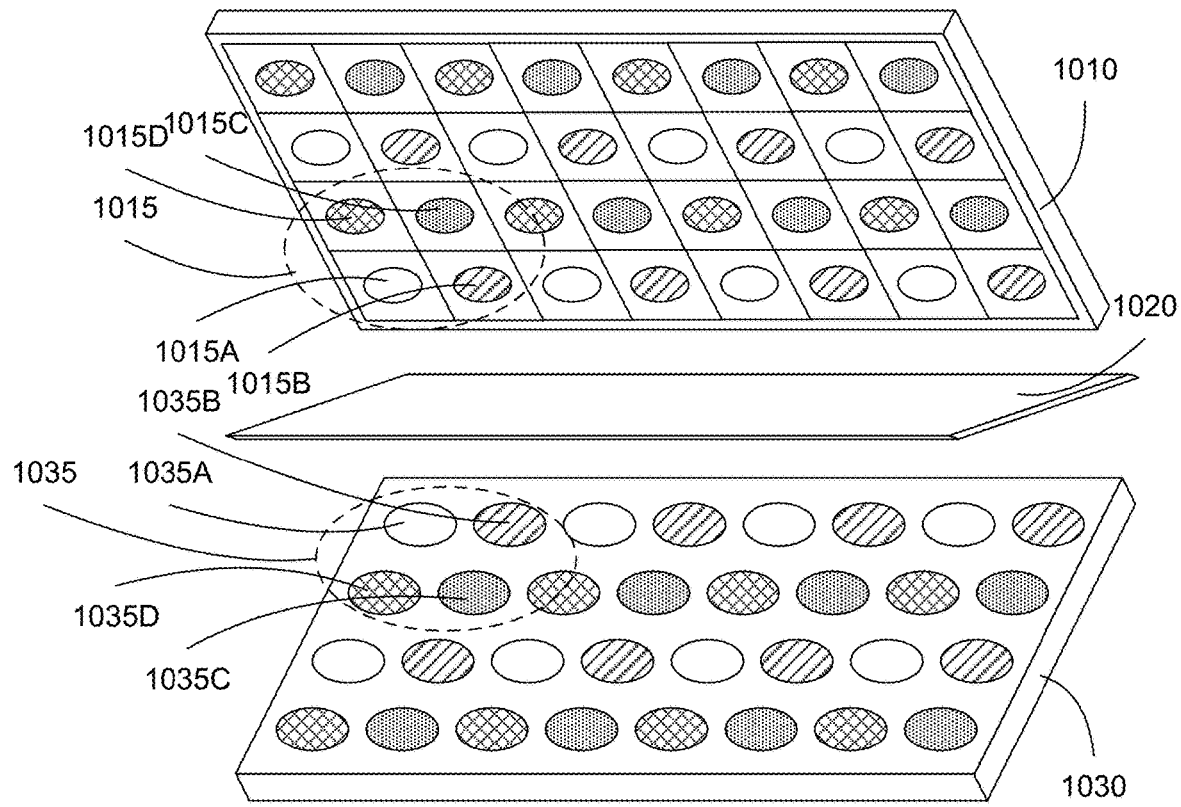
FIGS. 10A-10B illustrate a configuration for a PCAM system according to some embodiments.
Figure 10B:
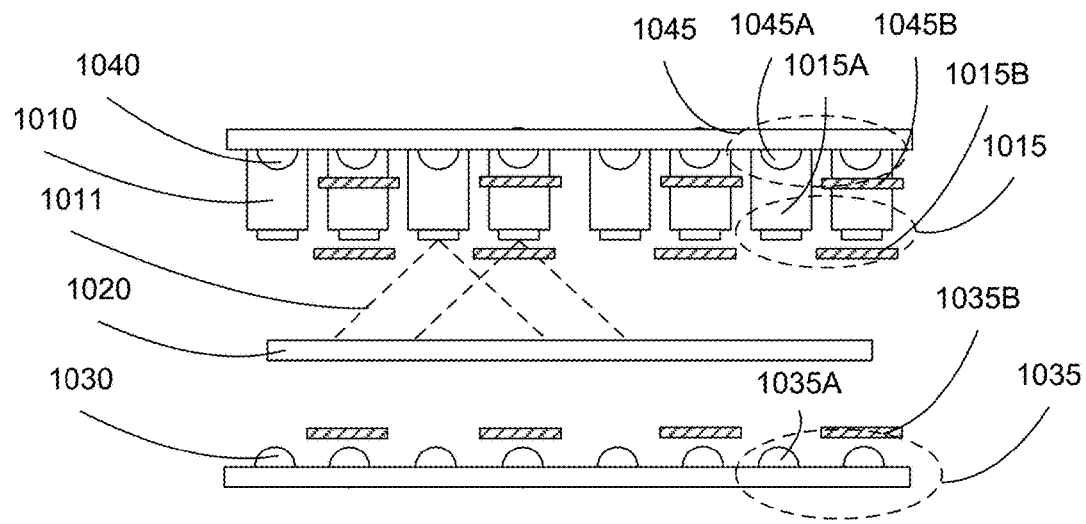

FIGS. 10A-10B illustrate a configuration for a PCAM system according to some embodiments. FIG. 10A shows a perspective view and FIG. 10B shows a cross section view of a PCAM system.

A PCAM system can include an array of different polarized camera units 1010 focused on a large sample 1020 under the illumination of an array of light source units 1030 and 1040 such as LEDs. A controller can be used to control the illumination system to provide different polarization illumination patterns to the sample.

Each polarized camera unit in the camera array can focus on a sample area, with non-overlapping areas 1011' or overlapping areas 1011 with nearby polarized camera unit to allow for stitching. Each polarized camera can acquire multiple images under different polarization illumination conditions. The captured images can be stitched together to form a high dimension polarized image reconstruction of the sample.

The illumination source can include k groups of light source units, with each group 1035 having 4 light source units 1035A, 1035B, 1035C, and 1035D configured to generate lights having 4 different polarization states. A group of light source units can have 4 light source units, with a first light source unit configured to generate 0 degree linearly polarized light, a second light source unit configured to generate 90 degree linearly polarized light, a third light source unit configured to generate 45 or 135 degree linearly polarized light, and a fourth light source unit configured to generate left or right circular polarize light.

If the light source unit having a predetermined polarization state in each group of light sources is activated one at a time, there can be k illumination patterns of the predetermined polarization state for an illumination source having k groups of light source units. If there are k groups of light source units with 4 light source units in each group, there can be 4 sets of k illumination patterns. Each k illumination pattern is generated by each light source unit with same polarization state in the k group.

In some embodiments, different illumination patterns can be provided by a programmable array of light source units, with different sets of one or more light source units activated to emit optical radiation to illuminate the sample for each captured image set. The programmable light source array can include light source units that are at different positions above or below the sample, as well as light source units that emit different frequencies (i.e., colors) of radiation and polarization states. The light source units can include light emitting diodes (LEDs), individual lasers, laser diodes, spatial light modulators or other electronically controllable light emission elements, with polarizers to generate polarized lights.

The variably-illuminated images can be captured by a camera array, with each camera unit in the camera array capturing an image. The captured images can be sorted based on the polarization state of the camera units. There can be multiple sets of images, with each set of images includes images captured by camera units having the same polarization state.

The camera array can include n groups of camera units, with each group 1015 having 4 camera units 1015A, 1015B, 1015C, and 1015D configured to capture images having different polarization states. A group of camera units can have 4 camera units, with a first camera unit configured to capture 0 degree linearly polarized images, a second camera unit configured to capture 90 degree linearly polarized images, a third camera unit configured to capture 45 or 135 degree linearly polarized images, and a fourth camera unit configured to capture left or right circular polarize images.

The camera units in the camera array are all activated at a same time for each illumination pattern. If there are n groups of camera units with 4 camera units in each group, there can be 4 sets of n images. The n images are captured by each camera unit with same polarization state in the n group. Each set of images in the 4 sets of images has n images with same polarization.

In operation, a new sample is first positioned beneath the α-MCAM, either mechanically by an automated system (i.e., a robotic arm, conveyor belt or sample positioning stage) or by a human. The plane of the positioned specimen lies between the two illumination sources (trans-illumination and epi-illumination). A particular configuration of illumination is selected for display on one or both of the illumination systems. A sequence of 1-4 images is then captured and saved by each and every MCAM camera unit within the device. In between each image capture, the illumination configuration is varied by an electronic signal. After capturing and saving all image data, the data then post-processed by a computing device. In some embodiments, the same computing device controls the P-MCAM, saves the image data and post-processes the image data. After post-processing, a final high-resolution (<10 μm), wide field-of view (>100 cm2) polarimetric image is generated, which is then saved by the computer. The final image may also be further analyzed by the computer, and it may be displayed on a monitor for inspection by a user.

In some embodiments, the camera array contains 64 unique camera units, which each camera unit configured to image a unique portion of the sample. Imaging setup for a semi-transparent sample can include the trans-illumination source provided by an LED array placed beneath the sample passes through it and into each camera unit to form an image. Imaging setup for a semi-reflective sample can include the epi-illumination source provided by an LED array placed above the sample (such as attached to the camera array) reflects off the sample and into each camera unit to form an image.

In some embodiments, the P-MCAM system requires the use of a filter array, where a unique filter is placed over each camera lens, to obtain polarimetric measurements from each camera. In addition, the cameras are configured such that they exhibit overlapping fields-of-view (FOV). In the overlapped region, any point on the sample plan is imaged by two unique cameras, such that the system can obtain polarimetric measurements containing the polarized Stokes vector. For example, for 0 degree and 90 degree Stokes vector measurements, the filters include these two orientations. In general, any combination of Stokes vector measurements can be used.

In a 2 dimensional configuration, the FOV of four cameras overlap. Thus, in a 2D geometry, it is possible to configure the cameras such that each point in the specimen is imaged by 4 cameras. In some embodiments, the filter array contains 4 unique filters: one at 0 degrees (0), one at 90 degrees (90), one at 45 degrees (45), and one right-hand circular polarizer (R). From these 4 polarization image measurements, it is possible to compute the Stokes vector for each point within the image in a single snapshot. These 4 filters can be arranged in 2×2 groups, where each group forms a set of polarimetric measurements from one unique region of the sample. The polarization groups are tiled together across the MCAM array to provide image data from a large FOV. As described in the operation of the MCAM system, the image data from each polarization group can be stitched together into a final composite image that has a FOV that is the combined sum of the FOVs of the individual polarization group images.

In addition, similar polarization filters can be placed, in an arrayed configuration, over each of the individual LEDs within the illumination array. A similar arrangement of 2×2 filters can be placed over groups of 2×2 LEDs, such as polarization filters oriented at 0 degrees, 90 degrees, 45 degrees and a right-hand circular polarizer. This arrangement allows the P-MCAM system to rapidly acquire images under different polarization illumination states. In some embodiments, only the LEDs within the array that are beneath 0 degree polarizers are activated, e.g., turned on, thus illuminating the sample with light that is 0 degree polarized, and capture one image from each camera. These LEDs can then be turned off, and only the LEDs within the array that are beneath 90 degree polarizers are next turned on, thus illuminating the sample with light that is 90 degree polarized, and capture a second image. These LEDs can then be turned off, and only the LEDs within the array that are beneath 45 degree polarizers are next turned on, thus illuminating the sample with light that is 45 degree polarized, and capture a third image. Finally, these LEDs can then be turned off, and only the LEDs within the array that are beneath right-hand circular polarizers are next turned on, thus illuminating the sample with light that is right-hand circularly polarized, and capture a fourth image. All of these images are then saved for subsequent post-processing.

In some embodiments, the captured image data is post-processed. For example, for one illumination polarization state, the saved images can be split up into 4 groups—one for each of the polarization types placed over each camera. Once grouped, the images within each group are then stitched together via standard image stitching software. In some embodiments, image stitching parameters can be established via a calibration step beforehand, and these values can be saved in a look-up table that can be used to stitch all subsequently captured images. Once stitched together, the 4 stitched images can then be aligned, via standard image alignment methods, to ensure that there is minimal spatial offset between each channel before computing the Stokes vector image. Finally, the Stokes vector image can be computed via a simple linear combination of the 4 stitched images. In some embodiments, calculation parameters can be established via a calibration step beforehand, and these values can be saved in a look-up table that can be used to calculate polarized properties, such as Stokes vector and Mueller matrix. This process can then be repeated for all 4 illumination polarization states to create 4 unique Stokes vector images per sample.

FIG. 11A-11C illustrate a camera array for a PCAM system according to some embodiments. A camera array 1110 can include multiple groups of camera units. The camera array 1110 can be configured to face the sample of the PCAM. The camera array 1110 can be configured to accept an illumination source, which can be disposed in a vicinity of the camera array (FIG. 11C).

As shown, a group 1115 includes 4 camera units 1115A, 1115B, 1115C, and 1115D. For example, the camera unit 1115A can be a zero degree polarized camera unit, the camera unit 1115B can be a 90 degree polarized camera unit, the camera unit 1115C can be a 45 degree polarized camera unit, and the camera unit 1115D can be a right circular polarized camera unit (FIG. 11A-11B).

The set of camera subarray involving one type of camera units 1115A in the groups of camera units 1115 can capture images having a same first polarization state of the sample. As shown, the camera units 1115A can be positioned so that the image portions 1125A, 1125B, 1125C, and 1125D of a sample 1120, captured by 4 camera units 1115A, 1115B, 1115C, and 1115D, are overlapped 1123. The overlapped portion 1123 can allow the stitching of image portions 1125A, 1125B, 1125C, and 1125D, for example, by matching features extracted from the two image portions (FIG. 11A-11B). Alternatively, the camera units can be positioned so that the image portions are non-overlapped.

Figure 12:
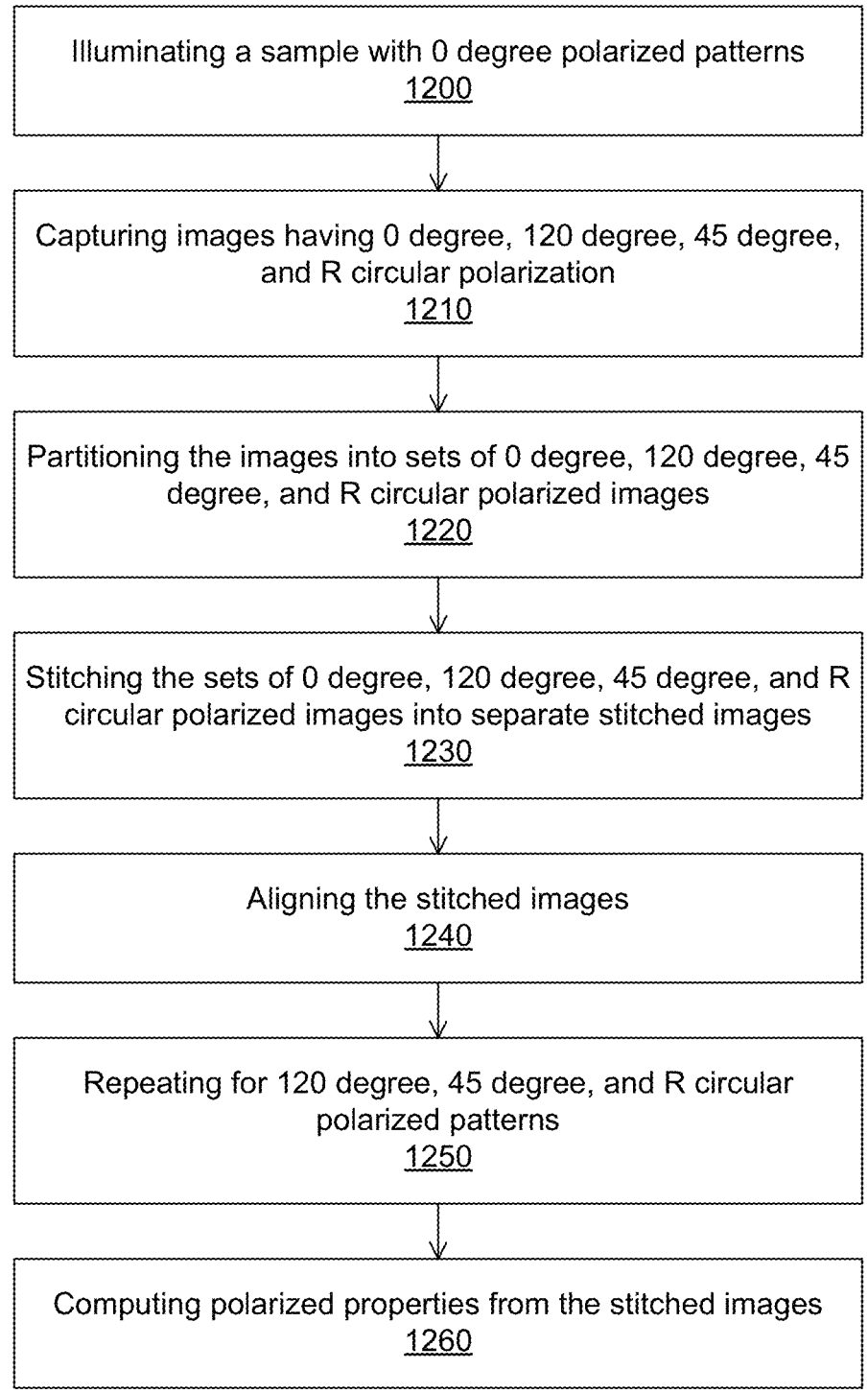
FIG. 12 illustrates a flow chart for operating a PCAM system according to some embodiments.

FIG. 12 illustrates a flow chart for operating a PCAM system according to some embodiments. The PCAM system can include a camera array and an illumination source, which are controlled by one or more controllers, such as a camera controller, an illumination controller, and a system controller. The camera array can include cameras with different polarizers. The illumination source can include light sources with different polarizers.

Operation 1200 generates an illumination pattern on a sample. The illumination pattern can include one or more light sources having a first polarization state from the illumination source. For example, the first polarization state can be 0 degree linearly polarization state.

Operation 1210 captures images from the cameras, for example, n×4 images can be taken for a camera array having n groups of cameras with each group having 4 cameras with different polarizers, such as 0 degree, 90 degree, 45 degree, and R circular polarization.

Operation 1220 partitions the n×4 images, e.g., the n×4 images can be sorted according to the camera polarizers, to provide 4 groups of n images with each group of images having the same input polarization state and a different captured polarization state.

Operation 1230 stitches the sets of different polarization images into separate stitched images. For example, the n images in a group (of the 4 groups) with each group of images having the same input polarization state and captured polarization state are stitched together to form a complete image of the sample. There are 4 complete images of the sample, with each complete image having the same input polarization state, and each complete image having different captured polarization state, e.g., 0 degree, 90 degree, 45 degree, and R circular polarization.

Operation 1240 aligns the stitched images. After the alignment, there are 4 complete images aligned together to show different captured polarization states (such as 0 degree, 90 degree, 45 degree linear and right circular polarized states) for a same input polarization state.

The process can be repeated to generate k different illumination patterns for the same polarization state, and capturing more sets of n×4 images from the camera array. The partitioning, the stitching, and the aligning steps can be performed of the sets of n×4 images to generate k sets of 4 complete images aligned together.

The k sets of 4 complete images can be fused to form m high dimensional image reconstructions of the sample with different polarization.

Operation 1250 repeats for illumination patterns having different polarizations. Full Stokes vectors, full Mueller matrix, or Jones matrix can be calculated for each input polarization states. Calibration of the PCAM can be performed, for example, to separate the polarization effect of the system from that of the sample.

Operation 1260 computes polarized properties of the sample, for example, based on the Stokes vectors, the Mueller matrix, or the Jones matrix.

Figure 13:
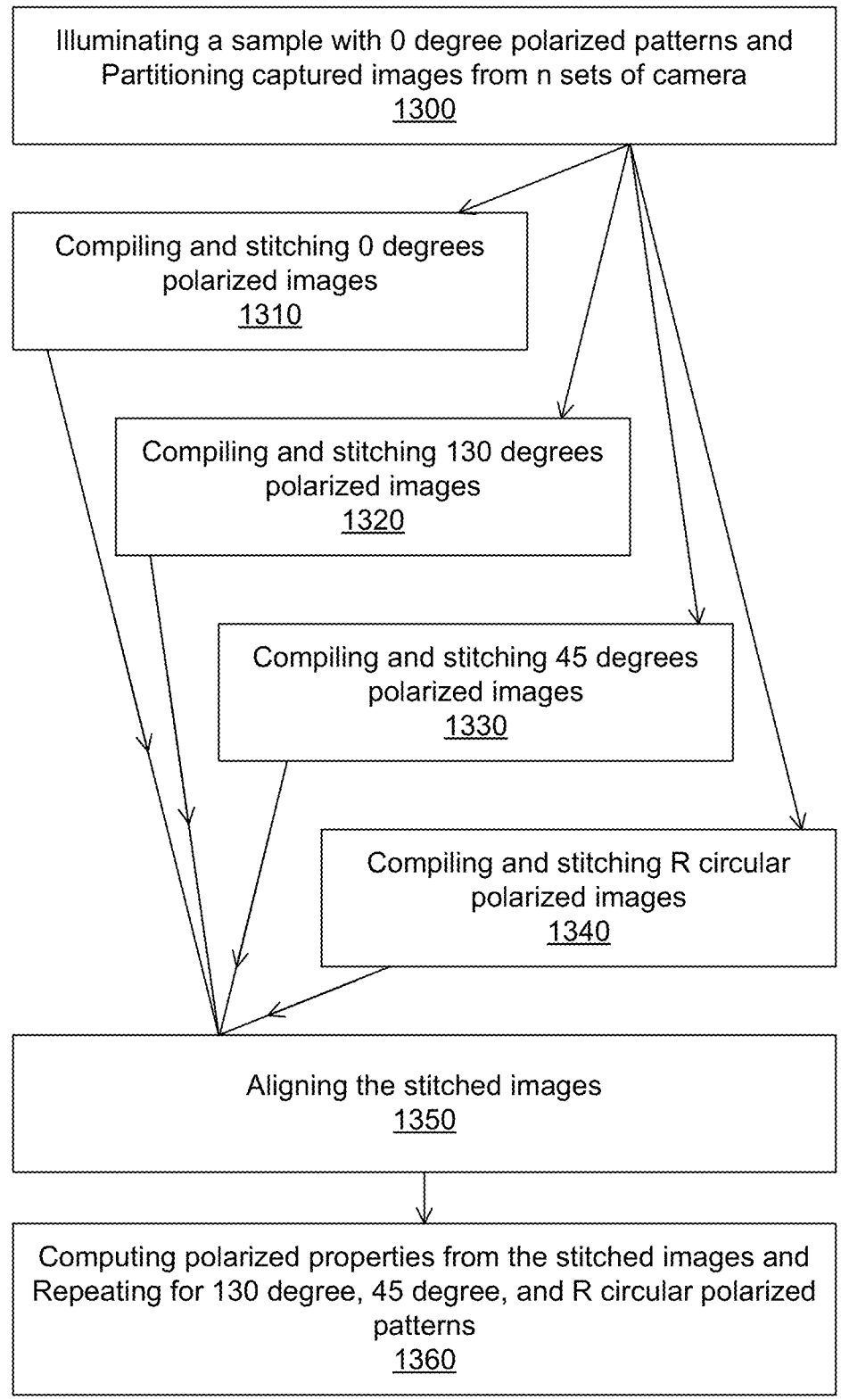
FIG. 13 illustrates an operation of PCAM according to some embodiments.

FIG. 13 illustrates an operation of PCAM according to some embodiments. Operation 1300 turns on light sources, such as LEDS, having 0 degree polarization state. The camera array can capture images under the 0 degree polarized light.

Operation 1310 compiles and stitches images from 0 degree polarized cameras to form a complete 0 degree polarized image of the sample. Operation 1320 compiles and stitches images from 90 degree polarized cameras to form a complete 90 degree polarized image of the sample. Operation 1330 compiles and stitches images from 45 degree polarized cameras to form a complete 45 degree polarized image of the sample. Operation 1340 compiles and stitches images from right circular polarized cameras to form a complete right circular polarized image of the sample.

Operation 1350 aligns the stitched images from the 4 polarized camera sets. The alignment can allow calculations with signals having different polarization states, such as to calculate top surface signal, by subtracting two perpendicular components of the polarized light.

Operation 1360 computes polarized properties from the stitched images. The process can be repeated for other polarization states of the illumination source, such as for 90 degree polarized light sources, 45 degree polarized light sources, and right circular polarized light sources.

FIG. 14A-14C illustrate a camera array for a PCAM system according to some embodiments. A camera array 1410 can include multiple groups of camera units. The camera array 1410 can be configured to face the sample of the PCAM. The camera array 1410 can be configured to accept an illumination source, which can be disposed in a vicinity of the camera array (FIG. 14C).

As shown, a group 1415 includes 5 camera units 1415A, 1415B, 1415C, 1415D, and 1415E. For example, the camera unit 1415A can be a zero degree polarized camera unit, the camera unit 1415B can be a 90 degree polarized camera unit, the camera unit 1415C can be a 45 degree polarized camera unit, the camera unit 1415D can be a right circular polarized camera unit, and the camera unit 1415E can be an unpolarized camera unit, e.g., camera unit without any polarizer (FIG. 14A-14B).

The set of camera subarray involving one type of camera units 1415A in the groups of camera units 1415 can capture images having a same first polarization state of the sample. As shown, the camera units 1415A can be positioned so that the image portions 1425A, 1425B, 1425C, 1425D, and 1425E of a sample 1420, captured by 5 camera units 1415A, 1415B, 1415C, 1415D, and 1415E, are overlapped 1423. The overlapped portion 1423 can allow the stitching of image portions 1425A, 1425B, 1425C, 1425D, and 1425E, for example, by matching features extracted from the two image portions (FIG. 14A-14B). Alternatively, the camera units can be positioned so that the image portions are non-overlapped. The non-overlapped image portions can be assembled together to form an image of the sample, e.g., the non-overlapped image portions can be stitched together by simply placing them next to each other, with or without a gap between the image portions. In other words, in the specification, the stitching process can including matching features in the overlapped portions to align two overlapped neighbor image portions, or can simply placing two non-overlapped neighbor image portions next to each other.

Operations of the 5 camera groups are similar to the operations of the 4 camera groups, with the addition of the unpolarized camera units. The unpolarized camera units can allow the PCAM to operate as an MCAM.

FIGS. 15A-15D illustrate operations of a PCAM according to some embodiments. In FIG. 15A, operation 1500 operates the microscope in unpolarized mode using unpolarized illumination patterns and unpolarized cameras. This is the operations of an MCAM system.

In FIG. 15B, operation 1520 operates the microscope in polarized mode using polarized illumination patterns and polarized cameras. This is the operations of a PCAM system.

In FIG. 15C, operation 1540 operates the microscope in polarized mode using a combination of polarized or unpolarized illumination patterns with a combination of polarized or unpolarized cameras. This operation can allow the PCAM to toggle to operate as an MCAM.

In FIG. 15D, operation 1560 operates the microscope in a combination of polarized and unpolarized mode using a combination of polarized or unpolarized illumination patterns with a combination of polarized or unpolarized cameras. This can allow the operation of PCAM system in unpolarized state.

In some embodiments, the PCAM can be configured in a non-optimized configuration, which can provide a cost effective solution. For example, 0 degree polarized cameras and 90 degree polarized cameras can be used in a majority of sample evaluation, and thus a PCAM system having only groups of 0 and 90 degree polarized camera units can is used.

Figures 16A, 16B, 16C:
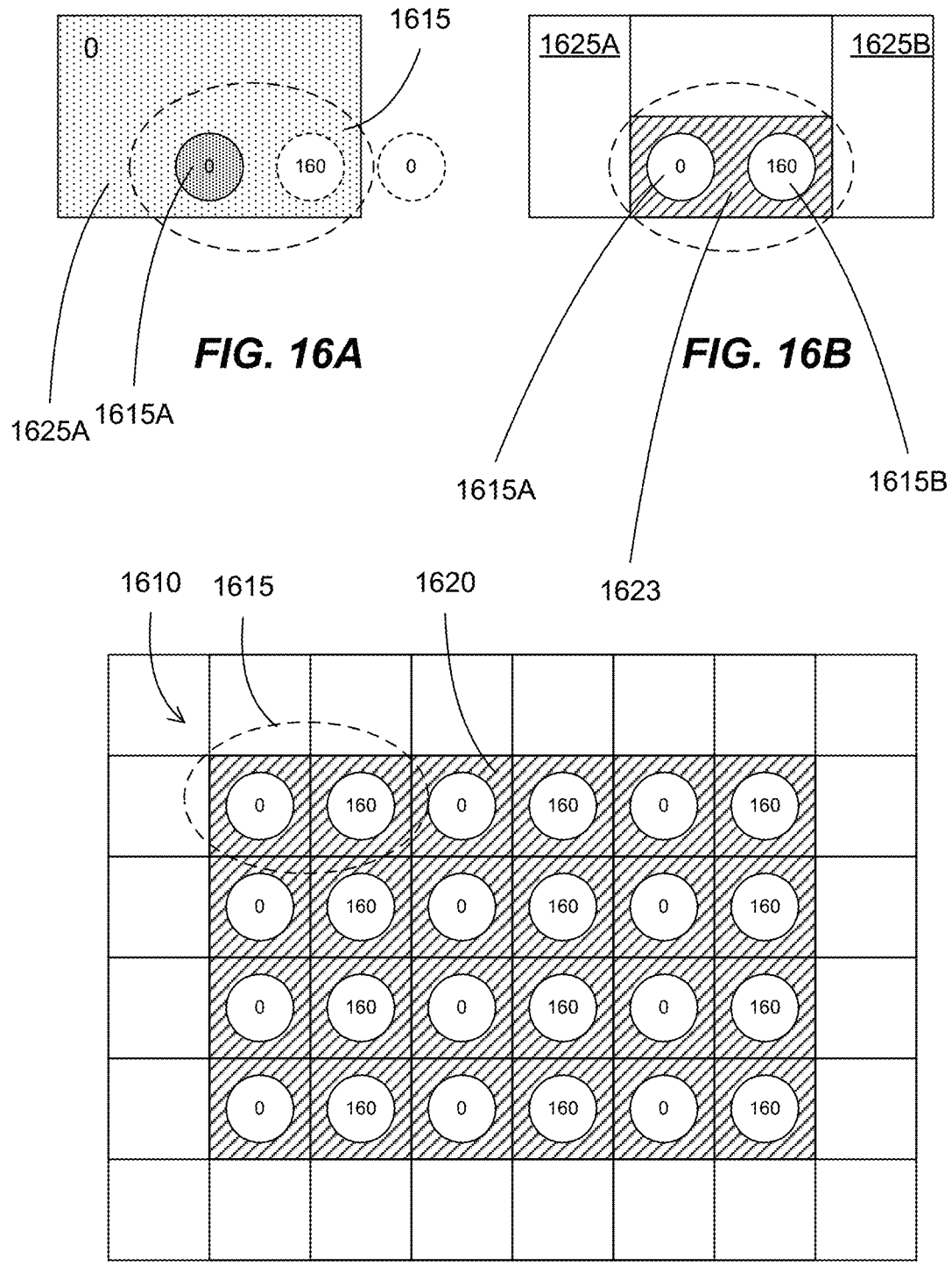
FIG. 16A-16C illustrate a camera array for a PCAM system according to some embodiments.

FIG. 16A-16C illustrate a camera array for a PCAM system according to some embodiments. A camera array 1610 can include multiple groups of camera units. The camera array 1610 can be configured to face the sample of the PCAM. The camera array 1610 can be configured to accept an illumination source, which can be disposed in a vicinity of the camera array (FIG. 16C).

As shown, a group 1615 includes 2 camera units 1615A and 1615B. For example, the camera unit 1615A can be a zero degree polarized camera unit, and the camera unit 1615B can be a 90 degree polarized camera unit (FIG. 16A-16B).

The set of camera subarray involving one type of camera units 1615A in the groups of camera units 1615 can capture images having a same first polarization state of the sample. The camera units 1615A can be positioned so that the image portions 1625A and 1625B of a sample 1620, captured by 2 camera units 1615A and 1615B are overlapped 1623. The overlapped portion 1623 can allow the stitching of image portions 1625A and 1625B, for example, by matching features extracted from the two image portions (FIG. 16A-16B).

Operations of the 2 camera groups can be similar to the operations of the 4 camera groups.

Figures 17A, 17B:
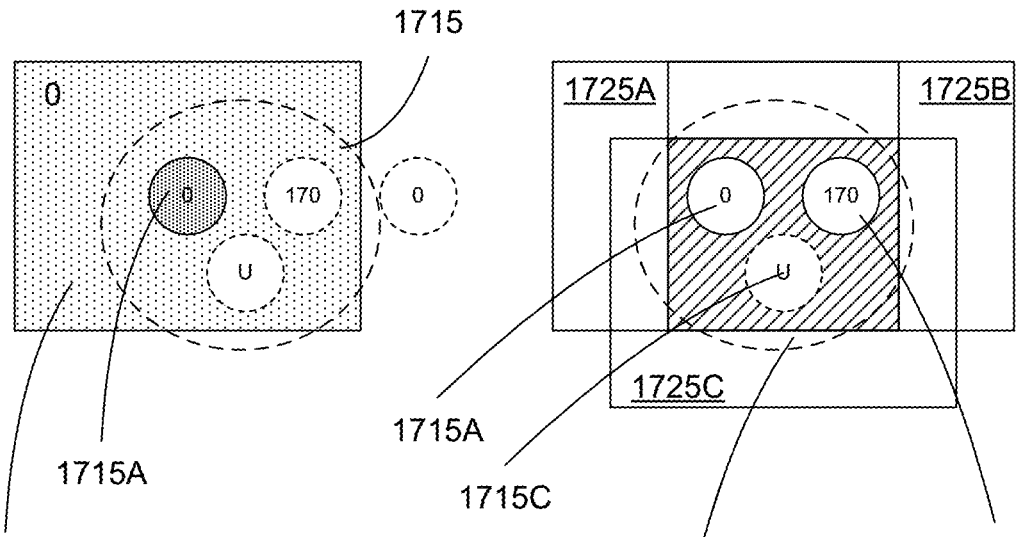
FIG. 17A-17C illustrate a camera array for a PCAM system according to some embodiments.
Figure 17C:
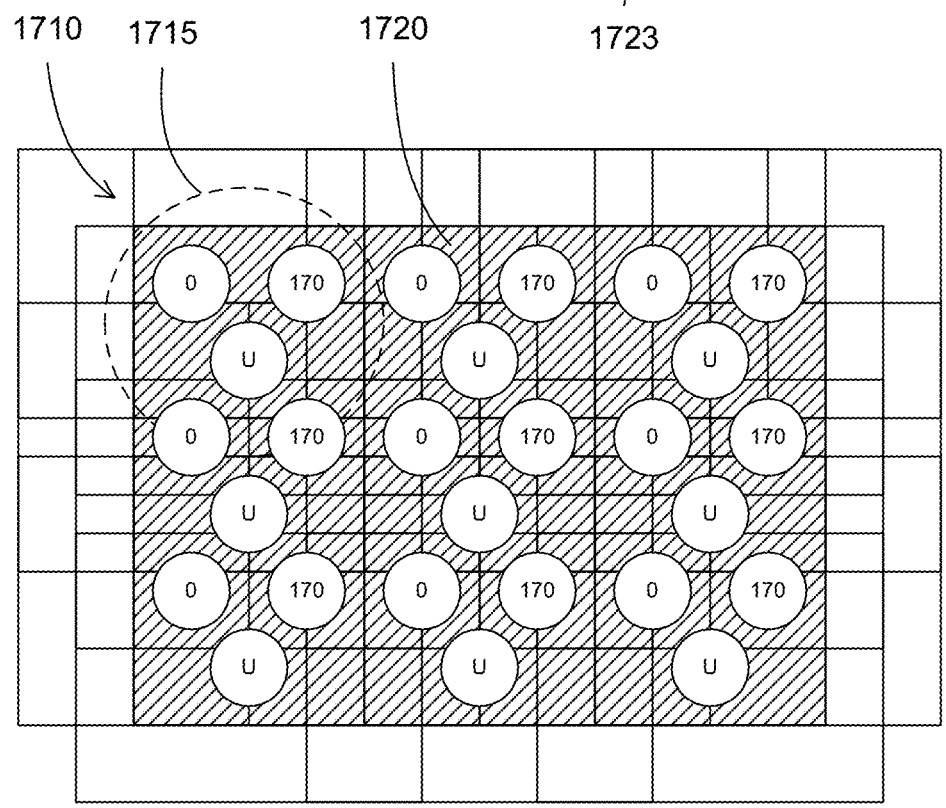

FIG. 17A-17C illustrate a camera array for a PCAM system according to some embodiments. A camera array 1710 can include multiple groups of camera units. The camera array 1710 can be configured to face the sample of the PCAM. The camera array 1710 can be configured to accept an illumination source, which can be disposed in a vicinity of the camera array (FIG. 17C).

As shown, a group 1715 includes 3 camera units 1715A, 1715B, and 1715C. For example, the camera unit 1715A can be a zero degree polarized camera unit, the camera unit 1715B can be a 90 degree polarized camera unit, and the camera unit 1715C can be an unpolarized camera unit, e.g., camera unit without any polarizer (FIG. 17A-17B).

The set of camera subarray involving one type of camera units 1715A in the groups of camera units 1715 can capture images having a same first polarization state of the sample. The camera units 1715A can be positioned so that the image portions 1725A, 1725B, and 1725C of a sample 1720, captured by 3 camera units 1715A, 1715B, and 1715C, are overlapped 1723. The overlapped portion 1723 can allow the stitching of image portions 1725A, 1725B, and 1725C, for example, by matching features extracted from the two image portions (FIG. 17A-17B).

In some embodiments, the illumination source of a PCAM system can have different light source group configurations. The light source configurations can be selected based on the goals and purposes of the PCAM. For example, a PCAM having groups of 4 polarized light source units can be used to provide full Mueller matrix, which can characterize many polarization properties of samples. A PCAM having groups of 4 polarized light source units plus an unpolarized light source unit can be used to provide full Mueller matrix, together with the ability to operate as an MCAM. A PCAM having groups of 2 polarized light source units can be a cost effective solution.

FIGS. 18A-18D illustrate illumination source configurations for PCAM systems according to some embodiments. An illumination source 1830 can include multiple groups of light source units. The illumination source 1830 can be disposed under the sample of the PCAM, which can provide transmissive light to the sample. The illumination source 1830 can be disposed on top of the sample, with form factor modification to accommodate the camera array.

Figure 18A:
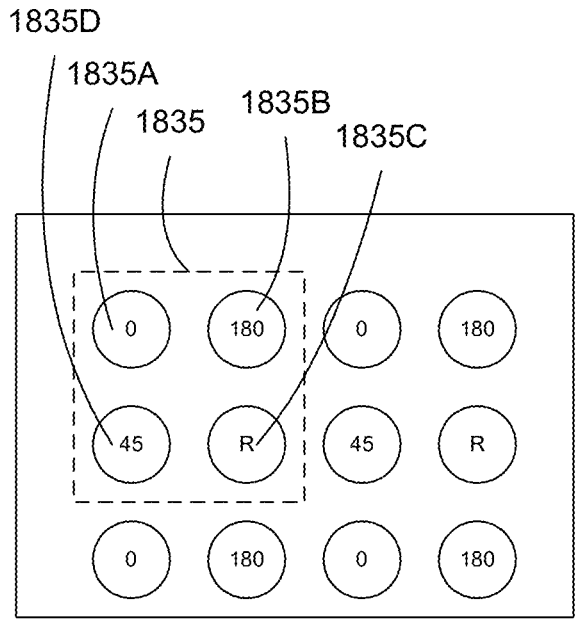
FIGS. 18A-18D illustrate illumination source configurations for PCAM systems according to some embodiments.

In FIG. 18A, a group 1835 includes 4 light source units 1835A, 1835B, 1835C, and 1835D. For example, the light source unit 1835A can be a zero degree polarized light source unit, the light source unit 1835B can be a 90 degree polarized light source unit, the light source unit 1835C can be a 45 or –45 or 135 or –135 degree polarized light source unit, and the light source unit 1835D can be a left or right circular polarized light source unit.

With the group 1835 of light source units having 4 different polarized light source units, there can be 4 different types of polarized light supplied to the sample to provide illumination patterns having 4 different polarization states.

Figure 18B:
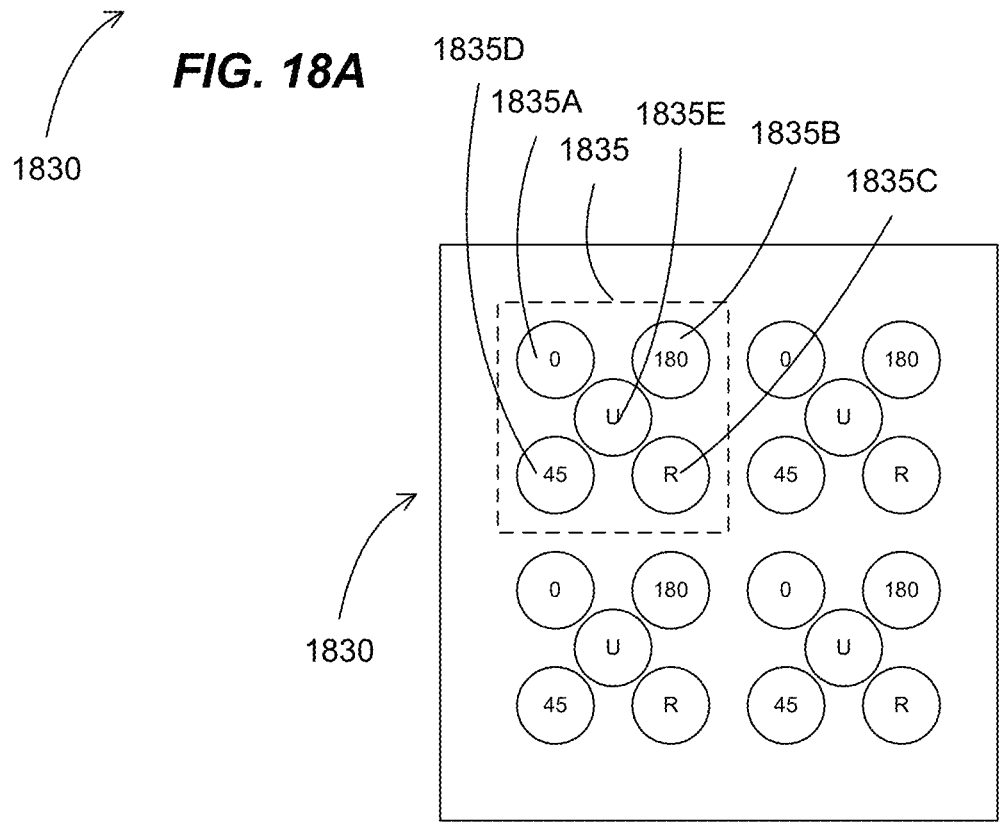

In FIG. 18B, a group 1835 includes 4 light source units 1835A, 1835B, 1835C, 1835D, and 1835E. For example, the light source unit 1835A can be a zero degree polarized light source unit, the light source unit 1835B can be a 90 degree polarized light source unit, the light source unit 1835C can be a 45 or –45 or 135 or –135 degree polarized light source unit, the light source unit 1835D can be a left or right circular polarized light source unit, and the light source unit 1835E can be an unpolarized light source unit.

With the group 1835 of light source units having 5 different polarized light source units, there can be 5 different types of polarized light supplied to the sample to provide illumination patterns having 5 different polarization states, e.g., 4 different polarization states plus an unpolarized state, or 4 different distinct polarization states plus a randomly polarized state.

Figure 18C:
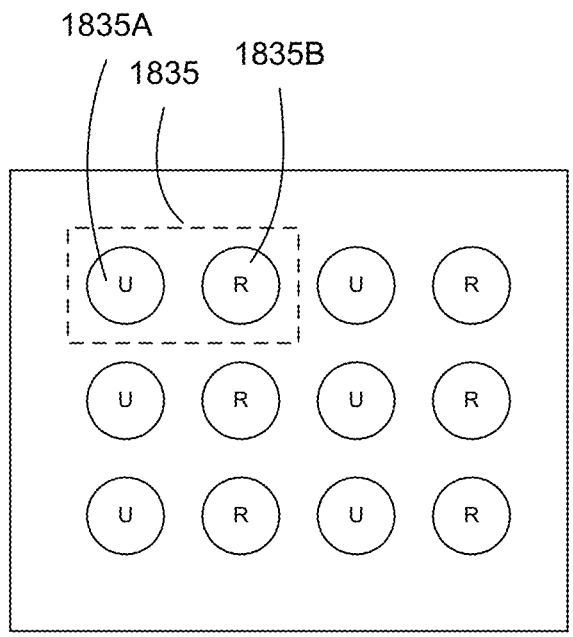

In FIG. 18C, a group 1835 includes 2 light source units 1835A and 1835B. For example, the light source unit 1835A can be a zero degree polarized light source unit, and the light source unit 1835B can be a 90 degree polarized light source unit.

With the group 1835 of light source units having 2 different polarized light source units, there can be 2 different types of polarized light supplied to the sample to provide illumination patterns having 2 different polarization states.

Figure 18D:
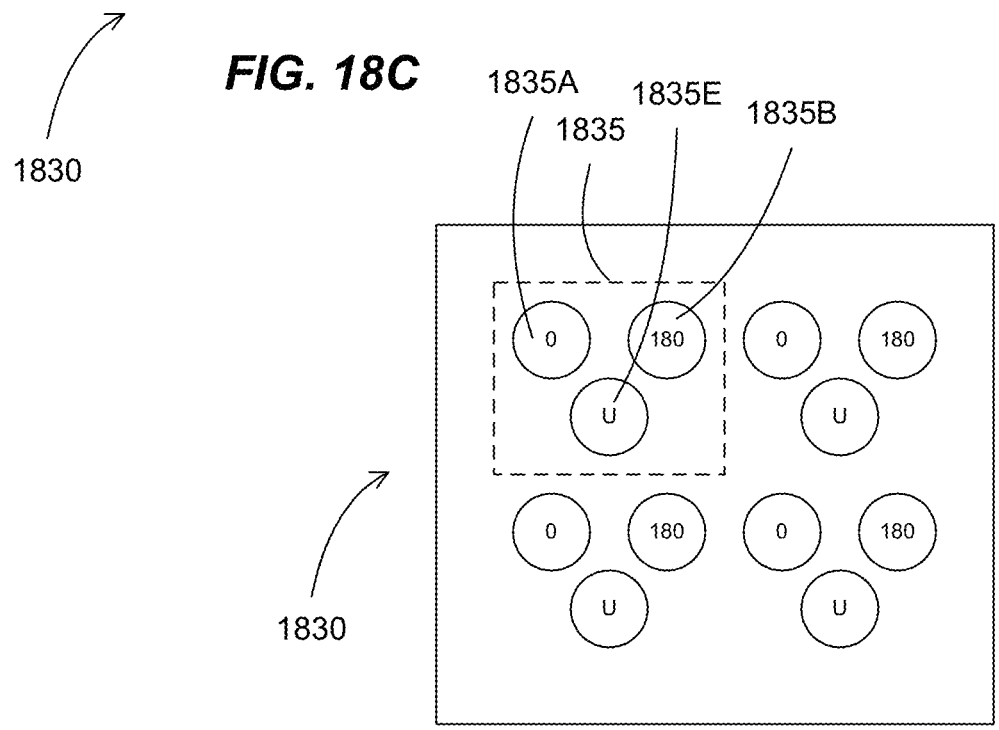

In FIG. 18D, a group 1835 includes 3 light source units 1835A, 1835B, and 1835E. For example, the light source unit 1835A can be a zero degree polarized light source unit, the light source unit 1835B can be a 90 degree polarized light source unit, and the light source unit 1835E can be an unpolarized light source unit.

With the group 1835 of light source units having 3 different polarized light source units, there can be 3 different types of polarized light supplied to the sample to provide illumination patterns having 3 different polarization states, e.g., 2 different polarization states plus an unpolarized state, or 2 different distinct polarization states plus a randomly polarized state.

What is claimed is:

1. A method for operating a computational microscope, the method comprising
    capturing images of a sample by a camera array of the computational microscope under multiple illumination patterns provided by the computational microscope, wherein the camera array comprises multiple groups of camera units,
        wherein each group of camera units comprises two or more camera units each configured to capture images with a different polarization,
        wherein each camera unit of the camera array is configured to capture images of an area of a sample,
        wherein the multiple illumination patterns are generated from an illumination source comprises multiple groups of light source units,
        wherein each group of light source units comprises two or more light source units configured to generate different polarized lights to the sample,
        wherein the multiple illumination patterns comprises two or more single polarization illumination patterns with each single polarization illumination pattern generated by light source units generating a same polarized light;
    forming multiple sets of images from the captured images,
        wherein each set of images is formed from the captured images captured by camera units of the camera array having a same polarization and under a single polarization illumination pattern.

2. A method as in claim 1, wherein at least one of
    each group of camera units comprises a zero degree polarized camera unit and a 90 degree polarized camera unit, each group of light source units comprises an unpolarized light source unit, a left circular polarized light source unit, and a right circular polarized light source unit, and the multiple sets of images comprise zero and 90 degree sets of images of the sample with each formed under each of unpolarized, left circular polarized and right circular polarized input light source units;
    each group of camera units comprises an unpolarized camera unit, a zero degree polarized camera unit and a 90 degree polarized camera unit, each group of light source units comprises an unpolarized light source unit, a left circular polarized light source unit, and a right circular polarized light source unit, and the multiple sets of images comprise unpolarized, zero degree, and 90 degree sets of images of the sample with each formed under each of unpolarized, left circular polarized and right circular polarized input light source units;
    each group of camera units comprises a zero degree polarized camera unit, a 90 degree polarized camera unit, a 45 or 135 degree polarized camera unit, and a left or right polarized camera unit, and with each group of light source units comprises a zero degree polarized light source unit, a 90 degree polarized light source unit, a 45 or 135 degree polarized light source unit, and a left or right circular polarized light source unit, and the multiple sets of images comprise zero polarized, 90 degree polarized, 45 or 135 degree polarized, and left or right circular sets of images of the sample with each formed under each of zero polarized, 90 degree polarized, 45 or 135 polarized, and left or right circular polarized input light source units;
    each group of camera units comprises an unpolarized camera unit, a zero degree polarized camera unit, a 90 degree polarized camera unit, a 45 or 135 degree polarized camera unit, and a left or right polarized camera unit, each group of light source units comprises an unpolarized light source unit, a zero degree polarized light source unit, a 90 degree polarized light source unit, a 45 or 135 degree polarized light source unit, and a left or right circular polarized light source unit, and the multiple sets of images comprise unpolarized, zero polarized, 90 degree polarized, 45 or 135 polarized, and left or right circular sets of images of the sample with each formed under each of unpolarized, zero polarized, 90 degree polarized, 45 or 135 polarized, and left or right circular polarized input light source units; or
    each group of light source units comprises an unpolarized light source unit, a zero degree polarized light source unit, a 90 degree polarized light source unit, a 45 or 135 degree polarized light source unit, and a left or right circular polarized light source unit, and each of the multiple sets of images of the sample is formed under each of unpolarized, zero polarized, 90 degree polarized, 45 or 135 polarized, and left or right circular polarized input light source units.

3. A method as in claim 1, further comprising at least one of
    calculating polarization properties of the sample based on the multiple sets of images of the sample, wherein the polarization properties of the sample comprise at least one of a partial Stokes vector, a full Stokes vector, a partial Mueller matrix, a full Mueller matrix, or a Jones matrix at each resolved sample spatial location; or
    performing a top surface calculation on the sets of images to reduce noise caused by subsurface scattering.

4. A method as in claim 1,
    stitching at least two adjacent images captured by two different camera units using an overlapped image portion between the at least two adjacent images.

5. A method as in claim 1,
    wherein capturing the images of the sample under the multiple illumination patterns comprises a sequence of generating each of the two or more single polarization illumination patterns, capturing images of the sample under the each of the two or more single polarization illumination patterns.

6. A method as in claim 1, further comprising
moving the camera array or the sample between one or more scanned positions,
wherein capturing the images of the sample under the multiple illumination patterns comprises capturing images of the sample under the multiple illumination patterns at each of the one or more scanned positions.

7. A method as in claim 1,
wherein capturing the images of the sample under the multiple illumination patterns comprises a sequence of
generating each of the two or more single polarization illumination patterns,
capturing images of the sample under the each of the two or more single polarization illumination patterns,
moving the camera array or the sample,
repeating generating each of the two or more single polarization illumination patterns and capturing images of the sample.

8. A method as in claim 1, further comprising
moving a set of filters for changing a polarization state for a camera unit in at least a group of camera units between one or more camera filter configurations,
wherein capturing the images of the sample under the multiple illumination patterns comprises capturing images of the sample under the multiple illumination patterns at each of the one or more camera filter configurations.

9. A method as in claim 1,
wherein capturing the images of the sample under the multiple illumination patterns comprises a sequence of
generating each of the two or more single polarization illumination patterns,
capturing images of the sample under the each of the two or more single polarization illumination patterns,
moving a set of polarization filters for changing a polarization state for a camera unit in at least a group of camera units,
repeating generating each of the two or more single polarization illumination patterns and capturing images of the sample.

10. A method as in claim 1,
wherein at least two different areas having images captured by two different camera units comprise a non-overlapped gap,
the method further comprising
moving the sample relative to the camera array to a new position in a direction to reduce or eliminate the non-overlapped gap;
repeating capturing new images of the sample at the new position by the camera array under the multiple illumination patterns;
adding the newly captured images in the multiple sets of images according to camera polarizations and polarized light.

11. A computational microscope comprising
a camera array comprising multiple groups of camera units,
wherein each group of camera units comprises two or more camera units configured to capture images with different polarization,
wherein each camera unit of the camera array is configured to capture images of an area of a sample;
an illumination source,
wherein the illumination source comprises multiple groups of light source units,
wherein the multiple groups of light source units are disposed above, below, or both above and below the sample,
wherein each group of light source units comprises two or more light source units configured to generate lights having different polarization to the sample;
a controller,
wherein the controller is configured to control the light source units of the multiple groups of light source units to generate multiple illumination patterns,
wherein the multiple illumination patterns comprises two or more single polarization illumination patterns with each single polarization illumination pattern generated by one or more light source units generating a same polarized light,
wherein the controller is configured to control the camera array to capture images of areas of the sample under each illumination pattern of the multiple illumination patterns,
wherein the controller is configured to form multiple sets of images of the sample with each set of images comprising the images captured by camera units of the camera array having a same polarization and under an illumination pattern of light source units generating a same polarized light.

12. A microscope as in claim 11, wherein at least one of each group of camera units comprises a zero degree polarization camera unit, and a 90 degree polarization camera unit; each group of camera units comprises an unpolarized camera unit, a zero degree polarization camera unit, and a 90 degree polarization camera unit; each group of camera units comprises a zero degree polarization camera unit, a 90 degree polarization camera unit, a 45 or 135 degree polarization camera unit, and a right or left circular polarization camera unit; each group of camera units comprises at least any two of an unpolarized camera unit, a zero degree polarization camera unit, a 90 degree polarization camera unit, a 45 135 degree polarization camera unit, or a right or left circular polarization camera unit.

13. A microscope as in claim 11, wherein at least one of each group of light source units comprises a first light source unit configured to generate zero degree light, and a second light source unit configured to generate 90 degree polarized light; each group of light source units comprises an unpolarized light source unit, a left circular polarized light source unit, and a right circular polarized light source unit; each group of light source units comprises a first light source unit configured to generate zero degree polarized light, a second light source unit configured to generate 90 degree polarized light, a third light source unit configured to generate 45 or 135 degree polarized light, and a fourth light source unit configured to generate left or right circular polarized light; or each group of light source units comprises at least any two of a light source unit configured to generate unpolarized light, a light source unit configured to generate zero degree light, a light source unit configured to generate 90 degree light, a light source unit configured to generate 45 degree or 135 degree light, or a light source unit configured to generate left or right circular polarized light.

14. A microscope as in claim 11, further comprising wherein the controller is configured to generate each of the two or more single polarization illumination patterns, and to capture images of the sample under the each of the two or more single polarization illumination patterns.

15. A microscope as in claim 11, further comprising a moving mechanism coupled to the camera array or to a support for the sample for moving the camera array or the sample between one or more scanned positions, wherein the controller is configured to capture images of the sample under the multiple illumination patterns at each of the one or more scanned positions.

16. A microscope as in claim 11, further comprising a moving mechanism coupled to the camera array or to a support for the sample for moving the camera array or the sample, wherein the controller is configured to generate each of the two or more single polarization illumination patterns, capture images of the sample under the each of the two or more single polarization illumination patterns, move the camera array or the sample, repeat generating each of the two or more single polarization illumination patterns and capturing images of the sample.

17. A microscope as in claim 11, further comprising a moving mechanism coupled to a set of filters for changing a polarization state for a camera unit in at least a group of camera units between one or more camera filter configurations, wherein the controller is configured to capture images of the sample under the multiple illumination patterns at each of the one or more camera filter configurations.

18. A microscope as in claim 11, further comprising a moving mechanism coupled to a set of filters for changing a polarization state for a camera unit in at least a group of camera units, wherein the controller is configured to generate each of the two or more single polarization illumination patterns, capture images of the sample under the each of the two or more single polarization illumination patterns, move the set of polarization filters, repeat generating each of the two or more single polarization illumination patterns and capturing images of the sample.

19. A microscope as in claim 11, further comprising a moving mechanism coupled to the camera array or to a support for the sample for moving the camera array or the sample, wherein at least two different areas having images captured by two different camera units comprise a non-overlapped gap, wherein the controller is configured to move the sample relative to the camera array to a new position in a direction to reduce or eliminate the non-overlapped gap, wherein the controller is configured to capture new images of the sample at the new position by the camera array under the multiple illumination patterns, wherein the controller is configured to adding newly captured images in the multiple sets of images according to camera polarizations and polarized light.

20. A computational microscope comprising
a sample stage configured to support a sample;
a camera array comprising multiple groups of camera units,
wherein each group of camera units comprises two or more camera units configured to capture images with different polarization,
wherein each camera unit of the camera array is configured to capture images of an area of the sample,
wherein at least two camera units are configured to capture different areas of the sample with a non-overlapped gap area between the at least two camera units;
an illumination source,
wherein the illumination source comprises multiple groups of light source units,
wherein the multiple groups of light source units are disposed above, below, or both above and below the sample,
wherein each group of light source units comprises two or more light source units configured to generate lights having different polarization to the sample;
a moving mechanism coupled to the camera array or to the sample stage and configured to move the sample stage relative to the camera array;
a controller,
wherein the controller is configured to control the light source units of the multiple groups of light source units to generate multiple illumination patterns,
wherein each illumination pattern comprises light generated from one or more light source units configured to generate lights having a same polarization,
wherein at least two illumination patterns of the multiple illumination patterns comprise lights having different polarizations,
wherein the controller is configured to control the camera array to capture images of areas of the sample under each illumination pattern of the multiple illumination patterns,
wherein the controller is configured to control the moving mechanism to move the sample stage relative to the camera array or to move a set of polarization filters configured for changing a polarization state for a camera unit in at least a group of camera units from a first position to a second position in a direction between the at least two camera units,
wherein the controller is configured to form multiple sets of images of the sample according to the polarization states of the camera units and of the illumination patterns at the first position, the second position, or at the first and second positions.

\* \* \* \* \*